(12) United States Patent
Barzegar et al.

(10) Patent No.: US 10,177,861 B2
(45) Date of Patent: Jan. 8, 2019

(54) TRANSMISSION DEVICE WITH IMPAIRMENT COMPENSATION AND METHODS FOR USE THEREWITH

(71) Applicant: AT&T Intellectual Property I, L.P., Atlanta, GA (US)

(72) Inventors: Farhad Barzegar, Branchburg, NJ (US); Irwin Gerszberg, Kendall Park, NJ (US); Robert Bennett, Southold, NY (US); Paul Shala Henry, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/055,840

(22) Filed: Aug. 6, 2018

(65) Prior Publication Data

US 2018/0351660 A1    Dec. 6, 2018

Related U.S. Application Data

(63) Continuation of application No. 15/861,038, filed on Jan. 3, 2018, now Pat. No. 10,075,247, which is a
(Continued)

(51) Int. Cl.
*H04B 15/02* (2006.01)
*H04B 17/345* (2015.01)
(Continued)

(52) U.S. Cl.
CPC .............. *H04B 15/02* (2013.01); *H01P 5/00* (2013.01); *H01P 5/02* (2013.01); *H04B 3/546* (2013.01); *H04B 17/345* (2015.01)

(58) Field of Classification Search
CPC ...... H04B 15/02; H04B 17/345; H04B 3/546; H01P 5/00; H01P 5/02
See application file for complete search history.

(56) References Cited

U.S. PATENT DOCUMENTS 2,685,068 A      7/1954  Goubau
2,748,350 A  *   5/1956  Miller ..................... H01P 1/163
                                                      333/1
(Continued)

FOREIGN PATENT DOCUMENTS

WO    2018106455 A1    6/2018
WO    2018106684 A1    6/2018
WO    2018106915 A1    6/2018

OTHER PUBLICATIONS

Canadian Office Action, Application 2,964,095, dated Oct. 10, 2017, Oct. 10, 2017, 4 pages.
(Continued)

*Primary Examiner* — Freshteh N Aghdam
(74) *Attorney, Agent, or Firm* — Ed Guntin; Bruce E. Stuckman

(57) ABSTRACT

Aspects of the subject disclosure may include, for example, a waveguide system that includes a transmission device having a coupler positioned with respect to a transmission medium to facilitate transmission or reception of electromagnetic waves that transport communications data. The electromagnetic waves propagate along an outer surface of the transmission medium. A training controller detects an impairment on the transmission medium adverse to the transmission or reception of the electromagnetic waves and adjusts the electromagnetic waves to reduce the effects of the impairment on the transmission medium. Other embodiments are disclosed.

20 Claims, 24 Drawing Sheets

Related U.S. Application Data continuation of application No. 15/616,609, filed on Jun. 7, 2017, now Pat. No. 9,876,587, which is a continuation of application No. 15/405,354, filed on Jan. 13, 2017, now Pat. No. 9,705,610, which is a continuation of application No. 15/057,175, filed on Mar. 1, 2016, now Pat. No. 9,571,209, which is a continuation of application No. 14/519,598, filed on Oct. 21, 2014, now Pat. No. 9,312,919.

(51) Int. Cl.
  *H01P 5/02* (2006.01)
  *H01P 5/00* (2006.01)
  *H04B 3/54* (2006.01)

(56) References Cited

U.S. PATENT DOCUMENTS

| | | |
|---|---|---|
| 2,852,753 A | 9/1958 | Walter et al. |
| 2,867,776 A | 1/1959 | Wilkinson, Jr. |
| 2,912,695 A | 11/1959 | Cutler |
| 2,921,277 A | 1/1960 | Goubau |
| 3,201,724 A | 8/1965 | Hafner |
| 3,566,317 A | 2/1971 | Theodore |
| 4,438,367 A * | 3/1984 | Kerns ............ H01P 1/225 313/20 |
| 5,889,449 A | 3/1999 | Fiedziuszko |
| 6,239,377 B1 | 5/2001 | Nishikawa et al. |
| 7,009,471 B2 | 3/2006 | Elmore |
| 7,280,033 B2 | 10/2007 | Berkman et al. |
| 7,345,623 B2 | 3/2008 | McEwan et al. |
| 7,567,154 B2 | 7/2009 | Elmore |
| 7,590,404 B1 | 9/2009 | Johnson et al. |
| 7,852,837 B1 * | 12/2010 | Au ............ H04B 1/74 370/389 |
| 8,159,385 B2 | 4/2012 | Farneth et al. |
| 8,212,635 B2 | 7/2012 | Miller, II et al. |
| 8,237,617 B1 | 8/2012 | Johnson et al. |
| 8,253,516 B2 | 8/2012 | Miller, II et al. |
| 8,269,583 B2 | 9/2012 | Miller, II et al. |
| 8,344,829 B2 | 1/2013 | Miller, II et al. |
| 8,736,502 B1 | 5/2014 | Mehr et al. |
| 8,897,697 B1 | 11/2014 | Bennett et al. |
| 8,964,433 B2 * | 2/2015 | Hai-Maharsi ...... H01H 33/008 363/126 |
| 9,113,347 B2 | 8/2015 | Henry |
| 9,119,127 B1 * | 8/2015 | Henry ............ H04W 36/22 |
| 9,209,902 B2 | 12/2015 | Willis, III et al. |
| 9,312,919 B1 | 4/2016 | Barzegar et al. |
| 9,461,706 B1 | 10/2016 | Bennett et al. |
| 9,490,869 B1 | 11/2016 | Henry |
| 9,509,415 B1 | 11/2016 | Henry et al. |
| 9,520,945 B2 | 12/2016 | Gerszberg et al. |
| 9,525,524 B2 | 12/2016 | Barzegar et al. |
| 9,544,006 B2 | 1/2017 | Henry et al. |
| 9,564,947 B2 | 2/2017 | Stuckman et al. |
| 9,577,306 B2 | 2/2017 | Willis, III et al. |
| 9,608,692 B2 | 3/2017 | Willis, III et al. |
| 9,608,740 B2 | 3/2017 | Henry et al. |
| 9,615,269 B2 | 4/2017 | Henry et al. |
| 9,627,768 B2 | 4/2017 | Henry et al. |
| 9,628,116 B2 | 4/2017 | Willis, III et al. |
| 9,640,850 B2 | 5/2017 | Henry et al. |
| 9,653,770 B2 | 5/2017 | Henry et al. |
| 9,680,670 B2 | 6/2017 | Henry et al. |
| 9,692,101 B2 | 6/2017 | Henry et al. |
| 9,705,561 B2 | 7/2017 | Henry et al. |
| 9,705,571 B2 | 7/2017 | Gerszberg et al. |
| 9,742,462 B2 | 8/2017 | Bennett et al. |
| 9,748,626 B2 | 8/2017 | Henry et al. |
| 9,749,053 B2 | 8/2017 | Henry et al. |
| 9,722,318 B2 | 9/2017 | Adriazola et al. |
| 9,768,833 B2 | 9/2017 | Fuchs et al. |
| 9,769,020 B2 | 9/2017 | Henry et al. |
| 9,780,834 B2 | 10/2017 | Henry et al. |
| 9,793,951 B2 | 10/2017 | Henry et al. |
| 9,793,954 B2 | 10/2017 | Bennett et al. |
| 9,847,566 B2 | 12/2017 | Henry et al. |
| 9,853,342 B2 | 12/2017 | Henry et al. |
| 9,860,075 B1 | 1/2018 | Gerszberg et al. |
| 9,865,911 B2 | 1/2018 | Henry et al. |
| 9,866,309 B2 | 1/2018 | Bennett et al. |
| 9,871,282 B2 | 1/2018 | Henry et al. |
| 9,871,283 B2 | 1/2018 | Henry et al. |
| 9,876,264 B2 | 1/2018 | Barnickel et al. |
| 9,876,570 B2 | 1/2018 | Henry et al. |
| 9,876,605 B1 | 1/2018 | Henry et al. |
| 9,882,257 B2 | 1/2018 | Henry et al. |
| 9,893,795 B1 | 2/2018 | Willis et al. |
| 9,912,381 B2 | 3/2018 | Bennett et al. |
| 9,917,341 B2 | 3/2018 | Henry et al. |
| 9,991,580 B2 | 6/2018 | Henry et al. |
| 9,997,819 B2 | 6/2018 | Bennett et al. |
| 9,998,172 B1 | 6/2018 | Barzegar et al. |
| 9,998,870 B1 | 6/2018 | Bennett et al. |
| 9,999,038 B2 | 6/2018 | Barzegar et al. |
| 10,003,364 B1 | 6/2018 | Willis, III et al. |
| 10,009,063 B2 | 6/2018 | Gerszberg et al. |
| 10,009,065 B2 | 6/2018 | Henry et al. |
| 10,009,067 B2 | 6/2018 | Birk et al. |
| 10,009,901 B2 | 6/2018 | Gerszberg |
| 10,027,397 B2 | 7/2018 | Kim |
| 10,027,427 B2 | 7/2018 | Vannucci et al. |
| 2004/0113756 A1 | 6/2004 | Mollenkopf et al. |
| 2005/0042989 A1 | 2/2005 | Ho et al. |
| 2005/0111533 A1 * | 5/2005 | Berkman ............ H04B 3/542 375/220 |
| 2005/0258920 A1 | 11/2005 | Elmore et al. |
| 2008/0064331 A1 | 3/2008 | Washiro et al. |
| 2008/0211727 A1 | 9/2008 | Elmore et al. |
| 2008/0252541 A1 | 10/2008 | Diaz et al. |
| 2009/0079660 A1 | 3/2009 | Elmore et al. |
| 2009/0258652 A1 | 10/2009 | Lambert et al. |
| 2010/0225426 A1 | 9/2010 | Unger et al. |
| 2010/0277003 A1 | 11/2010 | Von Novak et al. |
| 2011/0110404 A1 | 5/2011 | Washiro |
| 2011/0118888 A1 * | 5/2011 | White, II ............ G02B 6/483 700/293 |
| 2011/0132658 A1 | 6/2011 | Miller, II et al. |
| 2011/0187578 A1 | 8/2011 | Farneth et al. |
| 2013/0064311 A1 | 3/2013 | Turner et al. |
| 2014/0285277 A1 | 9/2014 | Herbsommer et al. |
| 2016/0080839 A1 | 3/2016 | Fuchs et al. |
| 2016/0112093 A1 | 4/2016 | Barzegar |
| 2016/0164571 A1 | 6/2016 | Bennett et al. |
| 2016/0182096 A1 | 6/2016 | Panioukov et al. |
| 2016/0182161 A1 | 6/2016 | Barzegar |
| 2016/0315662 A1 | 10/2016 | Henry |
| 2016/0359541 A1 | 12/2016 | Bennett |
| 2016/0359546 A1 | 12/2016 | Bennett |
| 2016/0359547 A1 | 12/2016 | Bennett et al. |
| 2016/0360533 A1 | 12/2016 | Bennett et al. |
| 2016/0365966 A1 | 12/2016 | Bennett et al. |
| 2017/0012667 A1 | 1/2017 | Bennett |
| 2017/0018332 A1 | 1/2017 | Barzegar et al. |
| 2017/0018851 A1 | 1/2017 | Hnery et al. |
| 2017/0018856 A1 | 1/2017 | Henry et al. |
| 2017/0033465 A1 | 2/2017 | Henry et al. |
| 2017/0033466 A1 | 2/2017 | Henry et al. |
| 2017/0033953 A1 | 2/2017 | Henry et al. |
| 2017/0033954 A1 | 2/2017 | Henry et al. |
| 2017/0079037 A1 | 3/2017 | Gerszberg et al. |
| 2017/0079038 A1 | 3/2017 | Gerszberg et al. |
| 2017/0079039 A1 | 3/2017 | Gerszberg et al. |
| 2017/0085003 A1 | 3/2017 | Johnson et al. |
| 2017/0093693 A1 | 3/2017 | Barzegar et al. |
| 2017/0110795 A1 | 4/2017 | Henry |
| 2017/0110804 A1 | 4/2017 | Henry et al. |
| 2017/0111805 A1 | 4/2017 | Barzegar et al. |
| 2017/0141856 A1 | 5/2017 | Barzegar et al. |
| 2017/0229782 A1 | 8/2017 | Adriazola et al. |
| 2017/0272178 A1 | 9/2017 | Barzegar et al. |
| 2018/0048497 A1 | 2/2018 | Henry et al. |

(56) References Cited

U.S. PATENT DOCUMENTS

| | | |
|---|---|---|
| 2018/0054232 A1 | 2/2018 | Henry et al. |
| 2018/0054233 A1 | 2/2018 | Henry et al. |
| 2018/0054234 A1 | 2/2018 | Stuckman et al. |
| 2018/0062886 A1 | 3/2018 | Paul et al. |
| 2018/0069594 A1 | 3/2018 | Henry et al. |
| 2018/0069731 A1 | 3/2018 | Henry et al. |
| 2018/0076982 A1 | 3/2018 | Henry et al. |
| 2018/0076988 A1 | 3/2018 | Willis, III et al. |
| 2018/0077709 A1 | 3/2018 | Gerszberg |
| 2018/0108997 A1 | 4/2018 | Henry et al. |
| 2018/0108998 A1 | 4/2018 | Henry et al. |
| 2018/0108999 A1 | 4/2018 | Henry et al. |
| 2018/0115040 A1 | 4/2018 | Bennett et al. |
| 2018/0115058 A1 | 4/2018 | Henry et al. |
| 2018/0115060 A1 | 4/2018 | Bennett et al. |
| 2018/0115075 A1 | 4/2018 | Bennett et al. |
| 2018/0115081 A1 | 4/2018 | Johnson et al. |
| 2018/0123207 A1 | 5/2018 | Henry et al. |
| 2018/0123208 A1 | 5/2018 | Henry et al. |
| 2018/0123643 A1 | 5/2018 | Henry et al. |
| 2018/0123836 A1 | 5/2018 | Henry et al. |
| 2018/0151957 A1 | 5/2018 | Bennett et al. |
| 2018/0159195 A1 | 6/2018 | Henry et al. |
| 2018/0159196 A1 | 6/2018 | Henry et al. |
| 2018/0159197 A1 | 6/2018 | Henry et al. |
| 2018/0159228 A1 | 6/2018 | Britz et al. |
| 2018/0159229 A1 | 6/2018 | Britz |
| 2018/0159230 A1 | 6/2018 | Henry et al. |
| 2018/0159232 A1 | 6/2018 | Henry et al. |
| 2018/0159235 A1 | 6/2018 | Wolniansky |
| 2018/0159238 A1 | 6/2018 | Wolniansky |
| 2018/0159240 A1 | 6/2018 | Henry et al. |
| 2018/0159243 A1 | 6/2018 | Britz et al. |
| 2018/0166761 A1 | 6/2018 | Henry et al. |
| 2018/0166784 A1 | 6/2018 | Johnson et al. |
| 2018/0166785 A1 | 6/2018 | Henry et al. |
| 2018/0166787 A1 | 6/2018 | Johnson et al. |
| 2018/0167130 A1 | 6/2018 | Vannucci |
| 2018/0167927 A1 | 6/2018 | Beattie, Jr. et al. |
| 2018/0175943 A1 | 6/2018 | Barzegar et al. |

OTHER PUBLICATIONS

"International Preliminary Report on Patentability", PCT/US2015/51583, dated May 4, 2017, 7 pages.
"International Search Report & Written Opinion", PCT/US2015/051583, dated Dec. 21, 2015.
"International Search Report and Written Opinion", PCT/US2018/015634, dated Jun. 25, 2018, 8 pages.
Akalin, Tahsin et al., "Single-Wire Transmission Lines at Terahertz Frequencies", IEEE Transactions on Microwave Theory and Techniques, Vol. 54, No. 6, 2006, 2762-2767.
Alam, M. N. et al., "Novel Surface Wave Exciters for Power Line Fault Detection and Communications", Department of Electrical Engineering, University of South Carolina, Antennas and Propagation (APSURSI), 2011 IEEE International Symposium, IEEE, 2011, 1-4.
Barlow, H. M. et al., "Surface Waves", 621.396.11 : 538.566, Paper No. 1482 Radio Section, 1953, pp. 329-341.
Corridor Systems, "A New Approach to Outdoor DAS Network Physical Layer Using E-Line Technology", Mar. 2011, 5 pages.
Elmore, Glenn et al., "A Surface Wave Transmission Line", QEX, May/Jun. 2012, pp. 3-9.
Elmore, Glenn, "Introduction to the Propagating Wave on a Single Conductor", www.corridor.biz, Jul. 27, 2009, 30 pages.
Friedman, M et al., "Low-Loss RF Transport Over Long Distances", IEEE Transactions on Microwave Theory and Techniques, vol. 49, No. 2, Feb. 2001, 8 pages.
Goubau, Georg et al., "Investigation of a Surface-Wave Line for Long Distance Transmission", 1952, 263-267.
Goubau, Georg et al., "Investigations with a Model Surface Wave Transmission Line", IRE Transactions on Antennas and Propagation, 1957, 222-227.
Goubau, Georg, "Open Wire Lines", IRE Transactions on Microwave Theory and Techniques, 1956, 197-200.
Goubau, Georg, "Single-Conductor Surface-Wave Transmission Lines", Proceedings of the I.R.E., 1951, 619-624.
Goubau, Georg, "Surface Waves and Their Application to Transmission Lines", Radio Communication Branch, Coles Signal Laboratory, Mar. 10, 1950, 1119-1128.
Goubau, Georg, "Waves on Interfaces", IRE Transactions on Antennas and Propagation, Dec. 1959, 140-146.
Ren-Bin, Zhong et al., "Surface plasmon wave propagation along single metal wire", Chin. Phys. B, vol. 21, No. 11, May 2, 2012, 9 pages.
Sommerfeld, A., "On the propagation of electrodynamic waves along a wire", Annals of Physics and Chemistry New Edition, vol. 67, No. 2, 1899, 72 pages.
Wang, Hao et al., "Dielectric Loaded Substrate Integrated Waveguide (SIW)—Plan Horn Antennas", IEEE Transactions on Antennas and Propagation, IEEE Service Center, Piscataway, NJ, US, vol. 56, No. 3, Mar. 1, 2010, 640-647.
Wang, Kanglin, "Dispersion of Surface Plasmon Polaritons on Metal Wires in the Terahertz Frequency Range", Physical Review Letters, PRL 96, 157401, 2006, 4 pages.

* cited by examiner

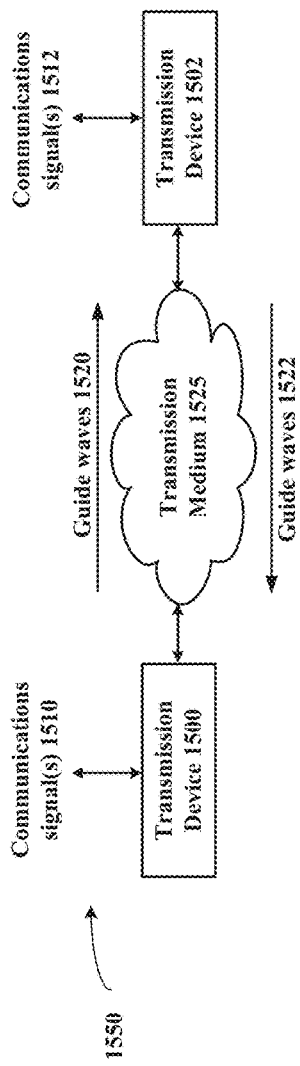
FIG. 15
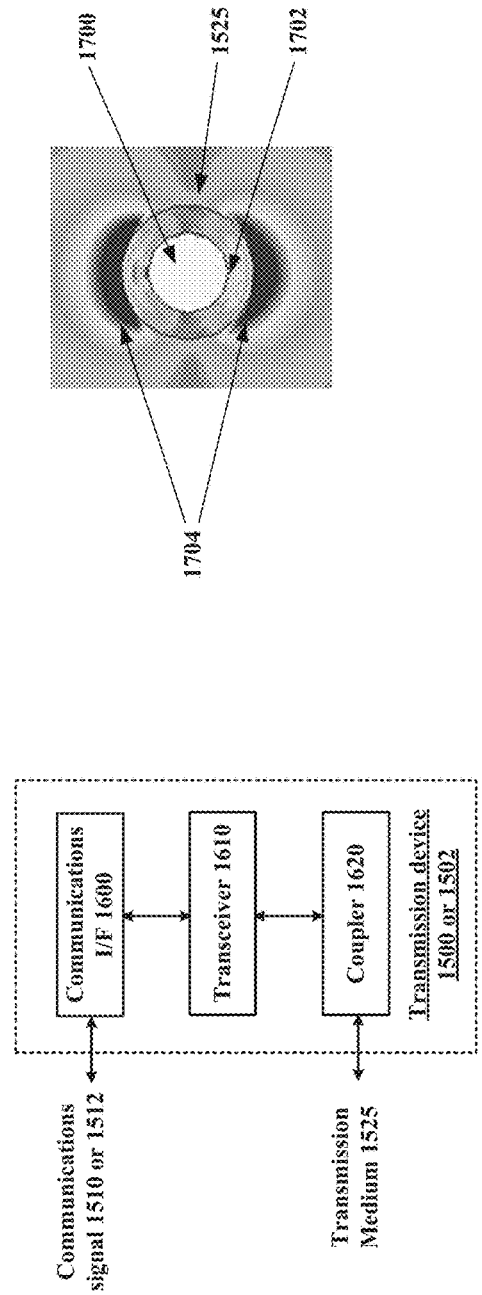
FIG. 17
FIG. 16

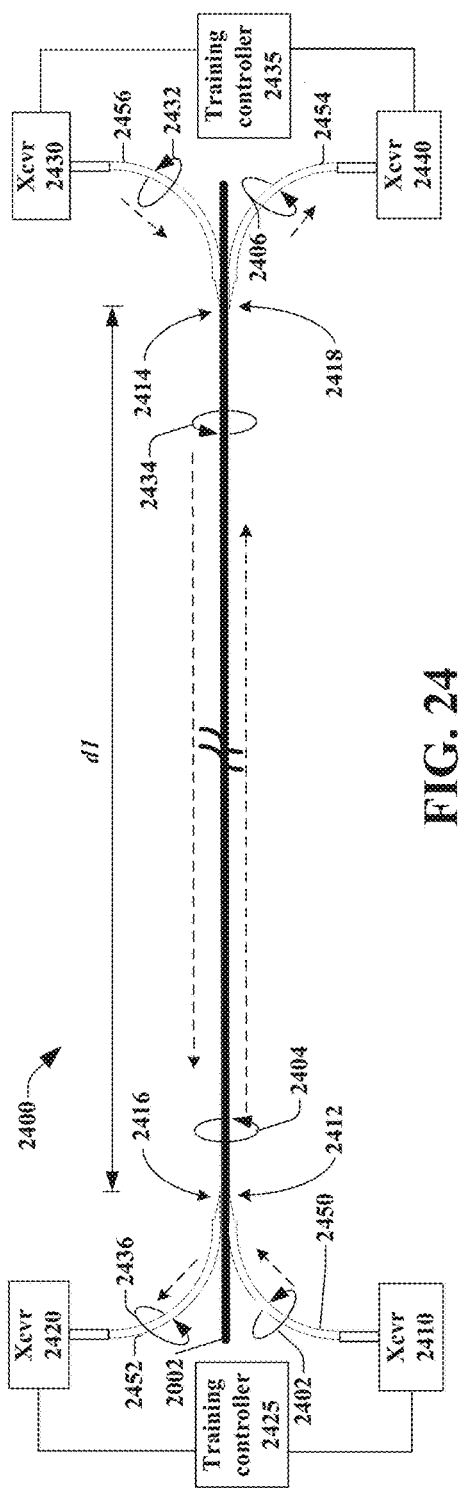
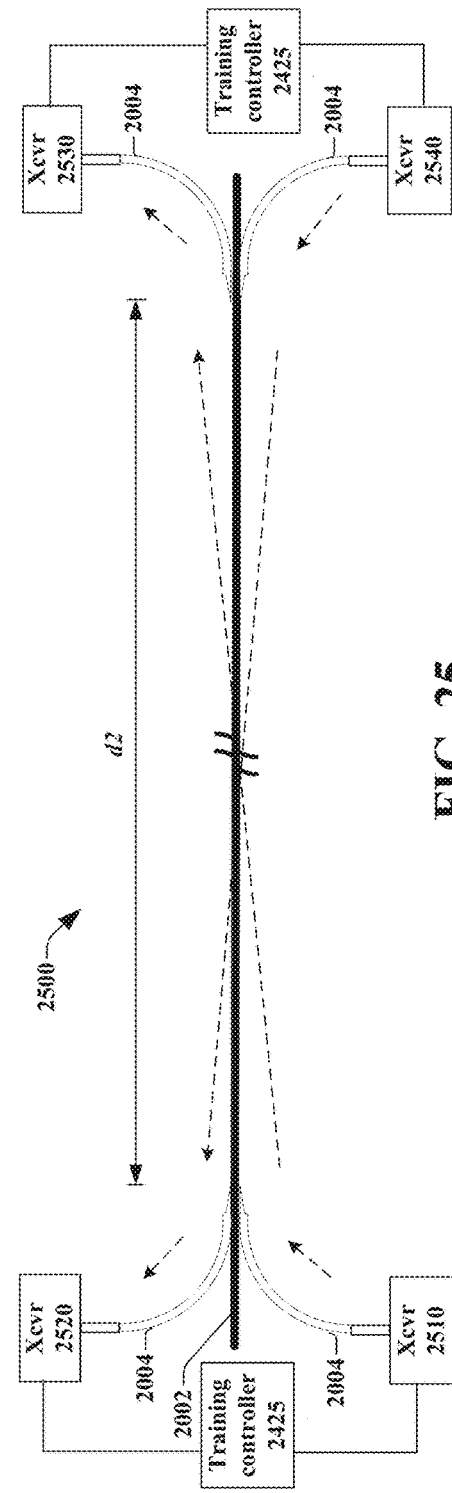
FIG. 24
FIG. 25

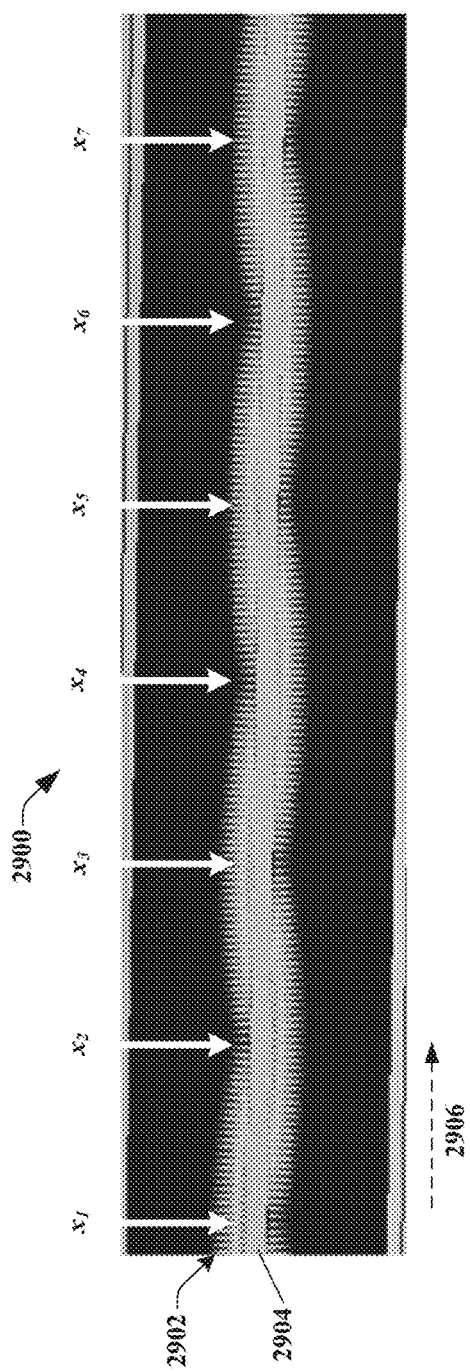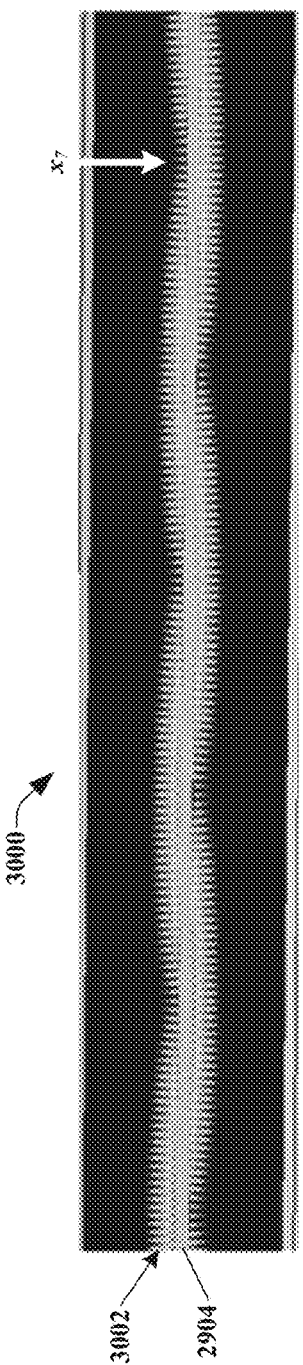

TRANSMISSION DEVICE WITH IMPAIRMENT COMPENSATION AND METHODS FOR USE THEREWITH

CROSS-REFERENCE TO RELATED APPLICATIONS

This application claims priority to U.S. patent application Ser. No. 15/861,038, filed Jan. 3, 2018, which claims priority to U.S. patent application Ser. No. 15/616,609, filed Jun. 7, 2017, issued as U.S. Pat. No. 9,876,587 on Jan. 23, 2018, which claims priority to U.S. patent application Ser. No. 15/405,354, filed Jan. 13, 2017, issued as U.S. Pat. No. 9,705,610 on Jul. 11, 2017, which claims priority to U.S. patent application Ser. No. 15/057,175, filed Mar. 1, 2016, issued as U.S. Pat. No. 9,571,209 on Feb. 14, 2017, which claims priority to U.S. patent application Ser. No. 14/519,598 filed Oct. 21, 2014, issued as U.S. Pat. No. 9,312,919 on Apr. 12, 2016. The contents of each of the foregoing are hereby incorporated by reference into this application as if set forth herein in full.

FIELD OF THE DISCLOSURE

The subject disclosure relates to communications via microwave transmission in a communication network.

BACKGROUND

As smart phones and other portable devices increasingly become ubiquitous, and data usage increases, macrocell base station devices and existing wireless infrastructure in turn require higher bandwidth capability in order to address the increased demand. To provide additional mobile bandwidth, small cell deployment is being pursued, with microcells and picocells providing coverage for much smaller areas than traditional macrocells.

BRIEF DESCRIPTION OF THE DRAWINGS

FIG. 15 is a block diagram illustrating an example, non-limiting embodiment of a guided wave communication system in accordance with various aspects described herein.

FIG. 16 is a block diagram illustrating an example, non-limiting embodiment of a transmission device in accordance with various aspects described herein.

FIG. 17 is a diagram illustrating an example, non-limiting embodiment of an electromagnetic distribution in accordance with various aspects described herein.

FIG. 24 is a block diagram of an example, non-limiting embodiment of a transmission system in accordance with various aspects described herein.

FIG. 25 is a block diagram of an example, non-limiting embodiment of a transmission system in accordance with various aspects described herein.

FIG. 29 is a diagram illustrating an example, non-limiting embodiment of an electromagnetic distribution in accordance with various aspects described herein.

FIG. 30 is a diagram illustrating an example, non-limiting embodiment of an electromagnetic distribution in accordance with various aspects described herein.

DETAILED DESCRIPTION

Figure 1:
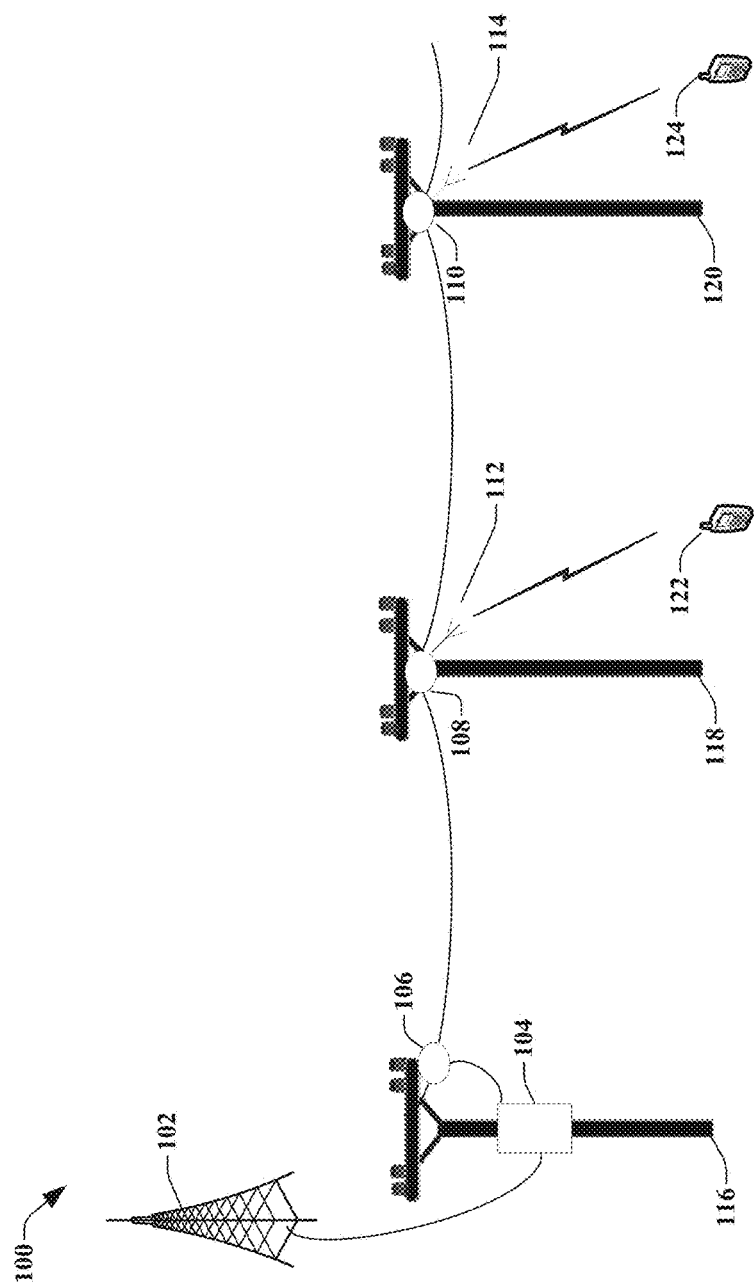
FIG. 1 is a block diagram illustrating an example, non-limiting embodiment of a guided wave communications system in accordance with various aspects described herein.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced in different combinations and without these details (and without applying to any particular networked environment or standard).

To provide network connectivity to additional base station devices, the backhaul network that links the communication cells (e.g., microcells and macrocells) to network devices of the core network correspondingly expands. Similarly, to provide network connectivity to a distributed antenna system, an extended communication system that links base station devices and their distributed antennas is desirable. A guided wave communication system can be provided to enable alternative, increased or additional network connectivity and a waveguide coupling system can be provided to transmit and/or receive guided wave (e.g., surface wave) communications on a transmission medium, such as a wire or other conductor that operates as a single-wire transmission line or a dielectric material that operates as a waveguide and/or another transmission medium that otherwise operates to guide the transmission of an electromagnetic wave.

In an example embodiment, a waveguide coupler that is utilized in a waveguide coupling system can be made of a dielectric material, or other low-loss insulator (e.g., Teflon, polyethylene, etc.), or can be made of a conducting (e.g., metallic, non-metallic, etc.) material, or any combination of the foregoing materials. Reference throughout the detailed description to "dielectric waveguide" is for illustration purposes and does not limit embodiments to being constructed solely of dielectric materials. In other embodiments, other dielectric or insulating materials are possible. It will be appreciated that a variety of transmission media such as: wires, whether insulated or not, and whether single-stranded or multi-stranded; conductors of other shapes or configurations including wire bundles, cables, rods, rails, pipes; non-conductors such as dielectric pipes, rods, rails, or other dielectric members; combinations of conductors and dielectric materials; or other guided wave transmission media can be utilized with guided wave communications without departing from example embodiments.

For these and/or other considerations, in one or more embodiments, a transmission device includes a communications interface that receives a first communication signal that includes first data. A transceiver generates a first electromagnetic wave based on the first communication signal to convey the first data, the first electromagnetic wave having at least one carrier frequency and at least one corresponding wavelength. A coupler couples the first electromagnetic wave to a transmission medium having at least one inner portion surrounded by a dielectric material, the dielectric material having an outer surface and a corresponding circumference, wherein the coupling of the first electromagnetic wave to the transmission medium forms a second electromagnetic wave that is guided to propagate along the outer surface of the dielectric material via at least one guided wave mode that includes an asymmetric mode, wherein the at least one carrier frequency is within a millimeter wave frequency band and wherein the at least one corresponding wavelength is less than the circumference of the transmission medium.

In one or more embodiments, a transmission device includes a transmitter that generates a first electromagnetic wave based on a communication signal to convey data, the first electromagnetic wave having at least one carrier frequency and at least one corresponding wavelength. A coupler couples the first electromagnetic wave to a single wire transmission medium having an outer surface and a corresponding circumference, wherein the coupling of the first electromagnetic wave to the single wire transmission medium forms a second electromagnetic wave that is guided to propagate along the outer surface of the single wire transmission medium via at least one guided wave mode that includes an asymmetric mode, wherein the at least one carrier frequency in within a millimeter wave frequency band and wherein the at least one corresponding wavelength is less than the circumference of the single wire transmission medium.

In one or more embodiments, a method includes generating a first electromagnetic wave based on a communication signal to convey data, the first electromagnetic wave having at least one carrier frequency and at least one corresponding wavelength. A coupler couples the first electromagnetic wave to a single wire transmission medium having an outer dielectric surface and a corresponding circumference, wherein the coupling of the first electromagnetic wave to the single wire transmission medium forms a second electromagnetic wave that is guided to propagate along the outer dielectric surface of the single wire transmission medium via at least one guided wave mode, wherein the at least one carrier frequency is within a millimeter wave frequency band and wherein the at least one corresponding wavelength is less than the circumference of the single wire transmission medium.

In one or more embodiments, a transmission device includes a communications interface that receives a first communication signal that includes first data. A transceiver generates a first electromagnetic wave based on the first communication signal to convey the first data, the first electromagnetic wave having at least one carrier frequency. A coupler couples the first electromagnetic wave to a transmission medium having at least one inner portion surrounded by a dielectric material, the dielectric material having an outer surface and a corresponding circumference, wherein the coupling of the first electromagnetic wave to the transmission medium forms a second electromagnetic wave that is guided to propagate along the outer surface of the dielectric material via at least one guided wave mode that includes an asymmetric mode having a lower cutoff frequency, and wherein the at least one carrier frequency is selected to be within a limited range of the lower cutoff frequency.

In one or more embodiments, a transmission device includes a transmitter that generates a first electromagnetic wave based on a communication signal to convey data, the first electromagnetic wave having at least one carrier frequency. A coupler, coupled to the transmitter, couples the first electromagnetic wave to a single wire transmission medium having an outer surface, wherein the coupling of the first electromagnetic wave to the single wire transmission medium forms a second electromagnetic wave that is guided to propagate along the outer surface of the single wire transmission medium via at least one guided wave mode that includes an asymmetric mode having a lower cutoff frequency, and wherein the at least one carrier frequency is selected to be within a limited range of the lower cutoff frequency.

In one or more embodiments, a method includes generating a first electromagnetic wave based on a communication signal to convey data, the first electromagnetic wave having at least one carrier frequency. A coupler couples the first electromagnetic wave to a single wire transmission medium having an outer surface, wherein the coupling of the first electromagnetic wave to the single wire transmission medium forms a second electromagnetic wave that is guided to propagate along the outer surface of the single wire transmission medium via at least one guided wave mode that includes an asymmetric mode having a lower cutoff frequency, and wherein the at least one carrier frequency is selected to be within a limited range of the lower cutoff frequency.

In one or more embodiments, a method includes generating a first electromagnetic wave based on a communication signal to convey data, the first electromagnetic wave having at least one carrier frequency. The first electromagnetic wave is coupled to a single wire transmission medium having an outer surface, wherein the coupling of the first electromagnetic wave to the single wire transmission medium forms a second electromagnetic wave that is guided to propagate along the outer surface of the single wire transmission medium via at least one guided wave mode that includes an asymmetric mode having a lower cutoff frequency, and wherein the at least one carrier frequency is selected to be within a limited range of the lower cutoff frequency.

Various embodiments described herein relate to a transmission system for launching and extracting guided wave (e.g., surface wave communications that are electromagnetic waves) transmissions from a wire. At millimeter-wave frequencies, wherein the wavelength is small compared to the size of the equipment, transmissions can propagate as waves guided by a waveguide, such as a strip or length of dielectric material or other coupler. The electromagnetic field structure of the guided wave can be inside and/or outside of the coupler. When this coupler is brought into close proximity to a transmission medium (e.g., a wire, utility line or other transmission medium), at least a portion of the guided wave decouples from the waveguide and couples to the transmission medium, and continues to propagate as guided waves, such as surface waves about the surface of the wire.

In one or more embodiments, a coupler includes a receiving portion that receives a first electromagnetic wave conveying first data from a transmitting device. A guiding portion guides the first electromagnetic wave to a junction for coupling the first electromagnetic wave to a transmission medium. The first electromagnetic wave propagates via at least one first guided wave mode. The coupling of the first electromagnetic wave to the transmission medium forms a second electromagnetic wave that is guided to propagate along the outer surface of the transmission medium via at least one second guided wave mode that differs from the at least one first guided wave mode.

In one or more embodiments, a coupling module includes a plurality of receiving portions that receive a corresponding plurality of first electromagnetic waves conveying first data. A plurality of guiding portions guide the plurality of first electromagnetic waves to a corresponding plurality of junctions for coupling the plurality of first electromagnetic waves to a transmission medium. The plurality of first electromagnetic waves propagate via at least one first guided wave mode and the coupling of the plurality of first electromagnetic waves to the transmission medium forms a plurality of second electromagnetic waves that are guided to propagate along the outer surface of the transmission medium via at least one second guided wave mode that differs from the at least one first guided wave mode.

In one or more embodiments, a method includes receiving a first electromagnetic wave conveying first data from a transmitting device. The first electromagnetic wave is guided to a junction for coupling the first electromagnetic wave to a transmission medium. The first electromagnetic wave propagates via at least one first guided wave mode and the coupling of the first electromagnetic wave to the transmission medium forms a second electromagnetic wave that is guided to propagate along the outer surface of the transmission medium via at least one second guided wave mode that differs from the at least one first guided wave mode.

In one or more embodiments, a transmission device includes a first coupler that guides a first electromagnetic wave to a first junction to form a second electromagnetic wave that is guided to propagate along the outer surface of the transmission medium via one or more guided wave modes. This mode or modes have an envelope that varies as a function of angular deviation and/or longitudinal displacement. A second coupler guides a third electromagnetic wave from a second junction coupling the third electromagnetic wave from the transmission medium. The second junction is arranged in angular deviation and/or longitudinal displacement to correspond to a local minimum of the envelope.

In one or more embodiments, a waveguide system includes a transmission device having a coupler positioned with respect to a transmission medium to facilitate transmission or reception of electromagnetic waves that transport communications data. The electromagnetic waves propagate along an outer surface of the transmission medium. A training controller detects an impairment on the transmission medium adverse to the transmission or reception of the electromagnetic waves and that adjusts an envelope of the electromagnetic waves to place a local minimum of the envelope in a location that corresponds to a position of the impairment on the transmission medium.

In one or more embodiments, a method includes facilitating transmission or reception of electromagnetic waves that propagate along an outer surface of a single wire transmission medium via a transmission device, wherein the electromagnetic waves transport communications data. An impairment is detected on the outer surface of the single wire transmission medium that is adverse to the transmission of the electromagnetic waves. An envelope the electromagnetic waves is adjusted to place a local minimum of the envelope in a location that corresponds to a position of the impairment on the outer surface of the single wire transmission medium.

According to an example embodiment, the electromagnetic wave is a surface wave, which is a type of guided wave that is guided by a surface of the transmission medium, which can include an exterior or outer surface of the wire, exterior or outer surface of dielectric coating or insulating jacket, or another surface of a transmission medium that is adjacent to or exposed to another type of medium having different properties (e.g., dielectric properties). Indeed, in an example embodiment, a surface of the transmission that guides a surface wave can represent a transitional surface between two different types of media. For example, in the case of a bare or uninsulated wire, the surface of the wire can be the outer or exterior conductive surface of the bare or uninsulated wire that is exposed to air or free space. As another example, in the case of insulated wire, the surface of the wire can be the conductive portion of the wire that meets the insulator portion of the wire, or can otherwise be the insulated surface of the wire that is exposed to air or free space, or can otherwise be any material region between the insulated surface of the wire and the conductive portion of the wire that meets the insulator portion of the wire, depending upon the relative differences in the properties (e.g., dielectric properties) of the insulator, air, and/or the conductor and further dependent on the frequency and propagation mode or modes of the guided wave.

According to an example embodiment, guided waves such as surface waves can be contrasted with radio transmissions over free space/air or conventional propagation of electrical power or signals through the conductor of the wire. Indeed, with surface wave or guided wave systems described herein, conventional electrical power or signals can still propagate or be transmitted through the conductor of the wire, while guided waves (including surface waves and other electromagnetic waves) can surround all or part of the surface of the wire and propagate along the wire with low loss, according to an example embodiment. In an example embodiment, a surface wave can have a field structure (e.g., an electromagnetic field structure) that lies primarily or substantially outside of the transmission medium that serves to guide the surface wave.

In an example embodiment, the guided waves employed herein can be contrasted with Sommerfeld waves used as a means of propagation along a wire which are limited to waves having a wavelength greater than, not less than, the circumference of the wire. In an example embodiment, the guided waves employed herein can be contrasted with G-Wave and E-Wave systems that operate via the propagation of the fundamental mode and not based on the propagation of at least one asymmetric mode. In an example embodiment, the guided waves employed herein can be contrasted with surface plasmon wave propagation along single metal wire premised on the electron bunches that form in conductors at frequencies such as optical frequencies, well above, and not less than γ, the mean collision frequency of electrons of the conducting material. These prior art systems have failed to address guided wave propagation for a transmission medium, where the guided wave includes an asymmetric mode that propagates at low loss frequencies, such as in the millimeter wave band, that are less than the mean collision frequency of electrons of the conducting material. These prior art systems have failed to address guided wave propagation for a transmission medium that includes an outer dielectric, where the guided wave includes an asymmetric mode that propagates with low loss with fields concentrated about the outer surface of the dielectric.

According to an example embodiment, the electromagnetic waves traveling along a wire are induced by other electromagnetic waves traveling along a waveguide in proximity to the wire. The inducement of the electromagnetic waves can be independent of any electrical potential, charge or current that is injected or otherwise transmitted through the wires as part of an electrical circuit. It is to be appreciated that while a small current in the wire may be formed in response to the propagation of the electromagnetic wave through the wire, this can be due to the propagation of the electromagnetic wave along the wire surface, and is not formed in response to electrical potential, charge or current that is injected into the wire as part of an electrical circuit. The electromagnetic waves traveling on the wire therefore do not require a circuit to propagate along the wire surface. The wire therefore is a single wire transmission line that does not require a circuit. Also, in some embodiments, a wire is not necessary, and the electromagnetic waves can propagate along a single line transmission medium that is not a wire.

According to an example embodiment, the term "single wire transmission medium" is used in conjunction with transmission via electromagnetic waves that are guided by a wire, but do not require the wire to be part of a circuit to support such propagation. A transmission system may include multiple single wire transmission media that act to transmit such guided waves, with different waves being guided by differing ones of the single wire transmission media.

According to an example embodiment, the term "about" a wire used in conjunction with a guided wave (e.g., surface wave) can include fundamental wave propagation modes and other guided waves having a circular or substantially circular field distribution (e.g., electric field, magnetic field, electromagnetic field, etc.) at least partially around a wire. In addition, when a guided wave propagates "about" a wire, it propagates longitudinally along the wire via a wave propagation mode (at least one guided wave mode) that can include not only the fundamental wave propagation modes (e.g., zero order modes), but additionally or alternatively other non-fundamental wave propagation modes such as higher-order guided wave modes (e.g., $1^{st}$ order modes, $2^{nd}$ order modes, etc.), asymmetrical modes and/or other guided (e.g., surface) waves that have non-circular field distributions around a wire.

For example, such non-circular field distributions can be unilateral or multi-lateral with one or more azimuthal lobes characterized by relatively higher field strength and/or one or more nulls or null regions characterized by relatively low-field strength, zero-field strength or substantially zero field strength. Further, the field distribution can otherwise vary as a function of a longitudinal azimuthal orientation around the wire such that one or more regions of azimuthal orientation around the wire have an electric or magnetic field strength (or combination thereof) that is higher than one or more other regions of azimuthal orientation, according to an example embodiment. It will be appreciated that the relative positions of the higher order modes or asymmetrical modes can vary as the guided wave travels along the wire.

Referring now to FIG. 1, a block diagram illustrating an example, non-limiting embodiment of a guided wave communication system 100 is shown. Guided wave communication system 100 depicts an exemplary environment in which a transmission device, coupler or coupling module can be used.

Guided wave communication system 100 can be a distributed antenna system that includes one or more base station devices (e.g., base station device 104) that are communicably coupled to a macrocell site 102 or other network connection. Base station device 104 can be connected by a wired (e.g., fiber and/or cable), or by a wireless (e.g., microwave wireless) connection to macrocell site 102. Macrocells such as macrocell site 102 can have dedicated connections to the mobile network and base station device 104 can share and/or otherwise use macrocell site 102's connection. Base station device 104 can be mounted on, or attached to, utility pole 116. In other embodiments, base station device 104 can be near transformers and/or other locations situated nearby a power line.

Base station device 104 can facilitate connectivity to a mobile network for mobile devices 122 and 124. Antennas 112 and 114, mounted on or near utility poles 118 and 120, respectively, can receive signals from base station device 104 and transmit those signals to mobile devices 122 and 124 over a much wider area than if the antennas 112 and 114 were located at or near base station device 104.

It is noted that FIG. 1 displays three utility poles, with one base station device, for purposes of simplicity. In other embodiments, utility pole 116 can have more base station devices, and one or more utility poles with distributed antennas are possible.

A transmission device, such as dielectric waveguide coupling device 106 can transmit the signal from base station device 104 to antennas 112 and 114 via utility or power line(s) that connect the utility poles 116, 118, and 120. To transmit the signal, radio source and/or coupler 106 upconverts the signal (e.g., via frequency mixing) from base station device 104 or otherwise converts the signal from the base station device 104 to a millimeter-wave band signal having at least one carrier frequency in the millimeter wave frequency band. The dielectric waveguide coupling device 106 launches a millimeter-wave band wave that propagates as a guided wave (e.g., surface wave or other electromagnetic wave) traveling along the utility line or other wire. At utility pole 118, another transmission device, such as dielectric waveguide coupling device 108 that receives the guided wave (and optionally can amplify it as needed or desired or operate as a digital repeater to receive it and regenerate it) and sends it forward as a guided wave (e.g., surface wave or other electromagnetic wave) on the utility line or other wire. The dielectric waveguide coupling device 108 can also extract a signal from the millimeter-wave band guided wave and shift it down in frequency or otherwise convert it to its original cellular band frequency (e.g., 1.9 GHz or other defined cellular frequency) or another cellular (or non-cellular) band frequency. An antenna 112 can transmit (e.g., wirelessly transmit) the downshifted signal to mobile device 122. The process can be repeated by another transmission device, such as dielectric waveguide coupling device 110, antenna 114 and mobile device 124, as necessary or desirable.

Transmissions from mobile devices 122 and 124 can also be received by antennas 112 and 114 respectively. Repeaters on dielectric waveguide coupling devices 108 and 110 can upshift or otherwise convert the cellular band signals to millimeter-wave band and transmit the signals as guided wave (e.g., surface wave or other electromagnetic wave) transmissions over the power line(s) to base station device 104.

In an example embodiment, system 100 can employ diversity paths, where two or more utility lines or other wires are strung between the utility poles 116, 118, and 120 (e.g., two or more wires between poles 116 and 120) and redundant transmissions from base station 104 are transmitted as guided waves down the surface of the utility lines or other wires. The utility lines or other wires can be either insulated or uninsulated, and depending on the environmental conditions that cause transmission losses, the coupling devices can selectively receive signals from the insulated or uninsulated utility lines or other wires. The selection can be based on measurements of the signal-to-noise ratio of the wires, or based on determined weather/environmental conditions (e.g., moisture detectors, weather forecasts, etc.). The use of diversity paths with system 100 can enable alternate routing capabilities, load balancing, increased load handling, concurrent bi-directional or synchronous communications, spread spectrum communications, etc. (See FIG. 8 for more illustrative details).

It is noted that the use of the dielectric waveguide coupling devices 106, 108, and 110 in FIG. 1 are by way of example only, and that in other embodiments, other uses are possible. For instance, dielectric waveguide coupling devices can be used in a backhaul communication system, providing network connectivity to base station devices. Dielectric waveguide coupling devices can be used in many circumstances where it is desirable to transmit guided wave communications over a wire, whether insulated or not insulated. Dielectric waveguide coupling devices are improvements over other coupling devices due to no contact or limited physical and/or electrical contact with the wires that may carry high voltages. With dielectric waveguide coupling devices, the apparatus can be located away from the wire (e.g., spaced apart from the wire) and/or located on the wire so long as it is not electrically in contact with the wire, as the dielectric acts as an insulator, allowing for cheap, easy, and/or less complex installation. However, as previously noted conducting or non-dielectric couplers can be employed, particularly in configurations where the wires correspond to a telephone network, cable television network, broadband data service, fiber optic communications system or other network employing low voltages or having insulated transmission lines.

It is further noted, that while base station device 104 and macrocell site 102 are illustrated in an example embodiment, other network configurations are likewise possible. For example, devices such as access points or other wireless gateways can be employed in a similar fashion to extend the reach of other networks such as a wireless local area network, a wireless personal area network or other wireless network that operates in accordance with a communication protocol such as a 802.11 protocol, WIMAX protocol, UltraWideband protocol, Bluetooth protocol, Zigbee protocol or other wireless protocol.

Figure 2:
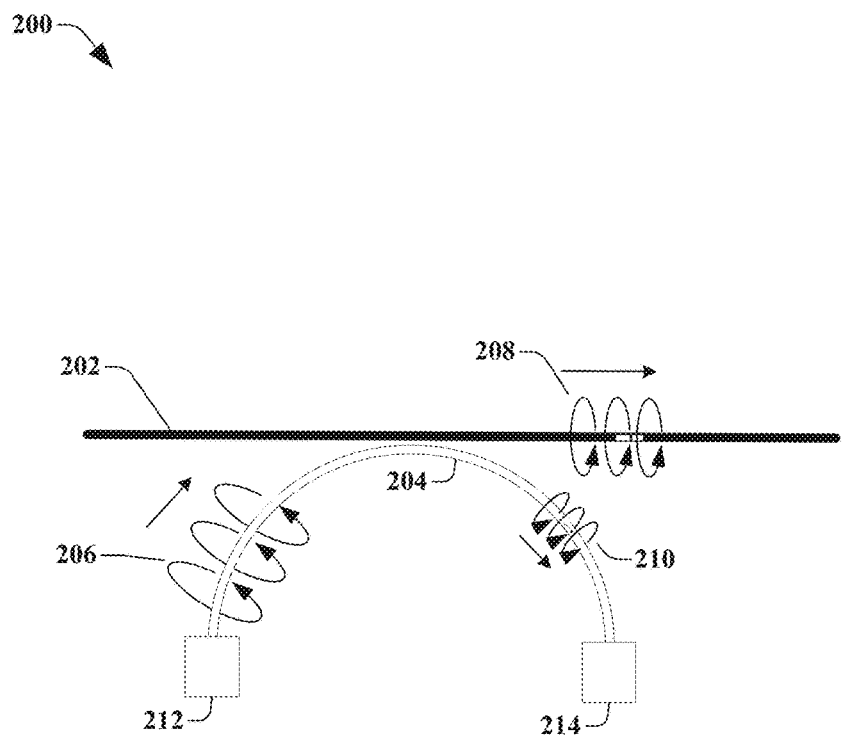
FIG. 2 is a block diagram illustrating an example, non-limiting embodiment of a dielectric waveguide coupler in accordance with various aspects described herein.

Turning now to FIG. 2, illustrated is a block diagram of an example, non-limiting embodiment of a dielectric waveguide coupling system 200 in accordance with various aspects described herein. System 200 comprises a dielectric waveguide 204 that has a wave 206 propagating as a guided wave about a waveguide surface of the dielectric waveguide 204. In an example embodiment, the dielectric waveguide 204 is curved, and at least a portion of the dielectric waveguide 204 can be placed near a wire 202 in order to facilitate coupling between the dielectric waveguide 204 and the wire 202, as described herein. The dielectric waveguide 204 can be placed such that a portion of the curved dielectric waveguide 204 is parallel or substantially parallel to the wire 202. The portion of the dielectric waveguide 204 that is parallel to the wire can be an apex of the curve, or any point where a tangent of the curve is parallel to the wire 202. When the dielectric waveguide 204 is positioned or placed thusly, the wave 206 travelling along the dielectric waveguide 204 couples, at least in part, to the wire 202, and propagates as guided wave 208 around or about the wire surface of the wire 202 and longitudinally along the wire 202. The guided wave 208 can be characterized as a surface wave or other electromagnetic wave, although other types of guided waves 208 can be supported as well without departing from example embodiments. A portion of the wave 206 that does not couple to the wire 202 propagates as wave 210 along the dielectric waveguide 204. It will be appreciated that the dielectric waveguide 204 can be configured and arranged in a variety of positions in relation to the wire 202 to achieve a desired level of coupling or non-coupling of the wave 206 to the wire 202. For example, the curvature and/or length of the dielectric waveguide 204 that is parallel or substantially parallel, as well as its separation distance (which can include zero separation distance in an example embodiment), to the wire 202 can be varied without departing from example embodiments. Likewise, the arrangement of the dielectric waveguide 204 in relation to the wire 202 may be varied based upon considerations of the respective intrinsic characteristics (e.g., thickness, composition, electromagnetic properties, etc.) of the wire 202 and the dielectric waveguide 204, as well as the characteristics (e.g., frequency, energy level, etc.) of the waves 206 and 208.

The guided wave 208 propagates in a direction parallel or substantially parallel to the wire 202, even as the wire 202 bends and flexes. Bends in the wire 202 can increase transmission losses, which are also dependent on wire diameters, frequency, and materials. If the dimensions of the dielectric waveguide 204 are chosen for efficient power transfer, most of the power in the wave 206 is transferred to the wire 202, with little power remaining in wave 210. It will be appreciated that the guided wave 208 can still be multi-modal in nature (discussed herein), including having modes that are non-fundamental or asymmetric, while traveling along a path that is parallel or substantially parallel to the wire 202, with or without a fundamental transmission mode. In an example embodiment, non-fundamental or asymmetric modes can be utilized to minimize transmission losses and/or obtain increased propagation distances.

It is noted that the term parallel is generally a geometric construct which often is not exactly achievable in real systems. Accordingly, the term parallel as utilized in the subject disclosure represents an approximation rather than an exact configuration when used to describe embodiments disclosed in the subject disclosure. In an example embodiment, substantially parallel can include approximations that are within 30 degrees of true parallel in all dimensions.

In an example embodiment, the wave 206 can exhibit one or more wave propagation modes. The dielectric waveguide modes can be dependent on the shape and/or design of the dielectric waveguide 204. The one or more dielectric waveguide modes of wave 206 can generate, influence, or impact one or more wave propagation modes of the guided wave 208 propagating along wire 202. In an example embodiment, the wave propagation modes on the wire 202 can be similar to the dielectric waveguide modes since both waves 206 and 208 propagate about the outside of the dielectric waveguide 204 and wire 202 respectively. In some embodiments, as the wave 206 couples to the wire 202, the modes can change form due to the coupling between the dielectric waveguide 204 and the wire 202. For example, differences in size, material, and/or impedances of the dielectric waveguide 204 and the wire 202 may create additional modes not present in the dielectric waveguide modes and/or suppress some of the dielectric waveguide modes. The wave propagation modes can comprise the fundamental transverse electromagnetic mode (Quasi-TEM$_{00}$), where only small electric and/or magnetic fields extend in the direction of propagation, and the electric and magnetic fields extend radially outwards while the guided wave propagates along the wire. This guided wave mode can be donut shaped, where few of the electromagnetic fields exist within the dielectric waveguide 204 or wire 202. Waves 206 and 208 can comprise a fundamental TEM mode where the fields extend radially outwards, and also comprise other, non-fundamental (e.g., asymmetric, higher-level, etc.) modes. While particular wave propagation modes are discussed above, other wave propagation modes are likewise possible such as transverse electric (TE) and transverse magnetic (TM) modes, based on the frequencies employed, the design of the dielectric waveguide 204, the dimensions and composition of the wire 202, as well as its surface characteristics, its optional insulation, the electromagnetic properties of the surrounding environment, etc. It should be noted that, depending on the frequency, the electrical and physical characteristics of the wire 202 and the particular wave propagation modes that are generated, the guided wave 208 can travel along the conductive surface of an oxidized uninsulated wire, an unoxidized uninsulated wire, an insulated wire and/or along the insulating surface of an insulated wire.

In an example embodiment, a diameter of the dielectric waveguide 204 is smaller than the diameter of the wire 202. For the millimeter-band wavelength being used, the dielectric waveguide 204 supports a single waveguide mode that makes up wave 206. This single waveguide mode can change as it couples to the wire 202 as surface wave 208. If the dielectric waveguide 204 were larger, more than one waveguide mode can be supported, but these additional waveguide modes may not couple to the wire 202 as efficiently, and higher coupling losses can result. However, in some alternative embodiments, the diameter of the dielectric waveguide 204 can be equal to or larger than the diameter of the wire 202, for example, where higher coupling losses are desirable or when used in conjunction with other techniques to otherwise reduce coupling losses (e.g., impedance matching with tapering, etc.).

In an example embodiment, the wavelength of the waves 206 and 208 are comparable in size, or smaller than a circumference of the dielectric waveguide 204 and the wire 202. In an example, if the wire 202 has a diameter of 0.5 cm, and a corresponding circumference of around 1.5 cm, the wavelength of the transmission is around 1.5 cm or less, corresponding to a frequency of 20 GHz or greater. In another embodiment, a suitable frequency of the transmission and the carrier-wave signal is in the range of 30-100 GHz, perhaps around 30-60 GHz, and around 38 GHz in one example. In an example embodiment, when the circumference of the dielectric waveguide 204 and wire 202 is comparable in size to, or greater, than a wavelength of the transmission, the waves 206 and 208 can exhibit multiple wave propagation modes including fundamental and/or non-fundamental (symmetric and/or asymmetric) modes that propagate over sufficient distances to support various communication systems described herein. The waves 206 and 208 can therefore comprise more than one type of electric and magnetic field configuration. In an example embodiment, as the guided wave 208 propagates down the wire 202, the electrical and magnetic field configurations will remain the same from end to end of the wire 202. In other embodiments, as the guided wave 208 encounters interference or loses energy due to transmission losses, the electric and magnetic field configurations can change as the guided wave 208 propagates down wire 202.

In an example embodiment, the dielectric waveguide 204 can be composed of nylon, Teflon, polyethylene, a polyamide, or other plastics. In other embodiments, other dielectric materials are possible. The wire surface of wire 202 can be metallic with either a bare metallic surface, or can be insulated using plastic, dielectric, insulator or other sheathing. In an example embodiment, a dielectric or otherwise non-conducting/insulated waveguide can be paired with either a bare/metallic wire or insulated wire. In other embodiments, a metallic and/or conductive waveguide can be paired with a bare/metallic wire or insulated wire. In an example embodiment, an oxidation layer on the bare metallic surface of the wire 202 (e.g., resulting from exposure of the bare metallic surface to oxygen/air) can also provide insulating or dielectric properties similar to those provided by some insulators or sheathings.

It is noted that the graphical representations of waves 206, 208 and 210 are presented merely to illustrate the principles that wave 206 induces or otherwise launches a guided wave 208 on a wire 202 that operates, for example, as a single wire transmission line. Wave 210 represents the portion of wave 206 that remains on the dielectric waveguide 204 after the generation of guided wave 208. The actual electric and magnetic fields generated as a result of such wave propagation may vary depending on the frequencies employed, the particular wave propagation mode or modes, the design of the dielectric waveguide 204, the dimensions and composition of the wire 202, as well as its surface characteristics, its optional insulation, the electromagnetic properties of the surrounding environment, etc.

It is noted that dielectric waveguide 204 can include a termination circuit or damper 214 at the end of the dielectric waveguide 204 that can absorb leftover radiation or energy from wave 210. The termination circuit or damper 214 can prevent and/or minimize the leftover radiation from wave 210 reflecting back toward transmitter circuit 212. In an example embodiment, the termination circuit or damper 214 can include termination resistors, and/or other components that perform impedance matching to attenuate reflection. In some embodiments, if the coupling efficiencies are high enough, and/or wave 210 is sufficiently small, it may not be necessary to use a termination circuit or damper 214. For the sake of simplicity, these transmitter and termination circuits or dampers 212 and 214 are not depicted in the other figures, but in those embodiments, transmitter and termination circuits or dampers may possibly be used.

Further, while a single dielectric waveguide 204 is presented that generates a single guided wave 208, multiple dielectric waveguides 204 placed at different points along the wire 202 and/or at different azimuthal orientations about the wire can be employed to generate and receive multiple guided waves 208 at the same or different frequencies, at the same or different phases, and/or at the same or different wave propagation modes. The guided wave or waves 208 can be modulated to convey data via a modulation technique such as phase shift keying, frequency shift keying, quadrature amplitude modulation, amplitude modulation, multi-carrier modulation and via multiple access techniques such as frequency division multiplexing, time division multiplexing, code division multiplexing, multiplexing via differing wave propagation modes and via other modulation and access strategies.

Figure 3:
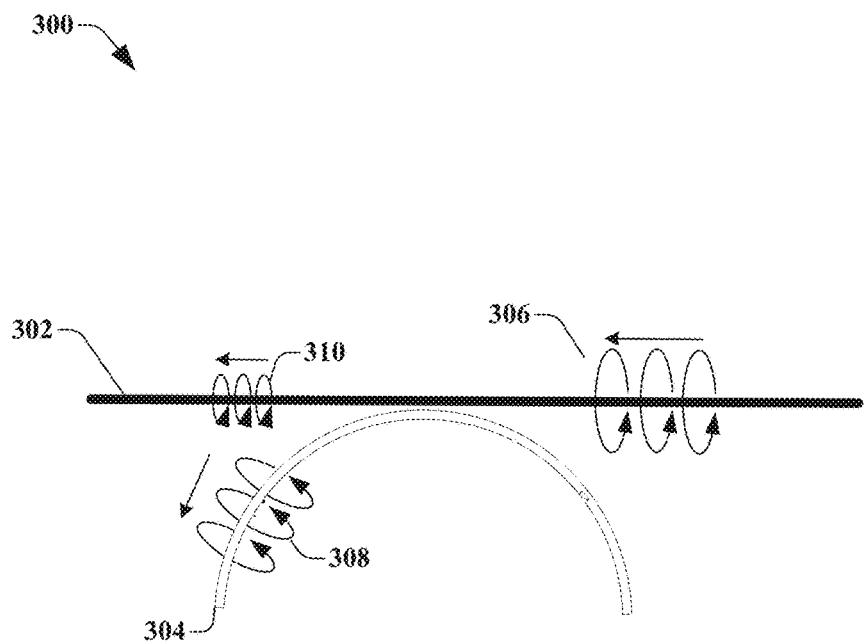
FIG. 3 is a block diagram illustrating an example, non-limiting embodiment of a dielectric waveguide coupler in accordance with various aspects described herein.

Turning now to FIG. 3, illustrated is a block diagram of an example, non-limiting embodiment of a dielectric waveguide coupling system 300 in accordance with various aspects described herein. System 300 implements a coupler that comprises a dielectric waveguide 304 and a wire 302 that has a wave 306 propagating as a guided wave about a wire surface of the wire 302. In an example embodiment, the wave 306 can be characterized as a surface wave or other electromagnetic wave.

In an example embodiment, the dielectric waveguide 304 is curved or otherwise has a curvature, and can be placed near a wire 302 such that a portion of the curved dielectric waveguide 304 is parallel or substantially parallel to the wire 302. The portion of the dielectric waveguide 304 that is parallel to the wire can be an apex of the curve, or any point where a tangent of the curve is parallel to the wire 302. When the dielectric waveguide 304 is near the wire, the guided wave 306 travelling along the wire 302 can couple to the dielectric waveguide 304 and propagate as guided wave 308 about the dielectric waveguide 304. A portion of the guided wave 306 that does not couple to the dielectric waveguide 304 propagates as guided wave 310 (e.g., surface wave or other electromagnetic wave) along the wire 302.

The guided waves 306 and 308 stay parallel to the wire 302 and dielectric waveguide 304, respectively, even as the wire 302 and dielectric waveguide 304 bend and flex. Bends can increase transmission losses, which are also dependent on wire diameters, frequency, and materials. If the dimensions of the dielectric waveguide 304 are chosen for efficient power transfer, most of the energy in the guided wave 306 is coupled to the dielectric waveguide 304 and little remains in guided wave 310.

In an example embodiment, a receiver circuit can be placed on the end of waveguide 304 in order to receive wave 308. A termination circuit can be placed on the opposite end of the waveguide 304 in order to receive guided waves traveling in the opposite direction to guided wave 306 that couple to the waveguide 304. The termination circuit would thus prevent and/or minimize reflections being received by the receiver circuit. If the reflections are small, the termination circuit may not be necessary.

It is noted that the dielectric waveguide 304 can be configured such that selected polarizations of the surface wave 306 are coupled to the dielectric waveguide 304 as guided wave 308. For instance, if guided wave 306 is made up of guided waves or wave propagation modes with respective polarizations, dielectric waveguide 304 can be configured to receive one or more guided waves of selected polarization(s). Guided wave 308 that couples to the dielectric waveguide 304 is thus the set of guided waves that correspond to one or more of the selected polarization(s), and further guided wave 310 can comprise the guided waves that do not match the selected polarization(s).

The dielectric waveguide 304 can be configured to receive guided waves of a particular polarization based on an angle/rotation around the wire 302 that the dielectric waveguide 304 is placed (the azimuthal orientation of the coupler) and the azimuthal pattern of the field structure of the guided waves. For instance, if the coupler is oriented to feed the guided waves along the horizontal access and if the guided wave 306 is polarized horizontally (i.e., the filed structure of the guided waves are concentrated on the horizontal axis), most of the guided wave 306 transfers to the dielectric waveguide as wave 308. In another instance, if the dielectric waveguide 304 is rotated 90 degrees around the wire 302, most of the energy from guided wave 306 would remain coupled to the wire as guided wave 310, and only a small portion would couple to the wire 302 as wave 308.

It is noted that waves 306, 308, and 310 are shown using three circular symbols in FIG. 3 and in other figures in the specification. These symbols are used to represent a general guided wave, but do not imply that the waves 306, 308, and 310 are necessarily circularly polarized or otherwise circularly oriented. In fact, waves 306, 308, and 310 can comprise a fundamental TEM mode where the fields extend radially outwards, and also comprise other, non-fundamental (e.g. higher-level, etc.) modes. These modes can be asymmetric (e.g., radial, bilateral, trilateral, quadrilateral, etc,) in nature as well.

It is noted also that guided wave communications over wires can be full duplex, allowing simultaneous communications in both directions. Waves traveling one direction can pass through waves traveling in an opposite direction. Electromagnetic fields may cancel out at certain points and for short times due to the superposition principle as applied to waves. The waves traveling in opposite directions propagate as if the other waves weren't there, but the composite effect to an observer may be a stationary standing wave pattern. As the guided waves pass through each other and are no longer in a state of superposition, the interference subsides. As a guided wave (e.g., surface wave or other electromagnetic wave) couples to a waveguide and moves away from the wire, any interference due to other guided waves (e.g., surface waves or other electromagnetic waves) decreases. In an example embodiment, as guided wave 306 (e.g., surface wave or other electromagnetic wave) approaches dielectric waveguide 304, another guided wave (e.g., surface wave or other electromagnetic wave) (not shown) traveling from left to right on the wire 302 passes by causing local interference. As guided wave 306 couples to dielectric waveguide 304 as wave 308, and moves away from the wire 302, any interference due to the passing guided wave subsides.

It is noted that the graphical representations of electromagnetic waves 306, 308 and 310 are presented merely to illustrate the principles that guided wave 306 induces or otherwise launches a wave 308 on a dielectric waveguide 304. Guided wave 310 represents the portion of guided wave 306 that remains on the wire 302 after the generation of wave 308. The actual electric and magnetic fields generated as a result of such guided wave propagation may vary depending on one or more of the shape and/or design of the dielectric waveguide, the relative position of the dielectric waveguide to the wire, the frequencies employed, the design of the dielectric waveguide 304, the dimensions and composition of the wire 302, as well as its surface characteristics, its optional insulation, the electromagnetic properties of the surrounding environment, etc.

Figure 4:
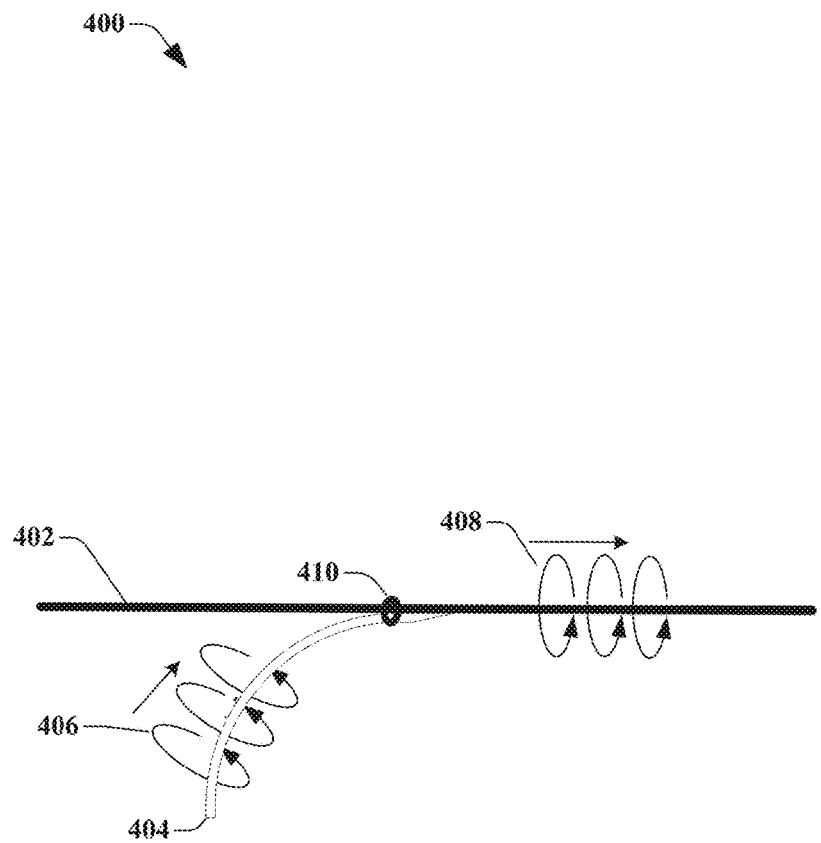
FIG. 4 is a block diagram illustrating an example, non-limiting embodiment of a dielectric waveguide coupler in accordance with various aspects described herein.

Turning now to FIG. 4, illustrated is a block diagram of an example, non-limiting embodiment of a dielectric waveguide coupling system 400 in accordance with various aspects described herein. System 400 implements a coupler that comprises a dielectric waveguide 404 that has a wave 406 propagating as a guided wave about a waveguide surface of the dielectric waveguide 404. In an example embodiment, the dielectric waveguide 404 is curved, and an end of the dielectric waveguide 404 can be tied, fastened, or otherwise mechanically coupled to a wire 402. When the end of the dielectric waveguide 404 is fastened to the wire 402, the end of the dielectric waveguide 404 is parallel or substantially parallel to the wire 402. Alternatively, another portion of the dielectric waveguide beyond an end can be fastened or coupled to wire 402 such that the fastened or coupled portion is parallel or substantially parallel to the wire 402. The coupling device 410 can be a nylon cable tie or other type of non-conducting/dielectric material that is either separate from the dielectric waveguide 404 or constructed as an integrated component of the dielectric waveguide 404. In other embodiments, the dielectric waveguide 404 can be mechanically uncoupled from the wire 402 leaving an air gap between the coupler and the wire 402. The dielectric waveguide 404 can be adjacent to the wire 402 without surrounding the wire 402.

When the dielectric waveguide 404 is placed with the end parallel to the wire 402, the guided wave 406 travelling along the dielectric waveguide 404 couples to the wire 402, and propagates as guided wave 408 about the wire surface of the wire 402. In an example embodiment, the guided wave 408 can be characterized as a surface wave or other electromagnetic wave.

It is noted that the graphical representations of waves 406 and 408 are presented merely to illustrate the principles that wave 406 induces or otherwise launches a guided wave 408 on a wire 402 that operates, for example, as a single wire transmission line. The actual electric and magnetic fields generated as a result of such wave propagation may vary depending on one or more of the shape and/or design of the dielectric waveguide, the relative position of the dielectric waveguide to the wire, the frequencies employed, the design of the dielectric waveguide 404, the dimensions and composition of the wire 402, as well as its surface characteristics, its optional insulation, the electromagnetic properties of the surrounding environment, etc.

In an example embodiment, an end of dielectric waveguide 404 can taper towards the wire 402 in order to increase coupling efficiencies. Indeed, the tapering of the end of the dielectric waveguide 404 can provide impedance matching to the wire 402, according to an example embodiment of the subject disclosure. For example, an end of the dielectric waveguide 404 can be gradually tapered in order to obtain a desired level of coupling between waves 406 and 408 as illustrated in FIG. 4.

In an example embodiment, the coupling device 410 can be placed such that there is a short length of the dielectric waveguide 404 between the coupling device 410 and an end of the dielectric waveguide 404. Maximum coupling efficiencies are realized when the length of the end of the dielectric waveguide 404 that is beyond the coupling device 410 is at least several wavelengths long for whatever frequency is being transmitted, however shorter lengths are also possible.

Figure 5:
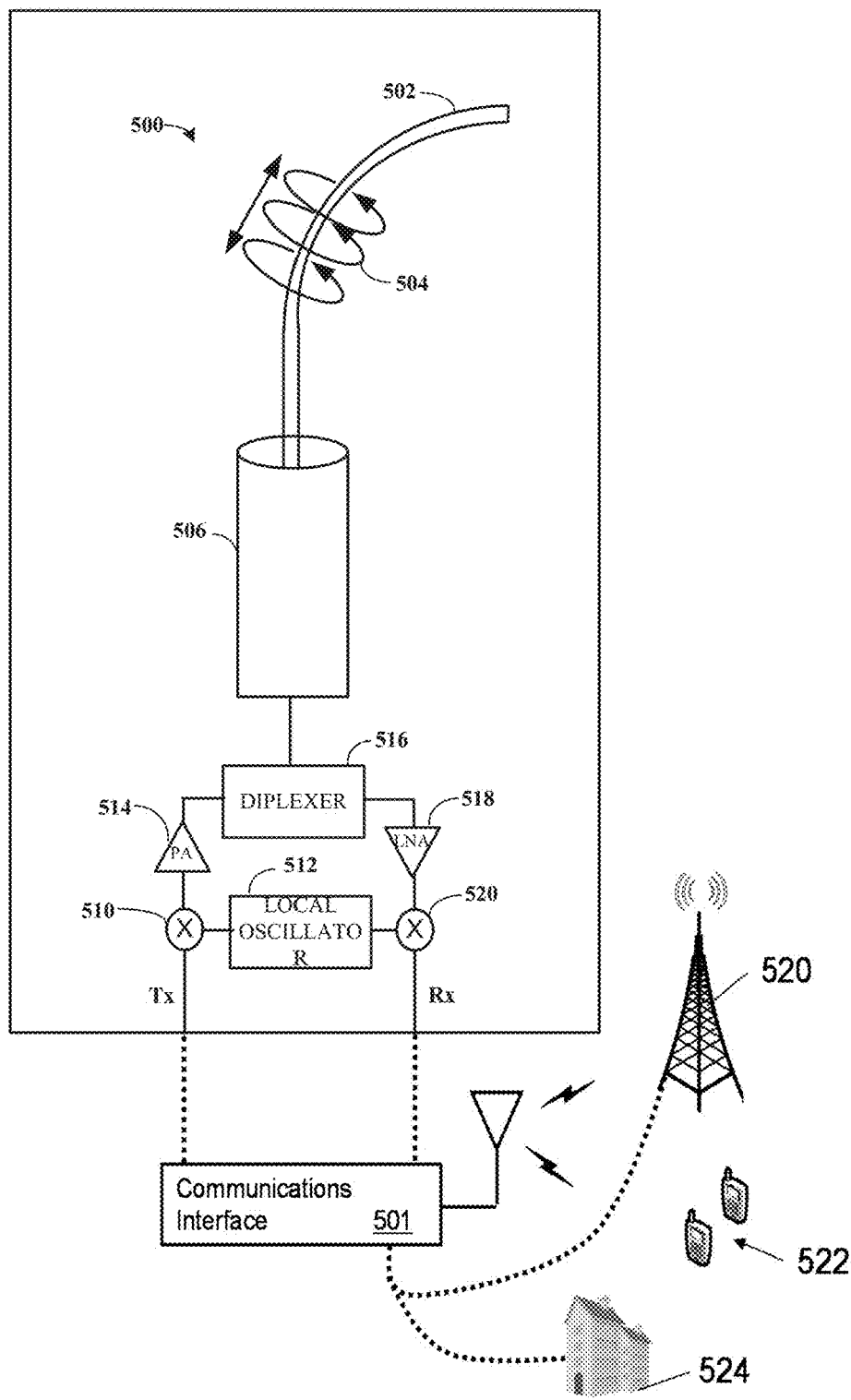
FIG. 5 is a block diagram illustrating an example, non-limiting embodiment of a dielectric waveguide coupler and transceiver in accordance with various aspects described herein.

Turning now to FIG. 5, illustrated is a block diagram of an example, non-limiting embodiment of a dielectric waveguide coupler and transceiver system 500 (referred to herein collectively as system 500) in accordance with various aspects described herein. System 500 implements a transmission device with a coupler that comprises a transmitter/receiver device 506 that launches and receives waves (e.g., guided wave 504 onto dielectric waveguide 502). The guided waves 504 can be used to transport signals received from and sent to a base station device 508, mobile devices 522, or a building 524 by way of a communications interface 501. The communications interface 501 can be an integral part of system 500. Alternatively, the communications interface 501 can be tethered to system 500. The communications interface 501 can comprise a wireless interface for interfacing to the base station 508, the mobile devices 522, or building 524 utilizing any of various wireless signaling protocols (e.g., LTE, WiFi, WiMAX, etc.). The communications interface 501 can also comprise a wired interface such as a fiber optic line, coaxial cable, twisted pair, or other suitable wired mediums for transmitting signals to the base station 508 or building 524. For embodiments where system 500 functions as a repeater, the communications interface 501 may not be necessary.

The output signals (e.g., TX) of the communications interface 501 can be combined with a millimeter-wave carrier wave generated by a local oscillator 512 at frequency mixer 510. Frequency mixer 510 can use heterodyning techniques or other frequency shifting techniques to frequency shift the output signals from communications interface 501. For example, signals sent to and from the communications interface 501 can be modulated signals such as orthogonal frequency division multiplexed (OFDM) signals formatted in accordance with a Long-Term Evolution (LTE) wireless protocol or other wireless 3G, 4G, 5G or higher voice and data protocol, a Zigbee, WIMAX, UltraWideband or IEEE 802.11 wireless protocol or other wireless protocol. In an example embodiment, this frequency conversion can be done in the analog domain, and as a result, the frequency shifting can be done without regard to the type of communications protocol that the base station 508, mobile devices 522, or in-building devices 524 use. As new communications technologies are developed, the communications interface 501 can be upgraded or replaced and the frequency shifting and transmission apparatus can remain, simplifying upgrades. The carrier wave can then be sent to a power amplifier ("PA") 514 and can be transmitted via the transmitter receiver device 506 via the diplexer 516.

Signals received from the transmitter/receiver device 506 that are directed towards the communications interface 501 can be separated from other signals via diplexer 516. The transmission can then be sent to low noise amplifier ("LNA") 518 for amplification. A frequency mixer 520, with help from local oscillator 512 can downshift the transmission (which is in the millimeter-wave band or around 38 GHz in some embodiments) to the native frequency. The communications interface 501 can then receive the transmission at an input port (RX).

In an embodiment, transmitter/receiver device 506 can include a cylindrical or non-cylindrical metal (which, for example, can be hollow in an embodiment, but not necessarily drawn to scale) or other conducting or non-conducting waveguide and an end of the dielectric waveguide 502 can be placed in or in proximity to the waveguide or the transmitter/receiver device 506 such that when the transmitter/receiver device 506 generates a transmission, the guided wave couples to dielectric waveguide 502 and propagates as a guided wave 504 about the waveguide surface of the dielectric waveguide 502. In some embodiments, the guided wave 504 can propagate in part on the outer surface of the dielectric waveguide 502 and in part inside the dielectric waveguide 502. In other embodiments, the guided wave 504 can propagate substantially or completely on the outer surface of the dielectric waveguide 502. In yet other embodiments, the guided wave 504 can propagate substantially or completely inside the dielectric waveguide 502. In this latter embodiment, the guide wave 504 can radiate at an end of the dielectric waveguide 502 (such as the tapered end shown in FIG. 4) for coupling to a transmission medium such as a wire 402 of FIG. 4. Similarly, if guided wave 504 is incoming (coupled to the dielectric waveguide 502 from a wire), guided wave 504 then enters the transmitter/receiver device 506 and couples to the cylindrical waveguide or conducting waveguide. While transmitter/receiver device 506 is shown to include a separate waveguide—an antenna, cavity resonator, klystron, magnetron, travelling wave tube, or other radiating element can be employed to induce a guided wave on the waveguide 502, without the separate waveguide.

In an embodiment, dielectric waveguide 502 can be wholly constructed of a dielectric material (or another suitable insulating material), without any metallic or otherwise conducting materials therein. Dielectric waveguide 502 can be composed of nylon, Teflon, polyethylene, a polyamide, other plastics, or other materials that are non-conducting and suitable for facilitating transmission of electromagnetic waves at least in part on an outer surface of such materials. In another embodiment, dielectric waveguide 502 can include a core that is conducting/metallic, and have an exterior dielectric surface. Similarly, a transmission medium that couples to the dielectric waveguide 502 for propagating electromagnetic waves induced by the dielectric waveguide 502 or for supplying electromagnetic waves to the dielectric waveguide 502 can be wholly constructed of a dielectric material (or another suitable insulating material), without any metallic or otherwise conducting materials therein.

It is noted that although FIG. 5A shows that the opening of transmitter receiver device 506 is much wider than the dielectric waveguide 502, this is not to scale, and that in other embodiments the width of the dielectric waveguide 502 is comparable or slightly smaller than the opening of the hollow waveguide. It is also not shown, but in an embodiment, an end of the waveguide 502 that is inserted into the transmitter/receiver device 506 tapers down in order to reduce reflection and increase coupling efficiencies.

The transmitter/receiver device 506 can be communicably coupled to a communications interface 501, and alternatively, transmitter/receiver device 506 can also be communicably coupled to the one or more distributed antennas 112 and 114 shown in FIG. 1. In other embodiments, transmitter receiver device 506 can comprise part of a repeater system for a backhaul network.

Before coupling to the dielectric waveguide 502, the one or more waveguide modes of the guided wave generated by the transmitter/receiver device 506 can couple to the dielectric waveguide 502 to induce one or more wave propagation modes of the guided wave 504. The wave propagation modes of the guided wave 504 can be different than the hollow metal waveguide modes due to the different characteristics of the hollow metal waveguide and the dielectric waveguide. For instance, wave propagation modes of the guide wave 504 can comprise the fundamental transverse electromagnetic mode (Quasi-TEM$_{00}$), where only small electrical and/or magnetic fields extend in the direction of propagation, and the electric and magnetic fields extend radially outwards from the dielectric waveguide 502 while the guided waves propagate along the dielectric waveguide 502. The fundamental transverse electromagnetic mode wave propagation mode may not exist inside a waveguide that is hollow. Therefore, the hollow metal waveguide modes that are used by transmitter/receiver device 506 are waveguide modes that can couple effectively and efficiently to wave propagation modes of dielectric waveguide 502.

Figure 6:
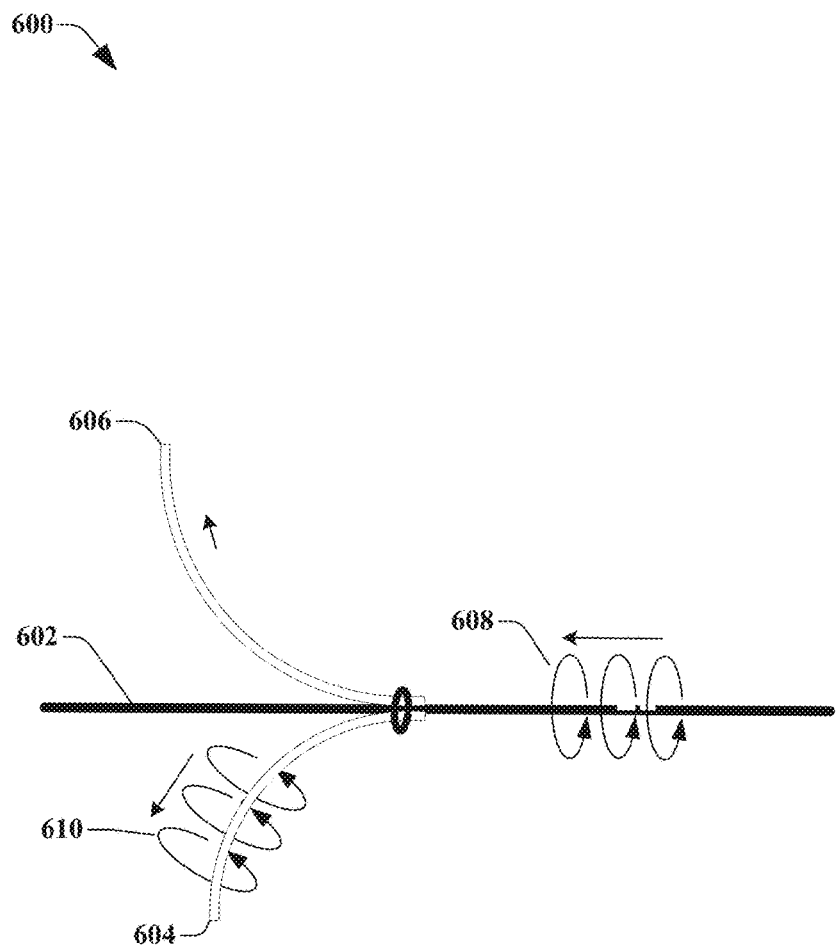
FIG. 6 is a block diagram illustrating an example, non-limiting embodiment of a dual dielectric waveguide coupler in accordance with various aspects described herein.

Turning now to FIG. 6, illustrated is a block diagram illustrating an example, non-limiting embodiment of a dual dielectric waveguide coupling system 600 in accordance with various aspects described herein. In an example embodiment, a coupling module is shown with two or more dielectric waveguides (e.g., 604 and 606) positioned around a wire 602 in order to receive guided wave 608. In an example embodiment, the guided wave 608 can be characterized as a surface wave or other electromagnetic wave. In an example embodiment, one dielectric waveguide is enough to receive the guided wave 608. In that case, guided wave 608 couples to dielectric waveguide 604 and propagates as guided wave 610. If the field structure of the guided wave 608 oscillates or undulates around the wire 602 due to various outside factors, then dielectric waveguide 606 can be placed such that guided wave 608 couples to dielectric waveguide 606. In some embodiments, four or more dielectric waveguides can be placed around a portion of the wire 602, e.g., at 90 degrees or another spacing with respect to each other, in order to receive guided waves that may oscillate or rotate around the wire 602, that have been induced at different azimuthal orientations or that have non-fundamental or higher order modes that, for example, have lobes and/or nulls or other asymmetries that are orientation dependent. However, it will be appreciated that there may be less than or more than four dielectric waveguides placed around a portion of the wire 602 without departing from example embodiments. It will also be appreciated that while some example embodiments have presented a plurality of dielectric waveguides around at least a portion of a wire 602, this plurality of dielectric waveguides can also be considered as part of a single dielectric waveguide system having multiple dielectric waveguide subcomponents. For example, two or more dielectric waveguides can be manufactured as single system that can be installed around a wire in a single installation such that the dielectric waveguides are either pre-positioned or adjustable relative to each other (either manually or automatically) in accordance with the single system. Receivers coupled to dielectric waveguides 606 and 604 can use diversity combining to combine signals received from both dielectric waveguides 606 and 604 in order to maximize the signal quality. In other embodiments, if one or the other of a dielectric waveguide 604 and 606 receives a transmission that is above a predetermined threshold, receivers can use selection diversity when deciding which signal to use.

It is noted that the graphical representations of waves 608 and 610 are presented merely to illustrate the principles that guided wave 608 induces or otherwise launches a wave 610 on a dielectric waveguide 604. The actual electric and magnetic fields generated as a result of such wave propagation may vary depending on the frequencies employed, the design of the dielectric waveguide 604, the dimensions and composition of the wire 602, as well as its surface characteristics, its optional insulation, the electromagnetic properties of the surrounding environment, etc.

Figure 7:
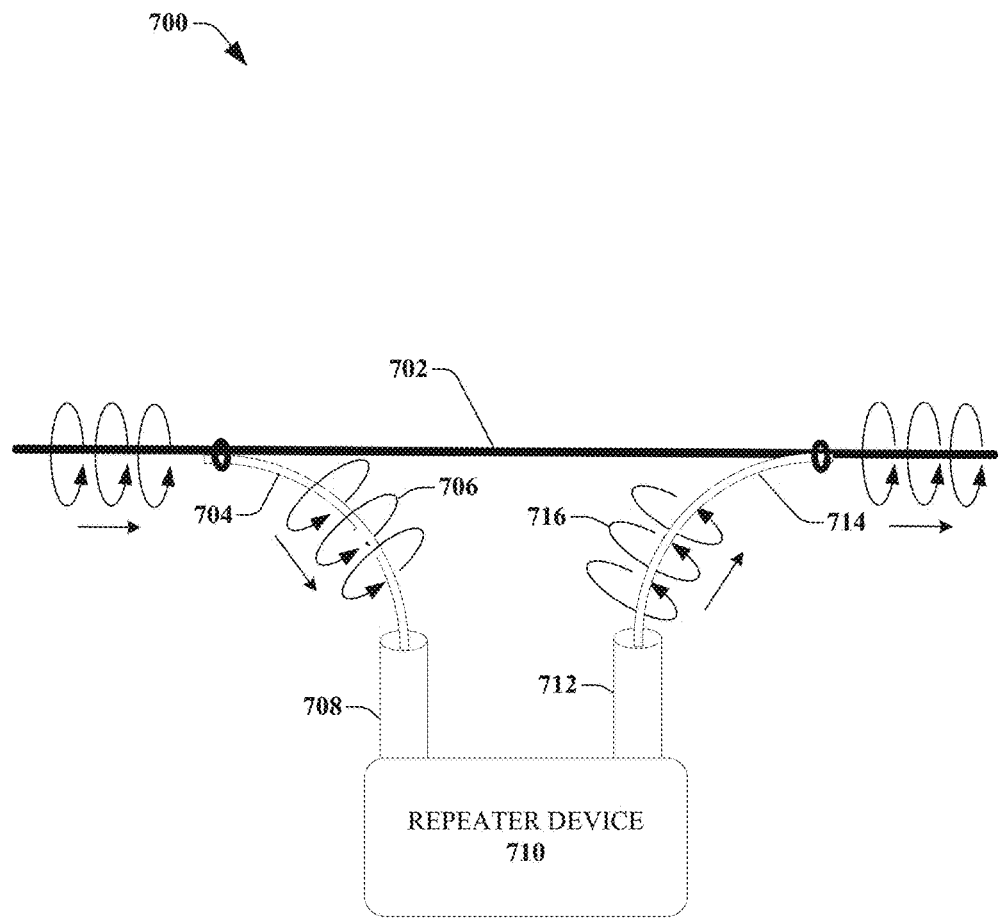
FIG. 7 is a block diagram illustrating an example, non-limiting embodiment of a bidirectional dielectric waveguide coupler in accordance with various aspects described herein.

Turning now to FIG. 7, illustrated is a block diagram of an example, non-limiting embodiment of a bidirectional dielectric waveguide coupling system 700 in accordance with various aspects described herein. Such a system 700 implements a transmission device with a coupling module that includes two dielectric waveguides 704 and 714 can be placed near a wire 702 such that guided waves (e.g., surface waves or other electromagnetic waves) propagating along the wire 702 are coupled to dielectric waveguide 704 as wave 706, and then are boosted or repeated by repeater device 710 and launched as a guided wave 716 onto dielectric waveguide 714. The guided wave 716 can then couple to wire 702 and continue to propagate along the wire 702. In an example embodiment, the repeater device 710 can receive at least a portion of the power utilized for boosting or repeating through magnetic coupling with the wire 702, which can be a power line.

In some embodiments, repeater device 710 can repeat the transmission associated with wave 706, and in other embodiments, repeater device 710 can be associated with a distributed antenna system and/or base station device located near the repeater device 710. Receiver waveguide 708 can receive the wave 706 from the dielectric waveguide 704 and transmitter waveguide 712 can launch guided wave 716 onto dielectric waveguide 714. Between receiver waveguide 708 and transmitter waveguide 712, the signal can be amplified to correct for signal loss and other inefficiencies associated with guided wave communications or the signal can be received and processed to extract the data contained therein and regenerated for transmission. In an example embodiment, a signal can be extracted from the transmission and processed and otherwise emitted to mobile devices nearby via distributed antennas communicably coupled to the repeater device 710. Similarly, signals and/or communications received by the distributed antennas can be inserted into the transmission that is generated and launched onto dielectric waveguide 714 by transmitter waveguide 712. Accordingly, the repeater system 700 depicted in FIG. 7 can be comparable in function to the dielectric waveguide coupling device 108 and 110 in FIG. 1.

It is noted that although FIG. 7 shows guided wave transmissions 706 and 716 entering from the left and exiting to the right respectively, this is merely a simplification and is not intended to be limiting. In other embodiments, receiver waveguide 708 and transmitter waveguide 712 can also function as transmitters and receivers respectively, allowing the repeater device 710 to be bi-directional.

In an example embodiment, repeater device 710 can be placed at locations where there are discontinuities or obstacles on the wire 702. These obstacles can include transformers, connections, utility poles, and other such power line devices. The repeater device 710 can help the guided (e.g., surface) waves jump over these obstacles on the line and boost the transmission power at the same time. In other embodiments, a dielectric waveguide can be used to jump over the obstacle without the use of a repeater device. In that embodiment, both ends of the dielectric waveguide can be tied or fastened to the wire, thus providing a path for the guided wave to travel without being blocked by the obstacle.

Figure 8:
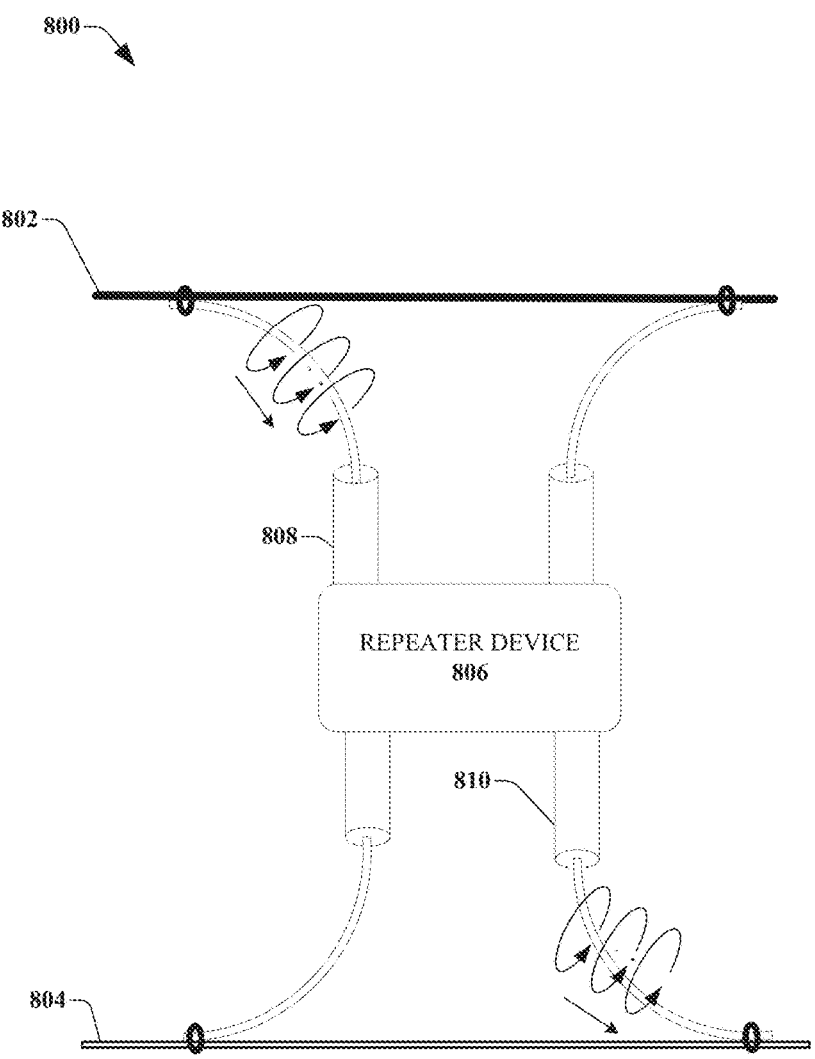
FIG. 8 illustrates a block diagram illustrating an example, non-limiting embodiment of a bidirectional dielectric waveguide coupler in accordance with various aspects described herein.

Turning now to FIG. 8, illustrated is a block diagram of an example, non-limiting embodiment of a bidirectional dielectric waveguide coupler 800 in accordance with various aspects described herein. The bidirectional dielectric waveguide coupler 800 implements a transmission device with a coupling module that can employ diversity paths in the case of when two or more wires are strung between utility poles. Since guided wave transmissions have different transmission efficiencies and coupling efficiencies for insulated wires and un-insulated wires based on weather, precipitation and atmospheric conditions, it can be advantageous to selectively transmit on either an insulated wire or un-insulated wire at certain times.

In the embodiment shown in FIG. 8, the repeater device uses a receiver waveguide 808 to receive a guided wave traveling along uninsulated wire 802 and repeats the transmission using transmitter waveguide 810 as a guided wave along insulated wire 804. In other embodiments, repeater device can switch from the insulated wire 804 to the un-insulated wire 802, or can repeat the transmissions along the same paths. Repeater device 806 can include sensors, or be in communication with sensors that indicate conditions that can affect the transmission. Based on the feedback received from the sensors, the repeater device 806 can make the determination about whether to keep the transmission along the same wire, or transfer the transmission to the other wire.

Figure 9:
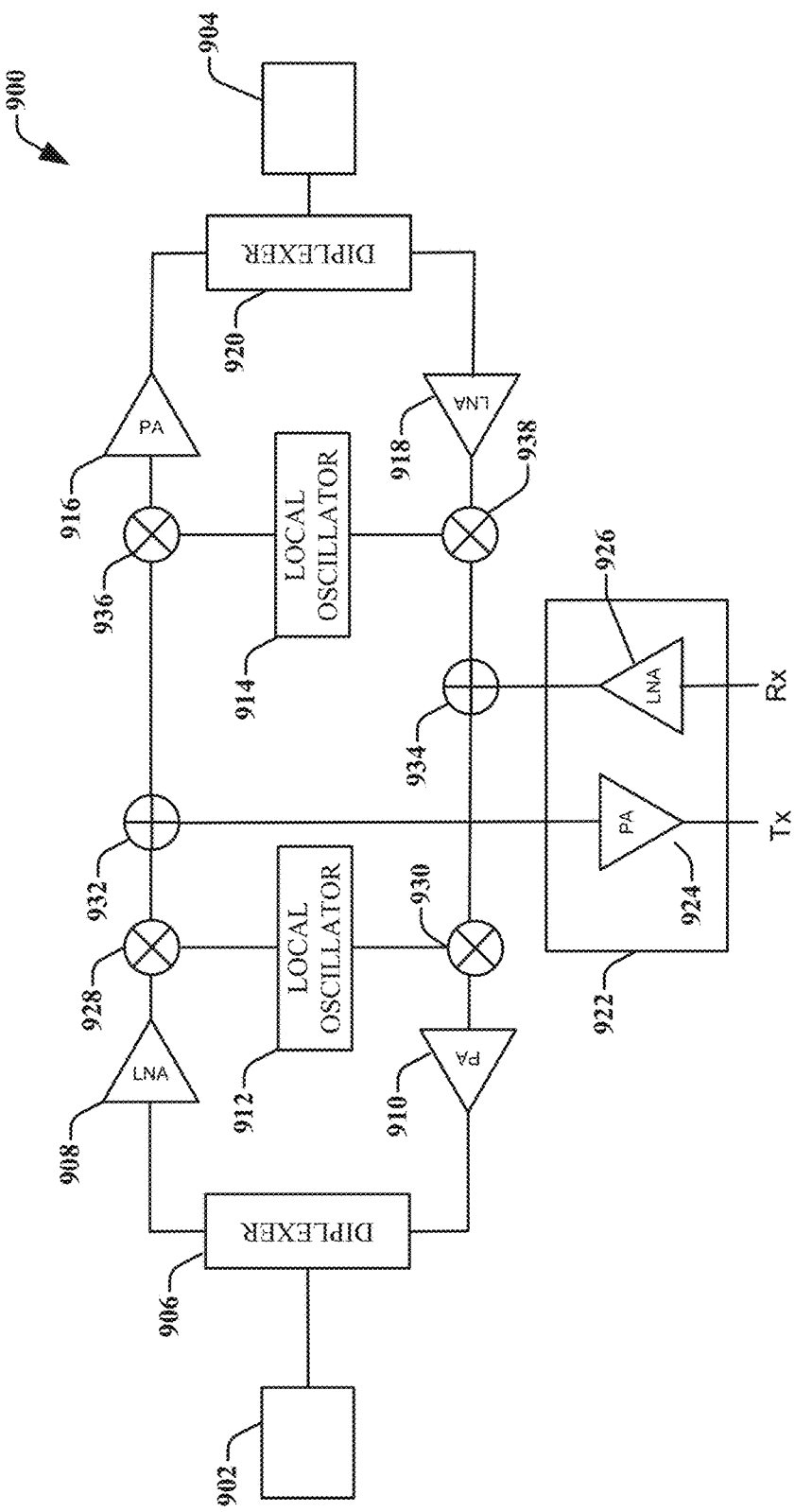
FIG. 9 illustrates a block diagram illustrating an example, non-limiting embodiment of a bidirectional repeater system in accordance with various aspects described herein.

Turning now to FIG. 9, illustrated is a block diagram illustrating an example, non-limiting embodiment of a bidirectional repeater system 900. Bidirectional repeater system 900 implements a transmission device with a coupling module that includes waveguide coupling devices 902 and 904 that receive and transmit transmissions from other coupling devices located in a distributed antenna system or backhaul system.

In various embodiments, waveguide coupling device 902 can receive a transmission from another waveguide coupling device, wherein the transmission has a plurality of subcarriers. Diplexer 906 can separate the transmission from other transmissions, for example by filtration, and direct the transmission to low-noise amplifier ("LNA") 908. A frequency mixer 928, with help from a local oscillator 912, can downshift the transmission (which is in the millimeter-wave band or around 38 GHz in some embodiments) to a lower frequency, whether it is a cellular band (~1.9 GHz) for a distributed antenna system, a native frequency, or other frequency for a backhaul system. An extractor 932 can extract the signal on the subcarrier that corresponds to the antenna or other output component 922 and direct the signal to the output component 922. For the signals that are not being extracted at this antenna location, extractor 932 can redirect them to another frequency mixer 936, where the signals are used to modulate a carrier wave generated by local oscillator 914. The carrier wave, with its subcarriers, is directed to a power amplifier ("PA") 916 and is retransmitted by waveguide coupling device 904 to another repeater system, via diplexer 920.

At the output device 922, a PA 924 can boost the signal for transmission to the mobile device. An LNA 926 can be used to amplify weak signals that are received from the mobile device and then send the signal to a multiplexer 934 which merges the signal with signals that have been received from waveguide coupling device 904. The output device 922 can be coupled to an antenna in a distributed antenna system or other antenna via, for example, a diplexer, duplexer or a transmit receive switch not specifically shown. The signals received from coupling device 904 have been split by diplexer 920, and then passed through LNA 918, and downshifted in frequency by frequency mixer 938. When the signals are combined by multiplexer 934, they are upshifted in frequency by frequency mixer 930, and then boosted by PA 910, and transmitted back to the launcher or on to another repeater by waveguide coupling device 902. In an example embodiment, the bidirectional repeater system 900 can be just a repeater without the antenna/output device 922. It will be appreciated that in some embodiments, a bidirectional repeater system 900 could also be implemented using two distinct and separate uni-directional repeaters. In an alternative embodiment, a bidirectional repeater system 900 could also be a booster or otherwise perform retransmissions without downshifting and upshifting. Indeed in example embodiment, the retransmissions can be based upon receiving a signal or guided wave and performing some signal or guided wave processing or reshaping, filtering, and/or amplification, prior to retransmission of the signal or guided wave.

Figure 10:
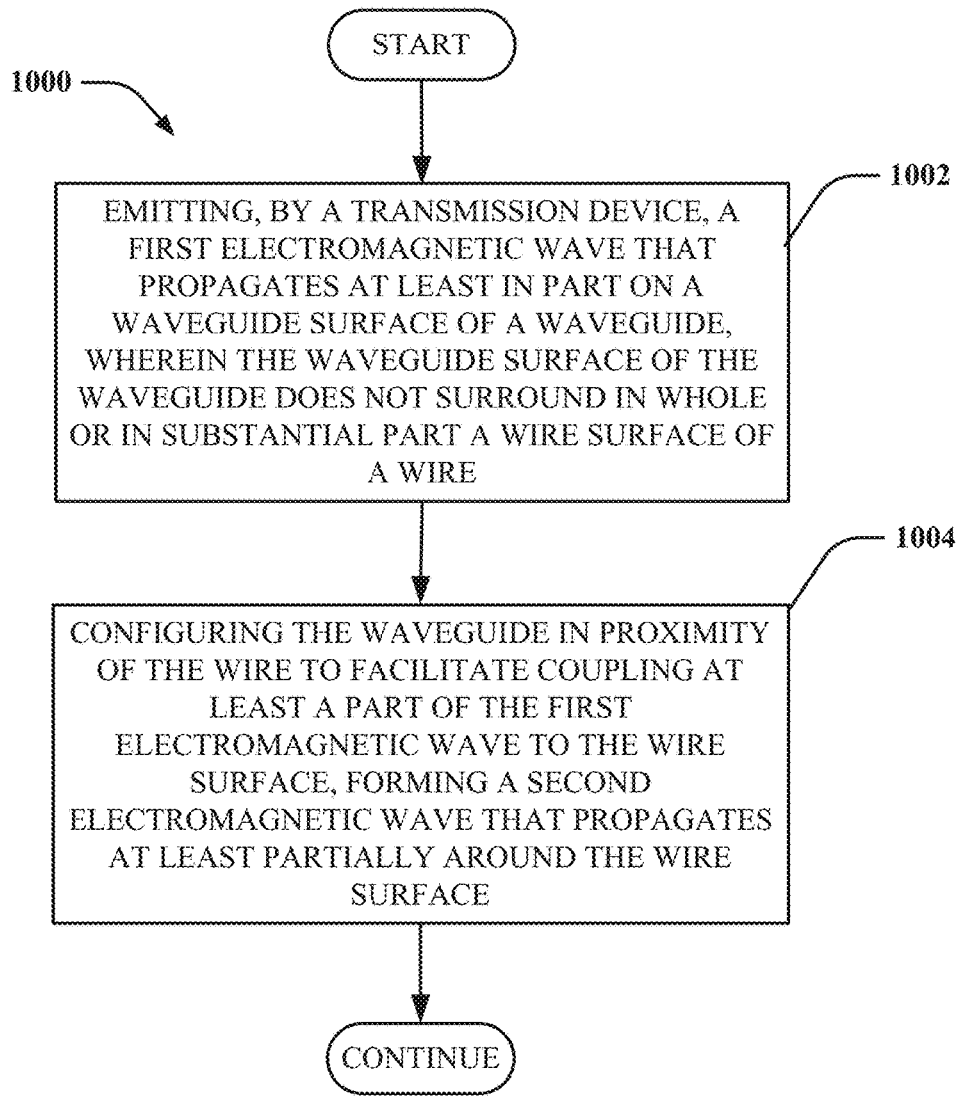
FIG. 10 illustrates a flow diagram of an example, non-limiting embodiment of a method for transmitting a transmission with a dielectric waveguide coupler as described herein.

FIG. 10 illustrates a process in connection with the aforementioned systems. The process in FIG. 10 can be implemented for example by systems 100, 200, 300, 400, 500, 600, 700, 800, and 900 illustrated in FIGS. 1-9 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 10 illustrates a flow diagram of an example, non-limiting embodiment of a method for transmitting a transmission with a dielectric waveguide coupler as described herein. Method 1000 can begin at 1002 where a first electromagnetic wave is emitted by a transmission device that propagates at least in part on a waveguide surface of a waveguide, wherein the waveguide surface of the waveguide does not surround in whole or in substantial part a wire surface of a wire. The transmission that is generated by a transmitter can be based on a signal received from a base station device, access point, network or a mobile device.

At 1004, based upon configuring the waveguide in proximity of the wire, the guided wave then couples at least a part of the first electromagnetic wave to a wire surface, forming a second electromagnetic wave (e.g., a surface wave) that propagates at least partially around the wire surface, wherein the wire is in proximity to the waveguide. This can be done in response to positioning a portion of the dielectric waveguide (e.g., a tangent of a curve of the dielectric waveguide) near and parallel to the wire, wherein a wavelength of the electromagnetic wave is smaller than a circumference of the wire and the dielectric waveguide. The guided wave, or surface wave, stays parallel to the wire even as the wire bends and flexes. Bends can increase transmission losses, which are also dependent on wire diameters, frequency, and materials. The coupling interface between the wire and the waveguide can also be configured to achieve the desired level of coupling, as described herein, which can include tapering an end of the waveguide to improve impedance matching between the waveguide and the wire.

The transmission that is emitted by the transmitter can exhibit one or more waveguide modes. The waveguide modes can be dependent on the shape and/or design of the waveguide. The propagation modes on the wire can be different than the waveguide modes due to the different characteristics of the waveguide and the wire. When the circumference of the wire is comparable in size to, or greater, than a wavelength of the transmission, the guided wave exhibits multiple wave propagation modes. The guided wave can therefore comprise more than one type of electric and magnetic field configuration. As the guided wave (e.g., surface wave) propagates down the wire, the electrical and magnetic field configurations may remain substantially the same from end to end of the wire or vary as the transmission traverses the wave by rotation, dispersion, attenuation or other effects.

Figure 11:
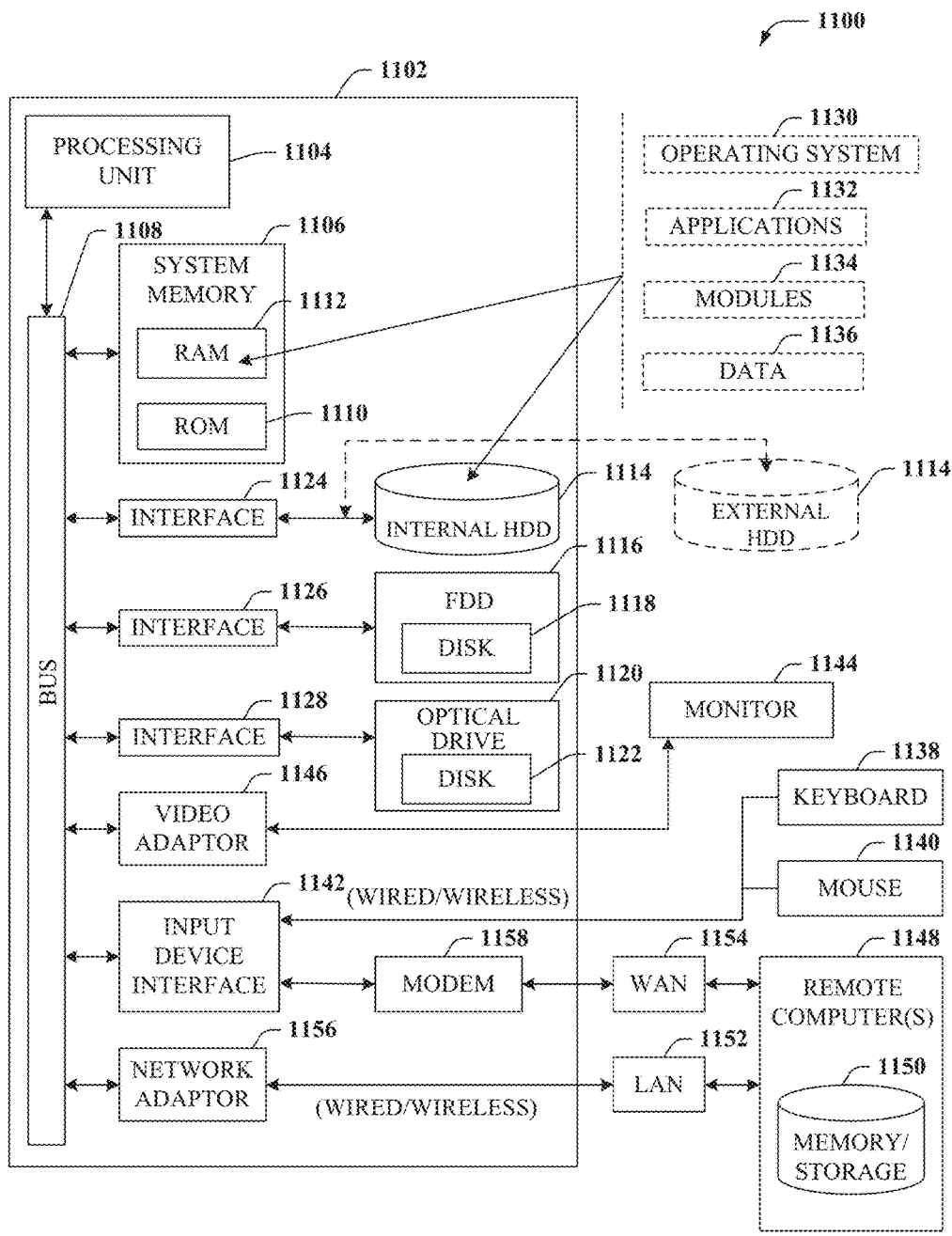
FIG. 11 is a block diagram of an example, non-limiting embodiment of a computing environment in accordance with various aspects described herein.

Referring now to FIG. 11, there is illustrated a block diagram of a computing environment in accordance with various aspects described herein. In order to provide additional context for various embodiments of the embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can be run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 11, the example environment 1100 for transmitting and receiving signals via base station (e.g., base station devices 104 and 508) and repeater devices (e.g., repeater devices 710, 806, and 900) comprises a computer 1102, the computer 1102 comprising a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems. Examples of application programs 1132 that can be implemented and otherwise executed by processing unit 1104 include the diversity selection determining performed by repeater device 806. Base station device 508 shown in FIG. 5, also has stored on memory many applications and programs that can be executed by processing unit 1104 in this exemplary computing environment 1100.

A user can enter commands and information into the computer 1102 through one or more wired/wireless input devices, e.g., a keyboard 1138 and a pointing device, such as a mouse 1140. Other input devices (not shown) can comprise a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a universal serial bus (USB) port, an IR interface, etc.

A monitor 1144 or other type of display device can be also connected to the system bus 1108 via an interface, such as a video adapter 1146. It will also be appreciated that in alternative embodiments, a monitor 1144 can also be any display device (e.g., another computer having a display, a smart phone, a tablet computer, etc.) for receiving display information associated with computer 1102 via any communication means, including via the Internet and cloud-based networks. In addition to the monitor 1144, a computer typically comprises other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also comprise a wireless AP disposed thereon for communicating with the wireless adapter 1156.

When used in a WAN networking environment, the computer 1102 can comprise a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 12:
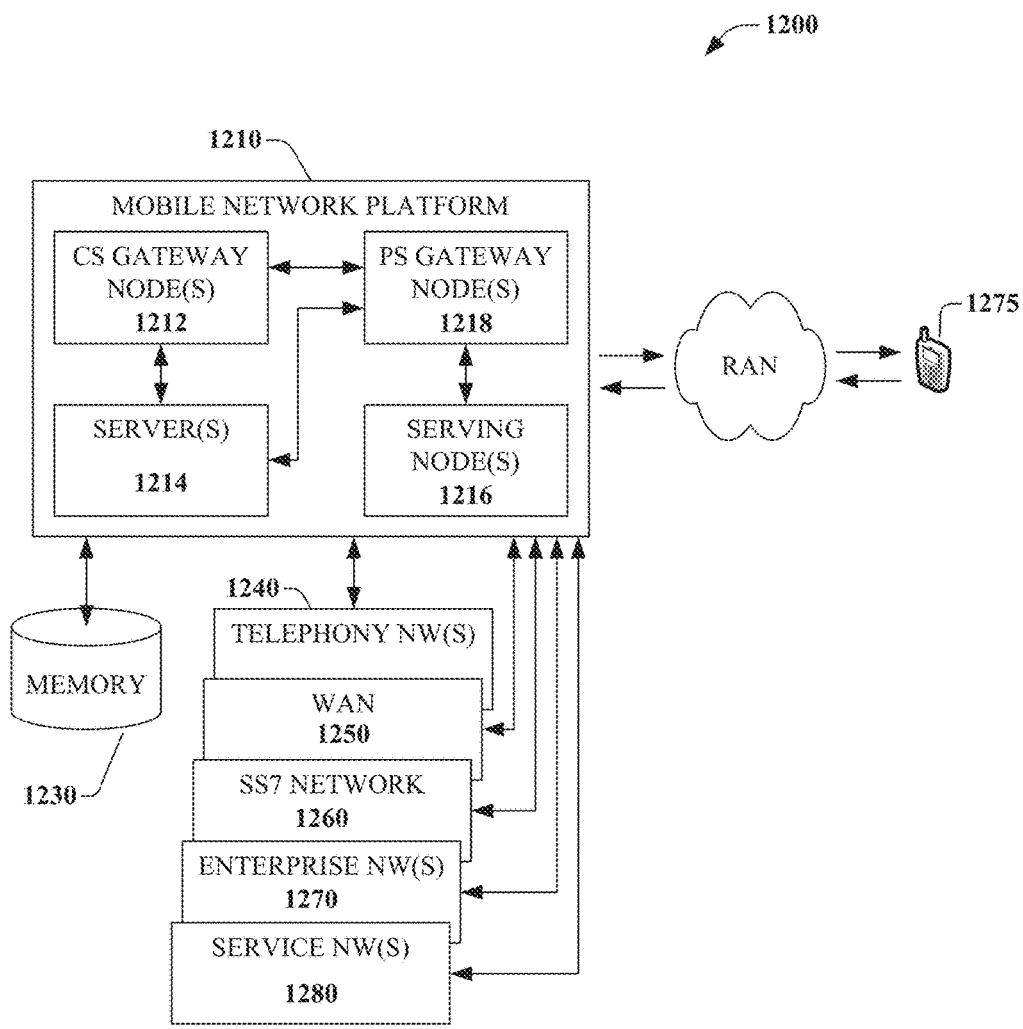
FIG. 12 is a block diagram of an example, non-limiting embodiment of a mobile network platform in accordance with various aspects described herein.

FIG. 12 presents an example embodiment 1200 of a mobile network platform 1210 that can implement and exploit one or more aspects of the disclosed subject matter described herein. In one or more embodiments, the mobile network platform 1210 can generate and receive signals transmitted and received by base stations (e.g., base station devices 104 and 508) and repeater devices (e.g., repeater devices 710, 806, and 900) associated with the disclosed subject matter. Generally, wireless network platform 1210 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1210 can be included in telecommunications carrier networks, and can be considered carrier-side components as discussed elsewhere herein. Mobile network platform 1210 comprises CS gateway node(s) 1212 which can interface CS traffic received from legacy networks like telephony network(s) 1240 (e.g., public switched telephone network (PSTN), or public land mobile network (PLMN)) or a signaling system #7 (SS7) network 1260. Circuit switched gateway node(s) 1212 can authorize and authenticate traffic (e.g., voice) arising from such networks. Additionally, CS gateway node(s) 1212 can access mobility, or roaming, data generated through SS7 network 1260; for instance, mobility data stored in a visited location register (VLR), which can reside in memory 1230. Moreover, CS gateway node(s) 1212 interfaces CS-based traffic and signaling and PS gateway node(s) 1218. As an example, in a 3GPP UMTS network, CS gateway node(s) 1212 can be realized at least in part in gateway GPRS support node(s) (GGSN). It should be appreciated that functionality and specific operation of CS gateway node(s) 1212, PS gateway node(s) 1218, and serving node(s) 1216, is provided and dictated by radio technology(ies) utilized by mobile network platform 1210 for telecommunication.

In addition to receiving and processing CS-switched traffic and signaling, PS gateway node(s) 1218 can authorize and authenticate PS-based data sessions with served mobile devices. Data sessions can comprise traffic, or content(s), exchanged with networks external to the wireless network platform 1210, like wide area network(s) (WANs) 1250, enterprise network(s) 1270, and service network(s) 1280, which can be embodied in local area network(s) (LANs), can also be interfaced with mobile network platform 1210 through PS gateway node(s) 1218. It is to be noted that WANs 1250 and enterprise network(s) 1270 can embody, at least in part, a service network(s) like IP multimedia subsystem (IMS). Based on radio technology layer(s) available in technology resource(s), packet-switched gateway node(s) 1218 can generate packet data protocol contexts when a data session is established; other data structures that facilitate routing of packetized data also can be generated. To that end, in an aspect, PS gateway node(s) 1218 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1200, wireless network platform 1210 also comprises serving node(s) 1216 that, based upon available radio technology layer(s) within technology resource(s), convey the various packetized flows of data streams received through PS gateway node(s) 1218. It is to be noted that for technology resource(s) that rely primarily on CS communication, server node(s) can deliver traffic without reliance on PS gateway node(s) 1218; for example, server node(s) can embody at least in part a mobile switching center. As an example, in a 3GPP UMTS network, serving node(s) 1216 can be embodied in serving GPRS support node(s) (SGSN).

For radio technologies that exploit packetized communication, server(s) 1214 in wireless network platform 1210 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 1210. Data streams (e.g., content(s) that are part of a voice call or data session) can be conveyed to PS gateway node(s) 1218 for authorization/authentication and initiation of a data session, and to serving node(s) 1216 for communication thereafter. In addition to application server, server(s) 1214 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 1210 to ensure network's operation and data integrity in addition to authorization and authentication procedures that CS gateway node(s) 1212 and PS gateway node(s) 1218 can enact. Moreover, provisioning server(s) can provision services from external network(s) like networks operated by a disparate service provider; for instance, WAN 1250 or Global Positioning System (GPS) network(s) (not shown). Provisioning server(s) can also provision coverage through networks associated to wireless network platform 1210 (e.g., deployed and operated by the same service provider), such as the distributed antennas networks shown in FIG. 1(s) that enhance wireless service coverage by providing more network coverage. Repeater devices such as those shown in FIGS. 7, 8, and 9 also improve network coverage in order to enhance subscriber service experience by way of UE 1275.

It is to be noted that server(s) 1214 can comprise one or more processors configured to confer at least in part the functionality of macro network platform 1210. To that end, the one or more processor can execute code instructions stored in memory 1230, for example. It is should be appreciated that server(s) 1214 can comprise a content manager, which operates in substantially the same manner as described hereinbefore.

In example embodiment 1200, memory 1230 can store information related to operation of wireless network platform 1210. Other operational information can comprise provisioning information of mobile devices served through wireless platform network 1210, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1230 can also store information from at least one of telephony network(s) 1240, WAN 1250, enterprise network(s) 1270, or SS7 network 1260. In an aspect, memory 1230 can be, for example, accessed as part of a data store component or as a remotely connected memory store.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 13A:
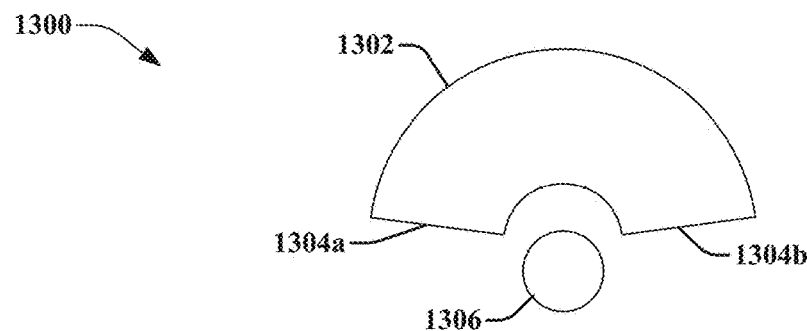
FIGS. 13A, 13B, and 13C are block diagrams illustrating example, non-limiting embodiments of a slotted waveguide coupler in accordance with various aspects described herein.
Figure 13B:
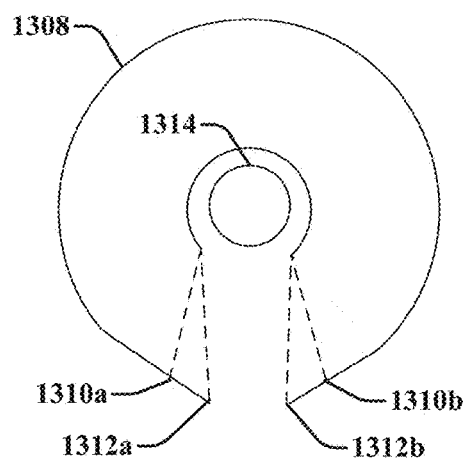
Figure 13C:
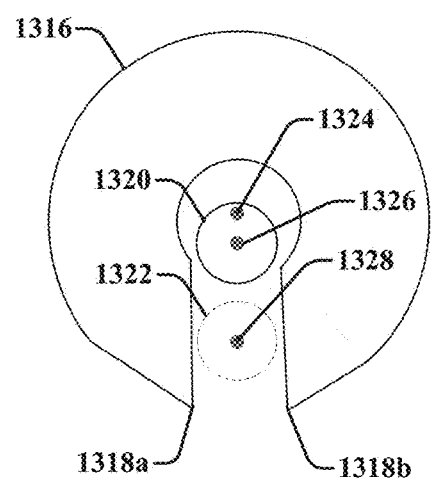

Turning now to FIGS. 13A, 13B, and 13C, illustrated are block diagrams of example, non-limiting embodiments of a slotted waveguide coupler system 1300 in accordance with various aspects described herein. In particular, cross sections of various waveguides are presented near the junction where the waveguide launches a guided wave along a wire. In FIG. 13A, the waveguide coupler system comprises a wire 1306 that is positioned with respect to a waveguide 1302, such that the wire 1306 fits within or near a slot formed in the waveguide 1302 that runs longitudinally with respect to the wire 1306. The opposing ends 1304a and 1304b of the waveguide 1302, and the waveguide 1302 itself, surrounds less than 180 degrees of the wire surface of the wire 1306.

In FIG. 13B the waveguide coupler system comprises a wire 1314 that is positioned with respect to a waveguide 1308, such that the wire 1314 fits within or near a slot formed in the waveguide 1308 that runs longitudinally with respect to the wire 1314. The slot surfaces of the waveguide 1308 can be non-parallel, and two different exemplary embodiments are shown in FIG. 13B. In the first, slot surfaces 1310a and 1310b can be non-parallel and aim outwards, slightly wider than the width of the wire 1314. In the other embodiment, the slots surfaces 1312a and 1312b can still be non-parallel, but narrow to form a slot opening smaller than a width of the wire 1314. Any range of angles of the non-parallel slot surfaces are possible, of which these are two exemplary embodiments.

In FIG. 13C, the waveguide coupler system shows a wire 1320 that fits within a slot formed in waveguide 1316. The slot surfaces 1318a and 1318b in this exemplary embodiment can be parallel, but the axis 1326 of the wire 1320 is not aligned with the axis 1324 of the waveguide 1316. The waveguide 1316 and the wire 1320 are therefore not coaxially aligned. In another embodiment, shown, a possible position of the wire at 1322 also has an axis 1328 that is not aligned with the axis 1324 of the waveguide 1316.

It is to be appreciated that while three different embodiments showing a) waveguide surfaces that surround less than 180 degrees of the wire, b) non parallel slot surfaces, and c) coaxially unaligned wires and waveguide were shown separately in FIGS. 13A, 13B, and 13C, in various embodiments, diverse combinations of the listed features are possible.

Figure 14A:
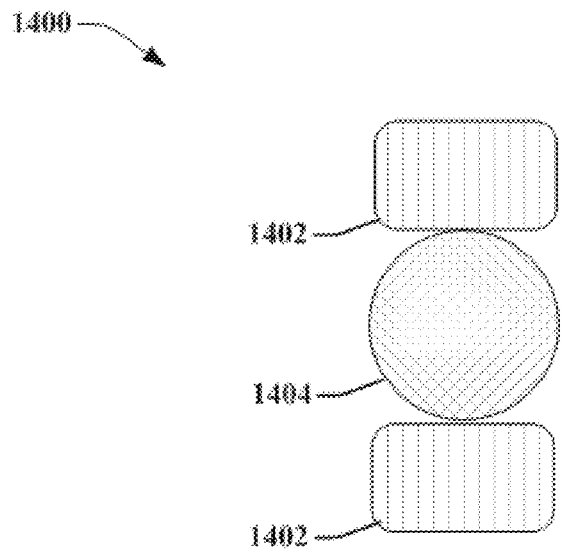
FIGS. 14A and 14B are a block diagrams illustrating an example, non-limiting embodiment of a waveguide coupling system in accordance with various aspects described herein.
Figure 14B:
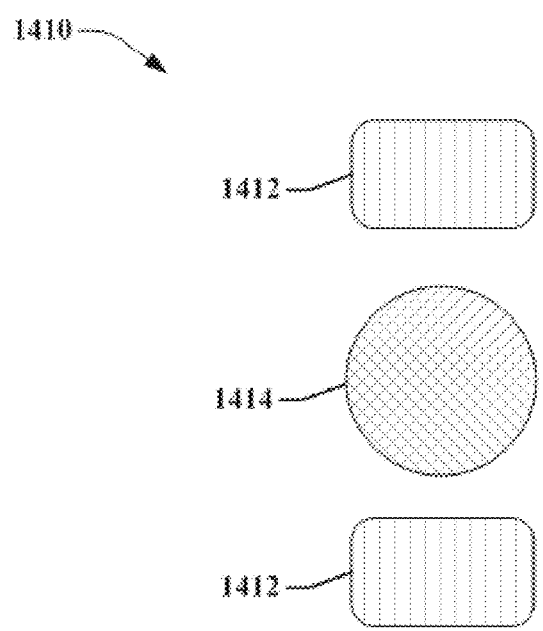

Turning now to FIG. 14, illustrated is an example, non-limiting embodiment of a waveguide coupling system 1400 in accordance with various aspects described herein. FIG. 14 depicts a cross sectional representation of the waveguide and wire embodiments shown in FIGS. 2, 3, 4, etc. As can be seen in 1400, the wire 1404 can be positioned directly next to and touching waveguide 1402. In other embodiments, as shown in waveguide coupling system 1410 in FIG. 14B, the wire 1414 can still be placed near, but not actually touching waveguide strip 1412. In both cases, electromagnetic waves traveling along the waveguides can induce other electromagnetic waves on to the wires and vice versa. Also, in both embodiments, the wires 1404 and 1414 are placed outside the cross-sectional area defined by the outer surfaces of waveguides 1402 and 1412.

For the purposes of this disclosure, a waveguide does not surround, in substantial part, a wire surface of a wire when the waveguide does not surround an axial region of the surface, when viewed in cross-section, of more than 180 degrees. For avoidance of doubt, a waveguide does not surround, in substantial part a surface of a wire when the waveguide surrounds an axial region of the surface, when viewed in cross-section, of 180 degrees or less.

It is to be appreciated that while FIGS. 14 and 14B show wires 1404 and 1414 having a circular shape and waveguides 1402 and 1412 having rectangular shapes, this is not meant to be limiting. In other embodiments, wires and waveguides can have a variety of shapes, sizes, and configurations. The shapes can include, but not be limited to: ovals or other ellipsoid shapes, octagons, quadrilaterals or other polygons with either sharp or rounded edges, or other shapes. Additionally, in some embodiments, the wires 1404 and 1414 can be stranded wires comprising smaller gauge wires, such as a helical strand, braid or other coupling of individual strands into a single wire. Any of wires and waveguides shown in the figures and described throughout this disclosure can include one or more of these embodiments.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. For example, artificial intelligence can be used to determine positions around a wire that dielectric waveguides 604 and 606 should be placed in order to maximize transfer efficiency. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence that can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component", "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

Turning now to FIG. 15, a block diagram is shown illustrating an example, non-limiting embodiment of a guided wave communication system 1550. In operation, a transmission device 1500 receives one or more communication signals 1510 from a communication network or other communications device that include data and generates guided waves 1520 to convey the data via the transmission medium 1525 to the transmission device 1502. The transmission device 1502 receives the guided waves 1520 and converts them to communication signals 1512 that include the data for transmission to a communications network or other communications device. The communication network or networks can include a wireless communication network such as a cellular voice and data network, a wireless local area network, a satellite communications network, a personal area network or other wireless network. The communication network or networks can include a wired communication network such as a telephone network, an Ethernet network, a local area network, a wide area network such as the Internet, a broadband access network, a cable network, a fiber optic network, or other wired network. The communication devices can include a network edge device, bridge device or home gateway, a set-top box, broadband modem, telephone adapter, access point, base station, or other fixed communication device, a mobile communication device such as an automotive gateway, laptop computer, tablet, smartphone, cellular telephone, or other communication device.

In an example embodiment, the guided wave communication system 1550 can operate in a bi-directional fashion where transmission device 1500 receives one or more communication signals 1512 from a communication network or device that includes other data and generates guided waves 1522 to convey the other data via the transmission medium 1525 to the transmission device 1500. In this mode of operation, the transmission device 1502 receives the guided waves 1522 and converts them to communication signals 1510 that include the other data for transmission to a communications network or device.

The transmission medium 1525 can include a wire or other conductor or inner portion having at least one inner portion surrounded by a dielectric material, the dielectric material having an outer surface and a corresponding circumference. In an example embodiment, the transmission medium 1525 operates as a single-wire transmission line to guide the transmission of an electromagnetic wave. When the transmission medium 1525 is implemented as a single wire transmission system, it can include a wire. The wire can be insulated or uninsulated, and single-stranded or multi-stranded. In other embodiments, the transmission medium 1525 can contain conductors of other shapes or configurations including wire bundles, cables, rods, rails, pipes. In addition, the transmission medium 1525 can include non-conductors such as dielectric pipes, rods, rails, or other dielectric members; combinations of conductors and dielectric materials or other guided wave transmission medium. It should be noted that the transmission medium 1525 can otherwise include any of the transmission media previously discussed in conjunction with FIGS. 1-14.

According to an example embodiment, the guided waves 1520 and 1522 can be contrasted with radio transmissions over free space/air or conventional propagation of electrical power or signals through the conductor of a wire. In particular, guided waves 1520 and 1522 are surface waves and other electromagnetic waves that surround all or part of the surface of the transmission medium and propagate with low loss along the transmission medium from transmission device 1500 to transmission device 1502, and vice versa. The guided waves 1520 and 1522 can have a field structure (e.g., an electromagnetic field structure) that lies primarily or substantially outside of the transmission medium 1525. In addition to the propagation of guided waves 1520 and 1522, the transmission medium 1525 may optionally contain one or more wires that propagate electrical power or other communication signals in a conventional manner as a part of one or more electrical circuits.

Turning now to FIG. 16, a block diagram is shown illustrating an example, non-limiting embodiment of a transmission device 1500 or 1502. The transmission device 1500 or 1502 includes a communications interface (I/F) 1600, a transceiver 1610 and a coupler 1620.

In an example of operation, the communications interface receives a communication signal 1510 or 1512 that includes first data. In various embodiments, the communications interface 1600 can include a wireless interface for receiving a wireless communication signal in accordance with a wireless standard protocol such as LTE or other cellular voice and data protocol, an 802.11 protocol, WIMAX protocol, UltraWideband protocol, Bluetooth protocol, Zigbee protocol, a direct broadcast satellite (DBS) or other satellite communication protocol or other wireless protocol. In addition or in the alternative, the communications interface 1600 includes a wired interface that operates in accordance with an Ethernet protocol, universal serial bus (USB) protocol, a data over cable service interface specification (DOCSIS) protocol, a digital subscriber line (DSL) protocol, a Firewire (IEEE 1394) protocol, or other wired protocol. In additional to standards-based protocols, the communications interface 1600 can operate in conjunction with other wired or wireless protocol. In addition, the communications interface 1600 can optionally operate in conjunction with a protocol stack that includes multiple protocol layers.

In an example of operation, the transceiver 1610 generates a first electromagnetic wave based on the communication signal 1510 or 1512 to convey the first data. The first electromagnetic wave has at least one carrier frequency and at least one corresponding wavelength. In various embodiments, the transceiver 1610 is a microwave transceiver that operates at a carrier frequency with a corresponding wavelength that is less than the circumference of the transmission medium 1525. The carrier frequency can be within a millimeter wave frequency band of 30 GHz-300 GHz. In one mode of operation, the transceiver 1610 merely upconverts the communications signal or signals 1510 or 1512 for transmission of the first electromagnetic signal in the millimeter wave band. In another mode of operation, the communications interface 1600 either converts the communication signal 1510 or 1512 to a baseband or near baseband signal or extracts the first data from the communication signal 1510 or 1512 and the transceiver 1610 modulates the first data, the baseband or near baseband signal for transmission.

In an example of operation, the coupler 1620 couples the first electromagnetic wave to the transmission medium 1525. The coupler 1620 can be implemented via a dielectric waveguide coupler or any of the couplers and coupling devices described in conjunction with FIGS. 1-14. In an example embodiment, the transmission medium 1525 includes a wire or other inner element surrounded by a dielectric material having an outer surface. The dielectric material can include an insulating jacket, a dielectric coating or other dielectric on the outer surface of the transmission medium 1525. The inner portion can include a dielectric or other insulator, a conductor, air or other gas or void, or one or more conductors.

In an example of operation, the coupling of the first electromagnetic wave to the transmission medium 1525 forms a second electromagnetic wave that is guided to propagate along the outer surface of the dielectric material of the transmission medium via at least one guided wave mode that includes an asymmetric mode and optionally one or more other modes including a fundamental (symmetric) mode or other asymmetric (non-fundamental) mode. The outer surface of the dielectric material can be the outer surface of an insulating jacket, dielectric coating, or other dielectric. In an example embodiment, the first electromagnetic wave generated by the transceiver 1610 is guided to propagate along the coupler via at least one guided wave mode that includes a symmetric mode and wherein a junction between the coupler and the transmission medium induces the asymmetric mode of the second electromagnetic wave and optionally a symmetric mode of the second electromagnetic wave.

In an example embodiment, the transmission medium 1525 is a single wire transmission medium having an outer surface and a corresponding circumference and the coupler 1620 couples the first electromagnetic wave to the single wire transmission medium. In particular, the coupling of the first electromagnetic wave to the single wire transmission medium forms a second electromagnetic wave that is guided to propagate along the outer surface of the single wire transmission medium via at least one guided wave mode that includes at least one asymmetric mode and optionally a symmetric mode and other asymmetric modes, wherein the at least one carrier frequency in within a millimeter wave frequency band and wherein the at least one corresponding wavelength is less than the circumference of the single wire transmission medium. In one mode of operation, the first electromagnetic wave is guided to propagate along the coupler via at least one guided wave mode that includes a symmetric mode and a junction between the coupler and the transmission medium induces both the asymmetric mode of the second electromagnetic wave and, when present, the symmetric mode of the second electromagnetic wave.

While the prior description has focused on the operation of the transceiver 1610 as a transmitter, the transceiver 1610 can also operate to receive electromagnetic waves that convey second data from the single wire transmission medium via the coupler 1620 and to generated communications signals 1510 or 1512, via communications interface 1600 that includes the second data. Consider embodiments where a third electromagnetic wave conveys second data that also propagates along the outer surface of the dielectric material of the transmission medium 1525. The coupler 1620 also couples the third electromagnetic wave from the transmission medium 1525 to form a fourth electromagnetic wave. The transceiver 1610 receives the fourth electromagnetic wave and generates a second communication signal that includes the second data. The communication interface 1600 sends the second communication signal to a communication network or a communications device.

Turning now to FIG. 17, a diagram is shown illustrating an example, non-limiting embodiment of an electromagnetic field distribution. In this embodiment, a transmission medium 1525 in air includes an inner conductor 1700 and an insulating jacket 1702 of dielectric material, is shown in cross section. The diagram includes different gray-scales that represent differing electromagnetic field strengths generated by the propagation of the guided wave having an asymmetric mode. The guided wave has a field structure that lies primarily or substantially outside of the transmission medium 1525 that serves to guide the wave. The regions inside the conductor 1700 have little or no field. Likewise regions inside the insulating jacket 1702 have low field strength. The majority of the electromagnetic field strength is distributed in the lobes 1704 at the outer surface of the insulating jacket 1702 and in close proximity thereof. The presence of an asymmetric guided wave mode is shown by the high electromagnetic field strengths at the top and bottom of the outer surface of the insulating jacket 1702—as opposed very small field strengths on the other sides of the insulating jacket 1702.

The example shown corresponds to a 38 GHz wave guided by a wire with a diameter of 1.1 cm and a dielectric insulation of thickness of 0.36 cm. Because the electromagnetic wave is guided by the transmission medium 1525 and the majority of the field strength is concentrated in the air outside of the insulating jacket 1702, the guided wave can propagate longitudinally down the transmission medium 1525 with very low loss.

In an example embodiment, this particular asymmetric mode of propagation is induced on the transmission medium 1525 by an electromagnetic wave having a frequency that falls within a limited range (such as +25%) of the lower cut-off frequency of the asymmetric mode. This cutoff frequency can vary based on the dimensions and properties of the insulating jacket 1702 and the inner conductor 1700 and can be determined experimentally to have a desired mode pattern. At frequencies lower than the lower cut-off frequency, the asymmetric mode is difficult to induce in the transmission medium 1525 and fails to propagate for all but trivial distances. As the frequency increases above the limited range of frequencies about the cut-off frequency, the asymmetric mode shifts more and more inward of the insulating jacket 1702. At frequencies much larger than the cut-off frequency, the field strength is no longer concentrated outside of the insulating jacket, but primarily inside of the insulating jacket 1702. While the transmission medium 1525 provides strong guidance to the electromagnetic wave and propagation is still possible, ranges are more limited by increased losses due to propagation within the insulating jacket 1702—as opposed to the surrounding air.

Figures 18, 19:
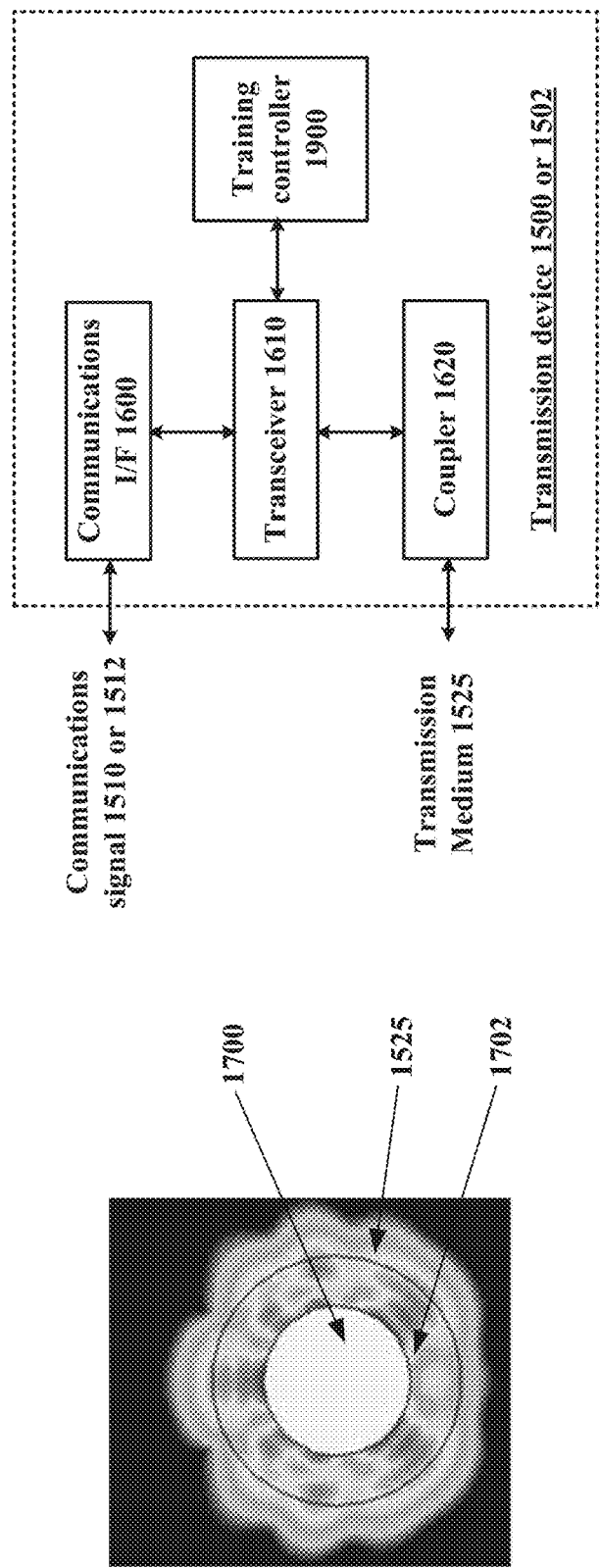
FIG. 18 is a diagram illustrating an example, non-limiting embodiment of an electromagnetic distribution in accordance with various aspects described herein.
FIG. 19 is a block diagram illustrating an example, non-limiting embodiment of a transmission device in accordance with various aspects described herein.

Turning now to FIG. 18, a diagram is shown illustrating an example, non-limiting embodiment of an electromagnetic field distribution. In particular, a diagram similar to FIG. 17 is shown with common reference numerals used to refer to similar elements.

The example shown corresponds to a 60 GHz wave guided by a wire with a diameter of 1.1 cm and a dielectric insulation of thickness of 0.36 cm. Because the frequency of the wave is above the limited range of the cut-off frequency, the asymmetric mode has shifted inward of the insulating jacket 1702. In particular, the field strength is concentrated primarily inside of the insulating jacket 1702. While the transmission medium 1525 provides strong guidance to the electromagnetic wave and propagation is still possible, ranges are more limited when compared with the embodiment of FIG. 17, by increased losses due to propagation within the insulating jacket 1702.

Turning now to FIG. 19, a block diagram is shown illustrating an example, non-limiting embodiment of a transmission device. In particular, a diagram similar to FIG. 16 is presented with common reference numerals used to refer to similar elements. The transmission device 1500 or 1502 includes a communications interface 1600 that receives a communication signal 1510 or 1512 that includes data. The transceiver 1610 generates a first electromagnetic wave based on the communication signal 1510 or 1512 to convey the first data, the first electromagnetic wave having at least one carrier frequency. A coupler 1620 couples the first electromagnetic wave to the transmission medium 1525 having at least one inner portion surrounded by a dielectric material, the dielectric material having an outer surface and a corresponding circumference. The first electromagnetic wave is coupled to the transmission medium to form a second electromagnetic wave that is guided to propagate along the outer surface of the dielectric material via at least one guided wave mode. The at least one guided wave mode includes an asymmetric mode having a lower cutoff frequency and the at least one carrier frequency is selected to be within a limited range of the lower cutoff frequency.

The transmission device 1500 or 1502 includes an optional training controller 1900. In an example embodiment, the training controller 1900 is implemented by a standalone processor or a processor that is shared with one or more other components of the transmission device 1500 or 1502. The training controller 1900 selects the at least one carrier frequency to be within the limited range of the lower cutoff frequency based on feedback data received by the transceiver 1610 from at least one remote transmission device coupled to receive the second electromagnetic wave.

In an example embodiment, a third electromagnetic wave transmitted by a remote transmission device 1500 or 1502 conveys second data that also propagates along the outer surface of the dielectric material of a transmission medium 1525. The second data can be generated to include the feedback data. In operation, the coupler 1620 also couples the third electromagnetic wave from the transmission medium 1525 to form a fourth electromagnetic wave and the transceiver receives the fourth electromagnetic wave and processes the fourth electromagnetic wave to extract the second data.

In an example embodiment, the training controller 1900 operates based on the feedback data to evaluate a plurality of candidate frequencies and to select the at least one carrier frequency to be within the limited range of the lower cutoff frequency, as one of the plurality of candidate frequencies. For example, the candidate frequencies can be selected based on criteria such as: being in a millimeter wave band, having wavelengths greater than an outer circumference of the transmission medium 1525, being less than the mean collision frequency of electrons in a conductor that makes up a portion of the transmission medium 1525, based on experimental results that indicate the limited range of frequencies about the cutoff frequency for a particular transmission medium 1525 and a selected asymmetric mode, and/or based on experimental results or simulations.

Consider the following example: a transmission device 1500 begins operation under control of the training controller 1900 by sending a plurality of guided waves containing test data at a corresponding plurality of candidate frequencies to a remote transmission device 1502 coupled to the transmission medium 1525. The test data indicates the particular candidate frequency of the signal. The training controller 1900 at the remote transmission device 1502 receives the test data from any of the guided waves that were properly received and determines the best candidate frequency, a set of acceptable candidate frequencies, or a rank ordering of candidate frequencies. This candidate frequency or frequencies is generated by the training controller 1900 based on one or more optimizing criteria such as received signal strength, bit error rate, packet error rate, signal to noise ratio or other optimizing criteria can be generated by the transceiver 1610 of the remote transmission device 1502. The training controller 1900 generates feedback data that indicates the candidate frequency or frequencies and sends the feedback data to the transceiver 1610 for transmission to the transmission device 1500. The transmission device 1500 and 1502 can then communicate data with one another utilizing the indicated carrier frequency or frequencies.

While the procedure above has been described in a start-up or initialization mode of operation, each transmission device 1500 or 1502 can send test signals or otherwise evaluate candidate frequencies at other times as well. In an example embodiment, the communication protocol between the transmission devices 1500 and 1502 can include a periodic test mode where either full testing or more limited testing of a subset of candidate frequencies are tested and evaluated. In other modes of operation, the re-entry into such a test mode can be triggered by a degradation of performance due to an impairment, weather conditions, etc. In an example embodiment, the receiver bandwidth of the transceiver 1610 is either sufficiently wide to include all candidate frequencies or can be selectively adjusted by the training controller 1900 to a training mode where the receiver bandwidth of the transceiver 1610 is sufficiently wide to include all candidate frequencies.

While the guided wave above has been described as propagating on the outer surface of an outer dielectric surface of the transmission medium 1525, other outer surfaces of a transmission medium 1525 including the outer surface of a bare wire could likewise be employed. Further, while the training controller 1900 has been described above as selecting a candidate frequency to be within a limited range of the lower cut-off frequency of an asymmetric mode, the training controller 1900 could be used to establish a candidate frequency that optimizes, substantially optimizes or pareto optimizes the propagation along a transmission medium 1525 based on one or more performance criteria such as throughput, packet error rate, signal strength, signal to noise ratio, signal to noise and interference ratio, channel separation in a multi-channel system, and/or other performance criteria—with or without an asymmetric mode and with or without regard to whether the candidate frequency falls within a limited range of the lower cutoff frequency of any particular mode.

Figure 20:
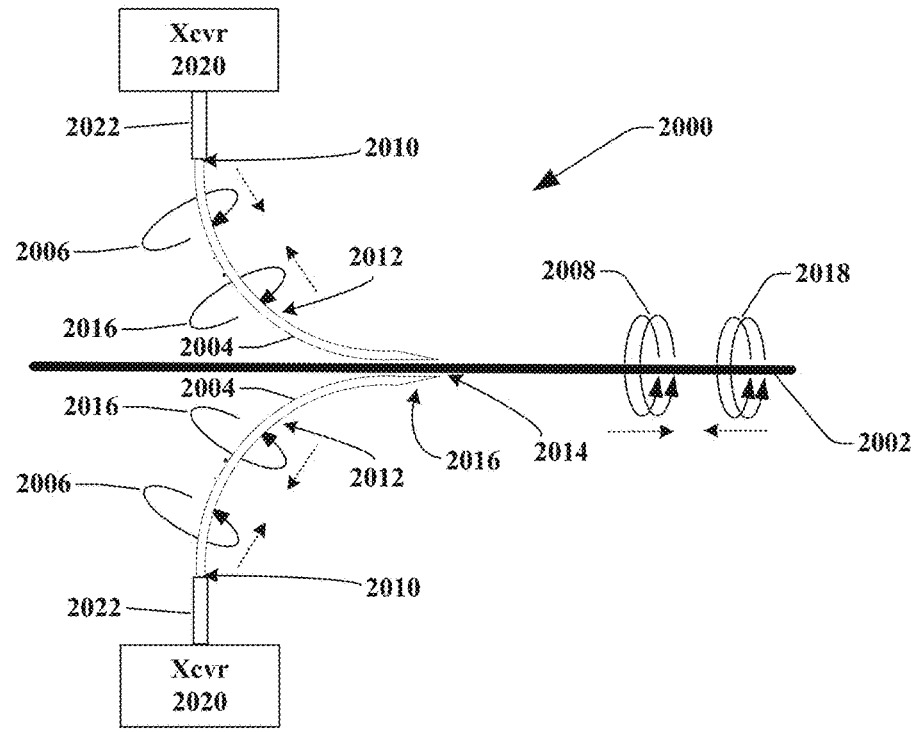
FIG. 20 is a block diagram of an example, non-limiting embodiment of a transmission device in accordance with various aspects described herein.

FIG. 20 is a block diagram of an example, non-limiting embodiment of a transmission device in accordance with various aspects described herein. In particular, a transmission device 2000 is shown that includes a plurality of transceivers 2020, each having a transmitting device (or transmitter) and/or a receiving device (receiver) that is coupled to a corresponding waveguide 2022 and coupler 2004. The plurality of couplers 2004 can be referred to collectively as a "coupling module". Each coupler 2004 of such as coupling module includes a receiving portion 2010 that receives an electromagnetic wave 2006 conveying first data from a transmitting device of transceiver 2020 via waveguide 2022. A guiding portion 2012 of the coupler 2004 guides a first electromagnetic wave 2006 to a junction 2014 for coupling the electromagnetic wave 2006 to a transmission medium 2002. In the embodiment shown, the junction 2014 includes an air gap, however other configurations are possible both with, and without an air gap. The guiding portion 2012 includes a tapered end 2016 that terminates at the junction 2014.

Each electromagnetic wave 2006 propagates via at least one first guided wave mode. The coupling of the electromagnetic waves 2006 to the transmission medium 2002 via the junctions 2014 forms a plurality of electromagnetic waves 2008 that are guided to propagate along the outer surface of the transmission medium 2002 via at least one second guided wave mode that differs from the at least one first guided wave mode. The transmission medium 2002 can be a single wire transmission medium or other transmission medium that supports the propagation of the electromagnetic waves 2008 along the outer surface of the transmission medium 2002 to convey the first data.

In various embodiments, the electromagnetic waves 2006 propagate along a coupler 2004 via one or more first guided wave modes that can include either exclusively or substantially exclusively a symmetrical (fundamental) mode, however other modes can optionally be included in addition or in the alternative. In accordance with these embodiments, the at least one second guided wave mode of the electromagnetic waves 2008 includes at least one asymmetric mode that is not included in the guided wave modes of the electromagnetic waves 2006 that propagate along each coupler 2004. In operation, the junctions 2014 induce the electromagnetic waves 2008 on transmission medium 2002 to optionally include a symmetric mode, but also one or more asymmetric modes not included in the guided wave modes of the electromagnetic wave 2006 that propagate along the coupler 2004.

More generally, consider the at least one first guided wave mode to be defined by the set of modes S1 where:

$$S1=(m11, m12, m13, \ldots)$$

And where the individual modes m11, m12, m13, . . . can each be either a symmetrical mode or an asymmetrical mode that propagate more than a trivial distance, i.e. that propagate along the length of the guiding portion 2012 of a coupler 2004 from the receiving end 2010 to the other end 2016.

Also consider the at least one second guided wave mode to be defined by the set of modes S2 where:

$$S2=(m21,m22,m23,\ldots)$$

And, the individual modes m21, m22, m23, . . . can each be either a symmetrical mode or an asymmetrical mode that propagate along the length of the transmission medium 2002 more than a trivial distance, i.e. that propagate sufficiently to reach a remote transmission device coupled at a different location on the transmission medium 2002.

In various embodiments, that condition that at least one first guided wave mode is different from at least one second guided wave mode implies that S1 S2. In particular, S1 may be a proper subset of S2, S1 may be a proper subset of S2, or the intersection between S1 and S2 may be the null set.

In addition to operating as a transmitter, the transmission device 2000 can operate as a receiver as well. In this mode of operation, a plurality of electromagnetic waves 2018 conveys second data that also propagates along the outer surface of the transmission medium 2002, but in the opposite direction of the electromagnetic waves 2008. Each junction 2014 couples one of the electromagnetic waves 2018 from the transmission medium 2002 to form an electromagnetic wave 2016 that is guided to a receiver of the corresponding transceiver 2020 by the guiding portion 2012.

In various embodiments, the first data conveyed by the plurality of second electromagnetic waves 2008 includes a plurality of data streams that differ from one another and wherein the each of the plurality of first electromagnetic waves 2006 conveys one of the plurality of data streams. More generally, the transceivers 2020 operate to convey either the same data stream or different data streams via time division multiplexing, frequency division multiplexing, or mode division multiplexing. In this fashion, the transceivers 2020 can be used in conjunction with a MIMO transmission system to send and receive full duplex data via azimuthal diversity, cyclic delay diversity, spatial coding, space time block coding, space frequency block coding, hybrid space time/frequency block coding, single stream multi-coupler spatial mapping or other transmission/reception scheme.

While the transmission device 2000 is shown with two transceivers 2020 and two couplers 2004 arranged at the top and bottom of the transmission medium 2002, other configurations can include three or more transceivers and corresponding couplers. For example, a transmission device 2000 with four transceivers 2020 and four couplers 2004 can be arranged at azimuthally around the outer surface of a cylindrical transmission medium at equidistant orientations of 0, π/2, π, and 3π/4. Considering a further example, a transmission device 2000 with n transceivers 2020 can include n couplers 2004 arranged azimuthally around the outer surface of a cylindrical transmission medium at angles 2π/n apart.

Figure 21:
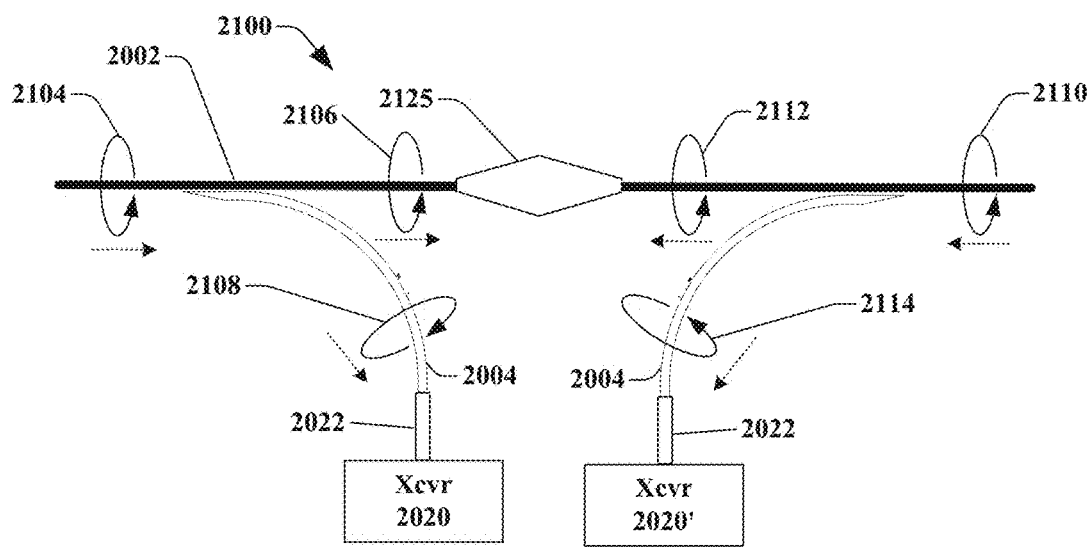
FIG. 21 is a block diagram of an example, non-limiting embodiment of a transmission device in accordance with various aspects described herein.

FIG. 21 is a block diagram of an example, non-limiting embodiment of a transmission device in accordance with various aspects described herein. In particular, a transmission device 2100 is shown that can be implemented as part of a repeater, such as repeater device 710 presented in conjunction with FIG. 7 or other repeater that includes two similar transceivers, 2020 and 2020'. Similar elements from FIG. 20 are represented by common reference numerals. In addition, the transmission device 2100 includes a shield 2125. In an embodiment, the shield 2125 is constructed of absorbing material and surrounds the transmission medium 2002. In operation, when an electromagnetic wave 2104 is coupled to coupler 2004 to generate electromagnetic wave 2108, a portion continues along transmission medium 2002 as electromagnetic wave 2106. The shield 2125 substantially or entirely absorbs the electromagnetic wave 2106 so that it will not continue to propagate, mitigating interference with the operation of the transceiver 2020' on the other side of the shield 2125. Similarly, when an electromagnetic wave 2110 is coupled to coupler 2004 to generate electromagnetic wave 2114, a portion continues along transmission medium 2002 as electromagnetic wave 2112. The shield 2125 substantially or entirely absorbs the electromagnetic wave 2112 so that it will not continue to propagate, mitigating interference with the operation of the transceiver 2020 on the other side of the shield 2125. As shown, the shield 2125 is tapered on both sides to minimize reflections and/or to provide impedance matching, however other designs are likewise possible.

Figure 22:
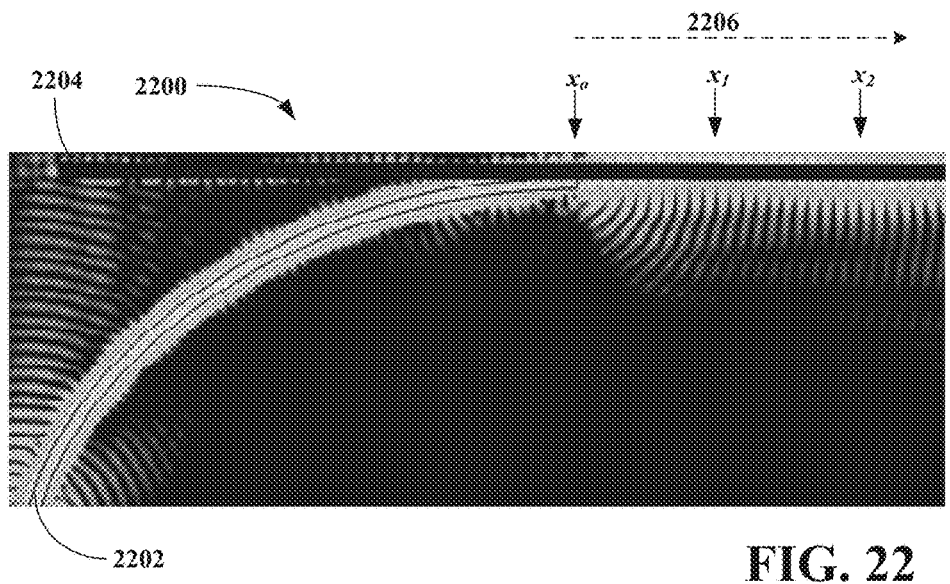
FIG. 22 is a diagram illustrating an example, non-limiting embodiment of an electromagnetic distribution in accordance with various aspects described herein.

FIG. 22 is a diagram illustrating an example, non-limiting embodiment of an electromagnetic distribution in accordance with various aspects described herein. In particular, an electromagnetic distribution 2200 is presented in two dimensions for a transmission device that includes coupler 2202, such as any of the dielectric waveguide couplers previously described. The coupler 2202 couples an electromagnetic wave for propagation along an outer surface of a transmission medium 2204, such as a single wire transmission medium.

The coupler 2202 guides the electromagnetic wave to a junction at $x_0$ via a symmetrical guided wave mode. As shown, the majority of the energy of the electromagnetic wave that propagates along the coupler 2202 is contained within the coupler 2202. The junction at $x_0$ couples the electromagnetic wave to a transmission medium at an azimuthal angle corresponding to the bottom of the transmission medium 2204. This coupling induces an electromagnetic wave that is guided to propagate along the outer surface of the transmission medium via at least one guided wave mode. The majority of the energy of the electromagnetic wave that propagates along the transmission medium 2204 is outside or, but in close proximity to the outer surface of the transmission medium 2204. In the example shown, the junction at $x_0$ forms an electromagnetic wave that propagates via both a symmetrical mode and at least one asymmetrical surface mode, such as the first order mode presented in conjunction with FIG. 17, that skims the surface of the transmission medium 2204.

The combination of symmetrical and asymmetrical propagation mode(s) of the electromagnetic wave that propagates along the surface of the transmission medium 2204 forms an envelope that varies as a function of angular deviation from the azimuthal angle that defines the orientation of the coupler 2202 to the transmission medium 2204 as well as a function of the longitudinal displacement from the junction at $x_0$. Consider the electromagnetic wave to be represented by the function $W(\Delta\theta, \Delta x, t)$, where $\Delta\theta$ represents the angular deviation from the azimuthal angle that defines the orientation of the coupler 2202 to the transmission medium 2204, $\Delta x$ represents function of the longitudinal displacement from the junction at $x_0$, and t represents time. The envelope of the electromagnetic wave W can be represented by $A(\Delta\theta, \Delta x)$, where, for $0 \leq t \leq \infty$, $$A(\Delta\theta,\Delta x)=\text{Max}(W(\Delta\theta,\Delta x,t))$$

Therefore, while the electromagnetic wave W varies as a function of time as a wave propagates along the length of the transmission medium, the envelope A is the maximum amplitude of the electromagnetic wave for any time. Like a standing wave, the envelope A is a relatively time-stationary function of the longitudinal displacement along a transmission medium. While the envelope may vary based on slowly changing parameters of the transmission medium such as temperature or other environmental conditions, the envelope generally does not otherwise vary as a function of time. Unlike a standing wave however, the wavelength of the envelope function is not the same as the wavelength of the electromagnetic wave. In particular, the wavelength of the envelope function is much greater than the wavelength of the underlying electromagnetic wave. In the example shown, the wavelength of the underlying electromagnetic wave $\lambda_c \approx 0.8$ cm while the envelope function of the envelope function is more than 10 times greater. Further, unlike a traditional standing wave the envelope A also varies as a function of $\Delta\theta$, the angular deviation from the azimuthal angle that defines the orientation of the coupler 2202 to the transmission medium 2204.

In the example shown, the coupler 2202 induces an electromagnetic wave on the transmission medium 2204—at the bottom of the transmission medium 2204. At the junction at $x_0$, the electromagnetic wave is concentrated at the bottom of the transmission medium with a much smaller level of radiation on the top of the transmission medium 2004. The envelope of the electromagnetic wave at the bottom of the transmission medium 2204 decreases along the transmission medium in the direction of propagation 2206, until it reaches a minimum at $x_1$. Considering instead, the top of the transmission medium 2204, the envelope of the electromagnetic wave increases along the transmission medium in the direction of propagation 2206, until it reaches a maximum at $x_1$. In this fashion, the envelope roughly follows a serpentine pattern, oscillating between minima and maxima and concentration long the top and bottom of the transmission medium 2204, as the electromagnetic wave propagates along the direction of propagation 2206.

The value $\Delta\theta=0$ corresponds to no angular deviation from the azimuthal angle that defines the orientation of the coupler 2202 to the transmission medium 2204,—i.e., the bottom of the transmission medium 2204. The opposite surface, at the top of the transmission medium 2204, corresponds to $\Delta\theta=\pi$, an angular deviation of $\pi$ radians. In the embodiment shown, for $\Delta\theta=0$ the envelope has local maxima at $x_0$ and $x_2$ and a local minimum at $x_1$. Conversely, for $\Delta\theta=\pi$, the envelope has local minima at $x_0$ and $x_2$ and a local maximum at $x_1$.

Figure 23:
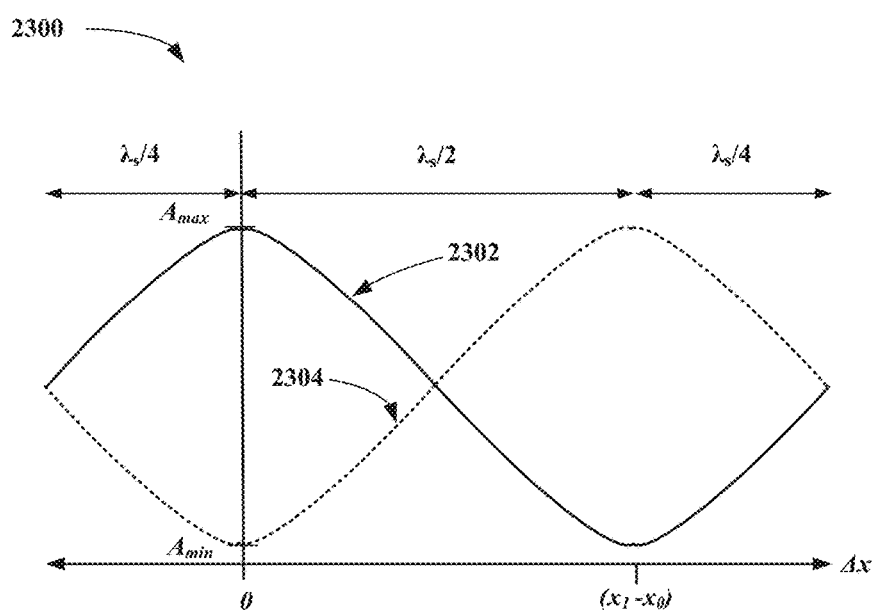
FIG. 23 is a diagram illustrating an example, non-limiting embodiment of a functions in accordance with various aspects described herein.

FIG. 23 is a diagram illustrating an example, non-limiting embodiment of a function in accordance with various aspects described herein. In particular, the graph 2300 presents approximations of the envelope A for two different fixed angular deviations $\Delta\theta$. As shown, the envelope A is a periodic function that varies between a maximum value $A_{max}$ and a minimum value $A_{min}$.

The function 2302 presents an approximation of the envelope A for a fixed angular deviation $\Delta\theta=0$. In this case, $$A(0,\Delta x)=((A_{max}-A_{min})D(\Delta x)\cos(2\pi\Delta x/\lambda_s))+A_{min}$$

Where $D(\Delta x)$ is a monotonically decreasing function that has a value of $$D(0)=1$$

that represents the gradual decay in amplitude of the electromagnetic wave W as it propagates along the length of the transmission medium and where $\lambda_s$ represents the wavelength of the envelope. In the example shown:

$$\lambda_s=2(x_1-x_0)$$

In this example, for $\Delta\theta=0$ the envelope has local maxima at:

$$\Delta x=0,\lambda_s,2\lambda_s \ldots$$

Or more generally at, $$\Delta x=N\lambda_s$$

where N is an integer. Further, for $\Delta\theta=0$ the envelope has local minima at:

$$\Delta x=\lambda_s/2,3\Delta_s/2 \ldots$$

Or more generally at, $$\Delta x=(2N+1)\lambda_s/2$$

The function 2304 presents an approximation of the envelope A for a fixed angular deviation $\Delta\theta=\pi$. In this case, $$A(\pi,\Delta x)=((A_{max}-A_{min})D(\Delta x)\cos(2\pi\Delta x/\lambda_s+\pi))+A_{min}$$

In this example, for $\Delta\theta=\pi$ the envelope has local minima at:

$$\Delta x=0,\lambda_s,2\lambda_s \ldots$$

Or more generally at, $$\Delta x=N\lambda_s$$

where N is an integer. Further, for $\Delta\theta=0$ the envelope has local maxima at:

$$\Delta x=\lambda_s/2,3\lambda_s/2 \ldots$$

Or more generally at, $$\Delta x=(2N+1)\lambda_s/2$$

While the functions 2302 and 2304 present approximations of the envelope A at the top and bottom of the transmission medium, in an embodiment, at least one guided wave mode of the electromagnetic wave W rotates azimuthally as the wave propagates along the length of the transmission medium. In this case, the envelope A can be approximated as follows:

$$A(\Delta\theta,\Delta x)=((A_{max}-A_{min})D(\Delta x)\cos(2\pi\Delta x/\lambda_s+\Delta\theta))+A_{min}$$

or $$A(\Delta\theta,\Delta x)=((A_{max}-A_{min})D(\Delta x)\cos(-2\pi\Delta x/\lambda_s+\Delta\theta))+A_{min}$$

Depending on whether the azimuthal rotation is clockwise or counterclockwise.

Note that, in concert with the example presented above, for $\Delta\theta=\pi$ the envelope has local minima at:

$$\Delta x=N\lambda_s$$

And for $\Delta\theta=0$ the envelope has local maxima at:

$$\Delta x=(2N+1)\lambda_s/2$$

Considering fixed values of $\Delta x$, for $\Delta x=0$, the envelope has a local minimum at:

$$\Delta\theta=\pi$$

And a local maximum at:

$$\Delta\theta=0$$

For $\pi x=\lambda_s/2$, the envelope has a local maximum at:

$$\Delta\theta=\pi$$

And a local minimum at:

$$\Delta\theta=0$$

Using the approximations above, the local minima and maxima can be calculated for other azimuthal deviations as well. Considering the case where $\Delta\theta=\pi/2$, and clockwise rotation, the envelope has local maxima at:

$$\Delta x=\lambda_s/4, 5\lambda_s/4$$

And local minima at:

$$\Delta x=3\lambda_s/4, 7\lambda_s/4$$

Considering the case where $\Delta\theta=-\pi/2$, and counterclockwise rotation, the envelope has local maxima at:

$$\Delta x=\lambda_s/4, 5\lambda_s/4 \ldots$$

And local minima at:

$$\Delta x=3\lambda_s/4, 7\lambda_s/4 \ldots$$

Approximations of the envelope A can be useful in designing the placement of multiple couplers in the transmission medium to support simultaneous communications via multiple electromagnetic waves W via azimuthal or spatial diversity. For example, placing one coupler at an azimuthal deviation and/or longitudinal displacement from another coupler that corresponds to a local minimum of the envelope increases the isolation between the electromagnetic waves and reduces the amount of interference between these couplers. Further, placing a receiving coupler at an azimuthal deviation and/or longitudinal displacement from a transmitting coupler at a corresponding local maximum can increase the signal gain and data throughput for an electromagnetic wave that is transmitted from the transmitting coupler to the receiving coupler. Examples of such configurations including various optional functions and features will be explored in conjunction with FIGS. 24-25 that follow.

FIG. 24 is a block diagram of an example, non-limiting embodiment of a transmission system in accordance with various aspects described herein. The transmission system 2400 is presented that includes two transmission devices that are spaced a distance apart along the transmission medium 2002. In this system the transceiver (Xcvr) 2410 generates an electromagnetic wave 2402 conveying first data. A coupler 2450 guides the electromagnetic wave 2402 to a junction 2412 that couples the electromagnetic wave 2402 to the transmission medium 2002 at a first azimuthal angle to form an electromagnetic wave 2404 that is guided to propagate along the outer surface of the transmission medium 2002 via one or more guided wave modes. The electromagnetic wave 2404 has an envelope that varies as a function of angular deviation $\Delta\theta$ from the first azimuthal angle and the longitudinal displacement $\Delta x$ from the junction 2412. The function has a local minimum at an angular deviation $\Delta\theta=\theta_1$ from the first azimuthal angle and an angular displacement $\Delta x=x_1$ from the junction 2412. The coupler 2454 at junction 2418 forms an electromagnetic wave 2406 from the electromagnetic wave 2404 and guides the electromagnetic wave 2406 to transceiver 2440 to receive the first data.

A remote transceiver 2430 generates an electromagnetic wave 2432 conveying second data that is coupled onto the transmission medium 2002 via coupler 2456 at a junction at 2414 as an electromagnetic wave 2434. The electromagnetic wave 2434 propagates along the outer surface of the transmission medium 2002 in a direction opposite to the electromagnetic wave 2404. The coupler 2452 couples the electromagnetic wave 2434 from the transmission medium 2002 at junction 2416 to form an electromagnetic wave 2436 that is guided to the transceiver 2420 that receives the second data. The coupler 2452 at the junction 2416 corresponds to an angular deviation $\Delta\theta=\theta_1$ from the first azimuthal angle and an angular displacement $\Delta x=x_1$ from the junction 2412. As shown $\theta_1=\pi$ and $\Delta x=0$, corresponding to a local minimum of the envelope of the electromagnetic wave 2404. This placement of coupler 2416 helps reduce bleed through of the electromagnetic wave 2404 to the receiver 2420. A similar effect occurs between transceiver 2430 and transceiver 2440.

In various embodiments, the couplers of the receiver/transmitter pair 2410/2440 are oriented at the same azimuthal orientation and the longitudinal displacement d1 between the junctions 2412 and 2418 is selected so that receiving coupler 2454 is placed at a local maximum of the envelope. Considering further the examples presented in conjunction with FIG. 23, $$d1=N\lambda_s$$

If the electromagnetic wave 2432 is transmitted at the same carrier frequency as the electromagnetic wave 2402, each electromagnetic wave has the same wavelength and a similar effect occurs between junctions 2414 and 2416.

Each of the two transmission devices of system 2400 includes a training controller 2425 that operates similar to training controller 1900. In this embodiment, however, the training controller 2425 selects at least one carrier frequency of the electromagnetic wave 2402 generated by transceiver 2410 based on feedback data received by the transceiver 2420 via the electromagnetic wave 2436. The training controller 2435 generates this feedback data based on the reception of the electromagnetic wave 2406 by transceiver 2440 and transmits the feedback data via the electromagnetic wave 2432 generated by transceiver 2430. The training controllers can operate reciprocally to establish the carrier frequency of the electromagnetic wave 2434. In the alternative, the training controllers 2425 and 2435 can operate in a cooperative fashion to coordinate the selection of a single carrier frequency that not only promotes propagation of the electromagnetic waves 2404 and 2434 along the transmission medium 2002, but that further increases the envelope of the desired electromagnetic wave at the receiving coupler while reducing transmitter bleed through for each transmission device.

While each coupler (2450, 2452, 2454 or 2456) is shown as engaging in unidirectional communication via either a transmitter or receiver of a corresponding transceiver, more generally, each coupler can be coupled to the transceiver for engaging in bidirectional communications in a manner similar to the transmission device described in conjunction with FIG. 20. In addition, while each transmission device is shown with two transceivers, other designs with one transceiver or three or more transceivers are possible. Further, while each transmission device is shown with two couplers that operate at junctions at the same longitudinal position but at different azimuthal orientation, other configurations with different longitudinal displacements and either the same azimuthal orientation or different azimuthal orientations are likewise possible.

FIG. 25 is a block diagram of an example, non-limiting embodiment of a transmission system in accordance with various aspects described herein. This system 2500 operates in a similar fashion to the transmission system 2400. The transceiver 2510 and transceiver 2520 are part of one transmission device that communicates with a remote transmission device that includes transceiver 2540 and transceiver 2530. In operation, transceiver 2510 sends an electromagnetic wave that conveys data to transceiver 2530 and transceiver 2540 sends another electromagnetic wave that conveys data to transceiver 2520. These two electromagnetic waves traverse the transmission medium 2002 in opposite directions.

The transceiver pair of each transmission device are coupled at opposite azimuthal orientations but at the same spatial displacement. As such, the transceiver 2510 and transceiver 2520 are coupled at the same location, but on opposite sides of the transmission medium 2002. Likewise, the transceiver 2540 and transceiver 2530 are coupled at the same location, but on opposite sides of the transmission medium 2002—a distance d2 from the coupling point of the other transmission device.

In this embodiment however, the transceiver pairs that communicate with one another are oriented at different azimuthal deviations. In particular, the couplers of the transceiver pair 2510/2530 are oriented at different (opposite) azimuthal orientations and the longitudinal displacement d2 between the junctions is selected so that the receiving coupler is still placed at a local maximum of the envelope. Considering further the examples presented in conjunction with FIG. 23, $$d2 = N\lambda_s + \lambda_s/2$$

If the transceiver pair 2540/2520 employs the same carrier frequency, a similar effect occurs for transmission in the opposite direction along transmission medium.

As shown, each transmission device could include a training controller, such as training controller 2425 to adjust the carrier frequency of the electromagnetic waves so that the placement of each receiving coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

While FIGS. 24-25 have presented examples where two electromagnetic waves in opposite directions share the same transmission medium, similar configurations that support simultaneous transport of electromagnetic waves in the same direction are likewise possible. Also, while the examples presented in conjunction with FIGS. 24-25 have focused on transmission devices and communication systems with azimuthal deviations of $\Delta\theta=0$ or $\Delta\theta=\pi$, other deviations $\Delta\theta$ are possible. As discussed in conjunction with FIG. 23, electromagnetic waves may propagate with envelopes having local maxima and minima that support other azimuthal deviations $\Delta\theta$ at corresponding longitudinal displacements $\Delta x$. Considering the example where the envelope can be approximated by:

$$A(\Delta\theta,\Delta x)=((A_{max}-A_{min})D(\Delta x)\cos(2\pi\Delta x/\lambda_s+\Delta\theta))+A_{min}$$

and $\Delta\theta=\pi/2$, the envelope has local maxima at:

$$\Delta x=\lambda_s/4, 5\lambda_s/4 \ldots$$

And local minima at:

$$\Delta x=3\lambda_s/4, 7\lambda_s/4 \ldots$$

Two transceivers of the same transmission device can be placed with $\Delta\theta=\pi/2$ and $\Delta x=3\lambda_s/4$ and a similar remote transmission device can be placed at a distance of $$d=(4N+1)\lambda_s/4$$

Other examples with other azimuthal deviations, an optional longitudinal displacement between each transceiver in a transmission device and/or a greater number of transceivers are likewise possible.

Figure 26:
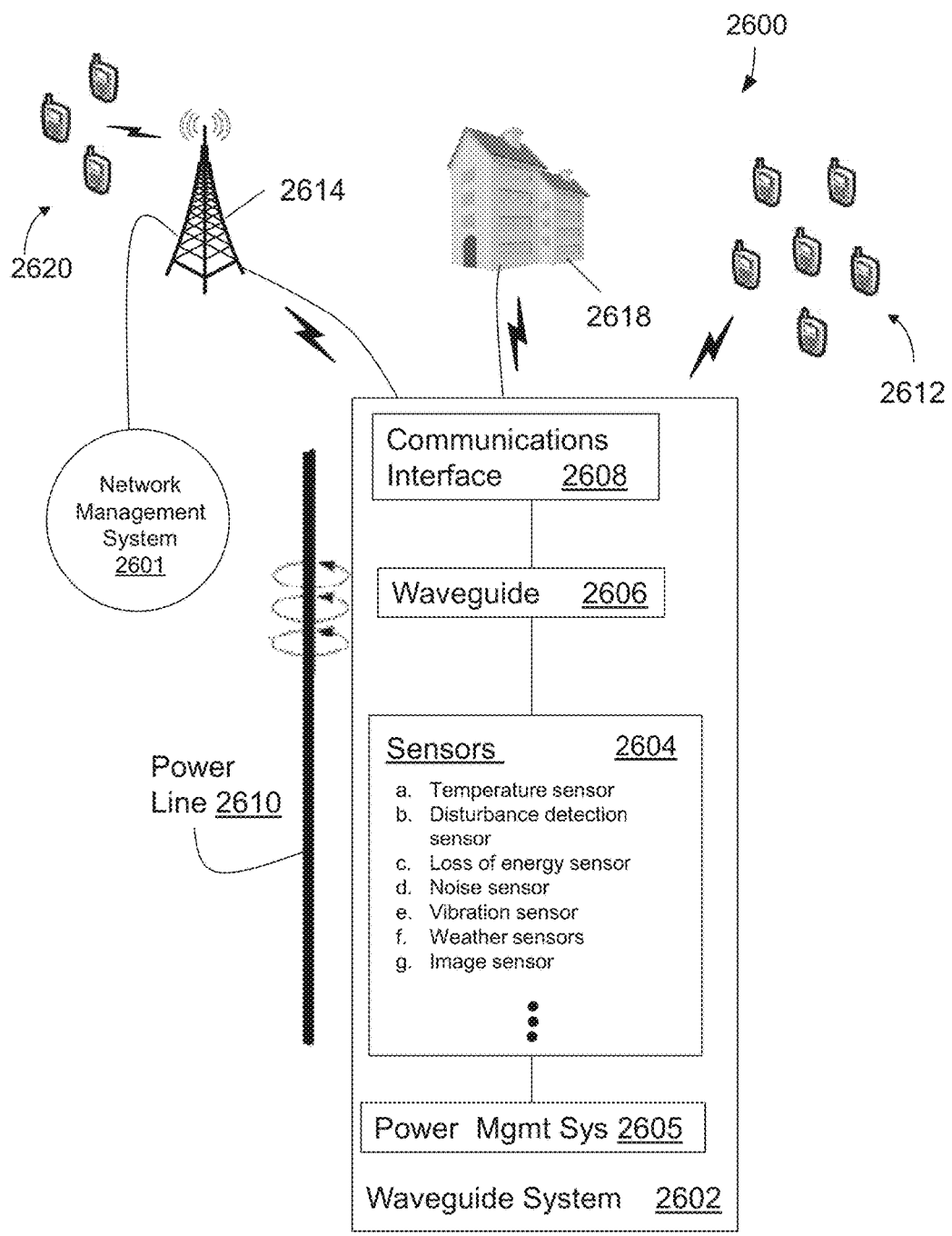
FIG. 26 is a block diagram illustrating an example, non-limiting embodiment of a waveguide system in accordance with various aspects described herein.

FIG. 26 is a block diagram illustrating an example, non-limiting embodiment of a waveguide system 2602 in accordance with various aspects described herein. The waveguide system 2602 can comprise sensors 2604, a power management system 2605, a waveguide 2606, and a communications interface 2608.

The waveguide system 2602, can include any of the transmission devices, repeaters, couplers and/or any of the other components previously described in conjunction with FIGS. 1-25. In particular, the waveguide system 2602 can be coupled to a power line 2610, or other transmission medium 2002, for facilitating data communications in accordance with embodiments described in the subject disclosure. The waveguide 2606 can comprise the system 500, such as shown in FIG. 5, for inducing electromagnetic waves on a surface of the power line 2610 that longitudinally propagate along the surface of the power line 2610 as described in the subject disclosure. Non-limiting techniques for coupling the waveguide 2606 to the power line 2610 are shown in FIGS. 2-4 and 6. The waveguide 2606 can also serve as a repeater for retransmitting electromagnetic waves on the same power line 2610 or for routing electromagnetic waves between power lines 2610 as shown in FIGS. 7-8.

The communications interface 2608 can comprise the communications interface 501 shown in FIG. 5. The communications interface 2608 couples to the waveguide 2606 for up-converting signals operating at an original frequency to electromagnetic waves operating at a carrier frequency that propagate on a surface of a coupling device of the waveguide 2606, such as the dielectric 502 of FIG. 5, and that induce corresponding electromagnetic waves that propagate on a surface of the power line 2610. The power line 2610 can be a wire (e.g., single stranded or multi-stranded and braided or bundled together) having a conducting surface or insulated surface. The communications interface 2608 can also receive signals from the waveguide 2606 that have been down-converted from electromagnetic waves operating at a carrier frequency to signals at their original frequency.

Signals received by the communications interface 2608 for up-conversion can include without limitation signals supplied by a base station 2614 over a wired or wireless interface of the communications interface 2608, wireless signals transmitted by mobile devices 2620 to the base station 2614 for delivery over the wired or wireless interface of the communications interface 2608, signals supplied by in-building communication devices 2618 over the wired or wireless interface of the communications interface 2608, and/or wireless signals supplied to the communications interface 2608 by mobile devices 2612 roaming in a wireless communication range of the communications interface 2608. In embodiments where the waveguide system 2602 functions as a repeater, such as shown in FIGS. 7-8, the communications interface 2608 may or may not be included in the waveguide system 2602.

The electromagnetic waves propagating along the surface of the power 2610 can be modulated and formatted to include packets or frames of data that include communication data in a data payload and further can include networking information (such as header information for identifying one or more destination waveguide systems 2602). The networking information may be provided by the waveguide system 2602 or an originating device such as the base station 2614, mobile devices 2620, or in-building devices 2618, or a combination thereof. Additionally, the modulated electromagnetic waves can include control, synchronization or error correction data for mitigating signal impairments. The networking information and error correction data can be used by a destination waveguide system 2602 for detecting transmissions directed to it, and for down-converting and processing with error correction data transmissions that include voice and/or data signals directed to recipient communication devices communicatively coupled to the destination waveguide system 2602.

Referring now to the sensors 2604 of the waveguide system 2602, the sensors 2604 can comprise a temperature sensor 2604a, an impairment detection sensor 2604b, a loss of energy sensor 2604c, a noise sensor 2604d, a vibration sensor 2604e, an environmental sensor 2604f, and an image sensor 2604g. The temperature sensor 2604a can be used to measure ambient temperature, a temperature of the waveguide 2606, a temperature of the power line 2610, or any combination thereof. In one embodiment, temperature metrics can be collected and reported periodically to a network management system 2601 by way of the base station 2614.

Figure 27A:
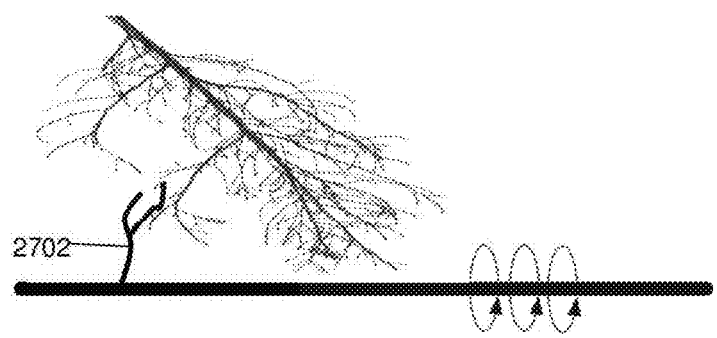
FIGS. 27A, 27B, 27C, 27D, 27E, 27F and 27G illustrate example, non-limiting embodiments of sources for impairments detectable by the waveguide system of FIG. 26 as described herein.
Figure 27B:
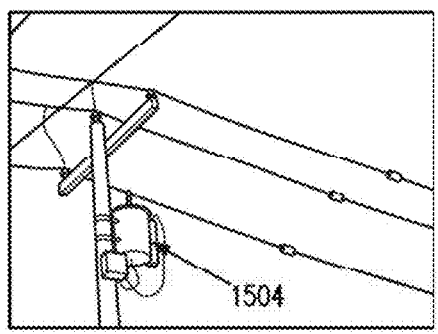
Figure 27C:
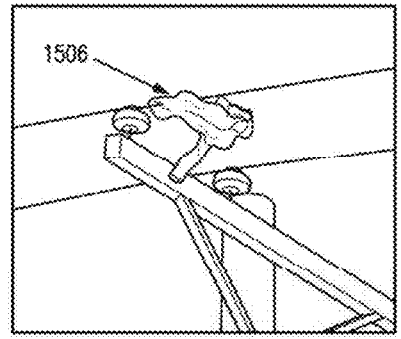
Figure 27D:
Figure 27E:
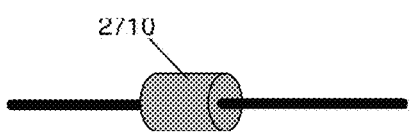
Figure 27F:
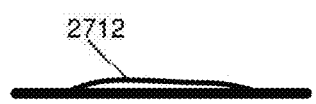
Figure 27G:
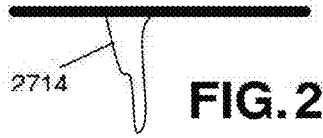

Signal reflections can be caused by obstructions on the power line 2610. For example, a tree limb shown in FIG. 27(A) may cause electromagnetic wave reflections when the tree limb is lying on the power line 2610, or is in close proximity to the power line 2610 which may cause a corona discharge 2702. Other illustrations of obstructions that can cause electromagnetic wave reflections can include without limitation an object 2706 that has been entangled on the power line 2610 as shown in FIG. 27(C) (e.g., clothing, a shoe wrapped around a power line 2610 with a shoe string, etc.), a corroded build-up 2712 on the power line 2610 as shown in FIG. 27(F), or an ice build-up 2714 as shown in FIG. 27(G). Power grid components may also interfere with the transmission of electromagnetic waves on the surface of power lines 2610. Illustrations of power grid components that may cause signal reflections include without limitation a transformer 2704 illustrated in FIG. 27(B) and a joint 2710 for connecting spliced power lines such as illustrated in FIG. 27(E). A sharp angle 2708 on a power line 2610, as shown in FIG. 27(C), may also cause electromagnetic wave reflections.

The impairment detection sensor 2604b can comprise a circuit to compare magnitudes of electromagnetic wave reflections to magnitudes of original electromagnetic waves transmitted by the waveguide 2606 to determine how much a downstream impairment in the power line 2610 attenuates transmissions. The impairment detection sensor 2604b can further comprise a spectral analyzer circuit for performing spectral analysis on the reflected waves. The spectral data generated by the spectral analyzer circuit can be compared with spectral profiles via pattern recognition, an expert system, curve fitting, matched filtering or other artificial intelligence, classification or comparison technique to identify a type of impairment based on, for example, the spectral profile that most closely matches the spectral data. The spectral profiles can be stored in a memory of the impairment detection sensor 2604b or may be remotely accessible by the impairment detection sensor 2604b. The profiles can comprise spectral data that models different impairments that may be encountered on power lines 2610 to enable the impairment detection sensor 2604b to identify impairments locally. An identification of the impairment if known can be reported to the network management system 2601 by way of the base station 2614.

In various embodiments, sensors can detect an impairment on the outer surface of the power line 2610 based on transmission of electromagnetic wave test signals. For example, the impairment detection sensor 2604b can utilize the waveguide 2606 to transmit electromagnetic waves as test signals to determine a roundtrip time for an electromagnetic wave reflection. The round trip time measured by the impairment detection sensor 2604b can be used to calculate a distance traveled by the electromagnetic wave up to a point where the reflection takes place, which enables the impairment detection sensor 2604b to calculate a distance from the waveguide 2606 to the downstream impairment on the power line 2610 or other location data that indicates the position of the impairment along the power line 2610.

The distance calculated can be reported to the network management system 2601 by way of the base station 2614. In one embodiment, the location of the waveguide system 2602 on the power line 2610 may be known to the network management system 2601, which the network management system 2601 can use to generate location data that indicates a position of the impairment on the power line 2610 based on a known topology of the power grid. In another embodiment, the waveguide system 2602 can provide its location to the network management system 2601 to assist in the determination of the location of the impairment on the power line 2610. The location of the waveguide system 2602 can be obtained by the waveguide system 2602 from a pre-programmed location of the waveguide system 2602 stored in a memory of the waveguide system 2602, or the waveguide system 2602 can determine its location using a GPS receiver (not shown) included in the waveguide system 2602.

The power management system 2605 provides energy to the aforementioned components of the waveguide system 2602. The power management system 2605 can receive energy from solar cells, or from a transformer (not shown) coupled to the power line 2610, or by inductive coupling to the power line 2610. The power management system 2605 can also include a backup battery and/or a super capacitor or other capacitor circuit for providing the waveguide system 2602 with temporary power. The loss of energy sensor 2604c can be used to detect when the waveguide system 2602 has a loss of power condition and/or the occurrence of some other malfunction. For example, the loss of energy sensor 2604c can detect when there is a loss of power due to defective solar cells, an obstruction on the solar cells that causes them to malfunction, loss of power on the power line 2610, and/or when the backup power system malfunctions due to expiration of a backup battery, or a detectable defect in a super capacitor. When a malfunction and/or loss of power occurs, the loss of energy sensor 2604c can notify the network management system 2601 by way of the base station 2614.

The noise sensor 2604d can be used to measure noise on the power line 2610 that may adversely affect transmission of electromagnetic waves on the power line 2610. The noise sensor 2604d can sense unexpected electromagnetic interference, noise bursts, or other sources of impairments that may interrupt transmission of modulated electromagnetic waves on a surface of a power line 2610. A noise burst can be caused by, for example, a corona discharge, or other source of noise. The noise sensor 2604d can compare the measured noise to a noise profile obtained by the waveguide system 2602 from an internal database of noise profiles or from a remotely located database that stores noise profiles via pattern recognition, an expert system, regression or other statistical modeling, curve fitting, matched filtering or other artificial intelligence, classification or comparison technique. From the comparison, the noise sensor 2604d may identify a noise source (e.g., corona discharge or otherwise) based on, for example, the noise profile that provides the closest match to the measured noise. The noise sensor 2604d can also detect how noise affects transmissions by measuring transmission metrics such as bit error rate, packet loss rate, jitter, packet retransmission requests, etc. The noise sensor 2604d can report to the network management system 2601 by way of the base station 2614 the identity of noise sources, their time of occurrence, and transmission metrics, among other things.

The vibration sensor 2604e can include accelerometers and/or gyroscopes to detect 2D or 3D vibrations on the power line 2610. The vibrations can be compared to vibration profiles that can be stored locally in the waveguide system 2602, or obtained by the waveguide system 2602 from a remote database via pattern recognition, an expert system, regression or other statistical modeling, curve fitting, matched filtering or other artificial intelligence, classification or comparison technique. Vibration profiles can be used, for example, to distinguish vibrations caused by fallen trees/branches from vibrations caused by wind and wind gusts (e.g., galloping, Aeolian vibrations, etc.) based on, for example, the vibration profile that provides the closest match to the measured vibrations. The results of this analysis can be reported by the vibration sensor 2604e to the network management system 2601 by way of the base station 2614.

The environmental sensor 2604f can include a barometer for measuring atmospheric pressure, ambient temperature (which can be provided by the temperature sensor 2604a), wind speed, humidity, wind direction, and rainfall, among other things. The environmental sensor 2604f can collect raw information and process this information by comparing it to environmental profiles that can be obtained from a memory of the waveguide system 2602 or a remote database to predict weather conditions before they arise via pattern recognition, an expert system, knowledge-based system or other artificial intelligence, classification or other weather modelling and prediction techniques. The environmental sensor 2604f can report raw data as well as its analysis to the network management system 2601.

The image sensor 2604g can be a digital camera (e.g., a charged coupled device or CCD imager) for capturing images in a vicinity of the waveguide system 2602. The image sensor 2604g can include an electromechanical mechanism to control movement of the camera for inspecting the power line 2610 from multiple perspectives (e.g., top surface, bottom surface, left surface, right surface and so on). The collection and retrieval of imaging data generated by the image sensor 2604g can be controlled by the network management system 2601, or can be autonomously collected and reported by the image sensor 2604g to the network management system 2601.

Other sensors that may be suitable for collecting telemetry information associated with the waveguide system 2602 and/or the power lines 2610 for purposes of detecting, locating and predicting and/or mitigating impairments that can impede electromagnetic wave transmissions on power lines 2610 (or any other form of a transmission medium of electromagnetic waves) may be utilized by the waveguide system 2602.

As described above, impairment detection sensor 2604b can perform measurements on the power line 2610 to detect impairments such as signal reflections, which may indicate a presence and location of a downstream impairment that may impede the propagation of electromagnetic waves on the power line 2610. A signal reflection can represent a distortion resulting from, for example, an electromagnetic wave transmitted on the power line 2610 by the waveguide 2606 that reflects in whole or in part back to the waveguide 2606 from an impairment in the power line 2610 located downstream from the waveguide 2606. In addition, image sensor 2604g can indicate an approximate azimuthal orientation of an impairment by analyzing image data to recognize a branch on top of a power line, an icicle hanging at the bottom of a power line, a layer of guano, etc.

In an embodiment, a training controller of waveguide system 2602, such as training controller 1900, 2425 or 2435 is coupled to receive data from these sensors. The data from these sensors can be used by training controller to facilitate the detection of impairments and/or to otherwise assist the training controller in training or adjusting the characteristics of the electromagnetic waves to enhance the propagation and/or maximize data throughput. In various embodiments, the training controller of waveguide system 2602 can select one or more carrier frequencies as a function of one or more different temperature measurements, the presence or absence of impairments, vibrations, and environmental conditions, and/or a noise measurement to generate an asymmetrical mode with a desired propagation, to operate within a limited range of the cutoff frequency of a desired asymmetrical mode and/or to adjust the envelope of the electromagnetic waves with an envelope having local minima and maxima at locations that enhance propagation and/or reduce interference. The training controller of waveguide system 2602 can optionally select one of a plurality of modulations, a depth of error correction, or one of a plurality of MIMO modes to enhance the propagation and/or maximize data throughput. For example, the training controller of waveguide system 2602 operates in conjunction with sensors to detect impairments, and triggers retraining of the communications link, adjusting the formatting, modulation or adjusting the characteristics of the electromagnetic waves in an attempt to compensate for the impairments.

In some embodiments, the training controller of waveguide system 2602 detects an impairment on the outer surface of the transmission medium that is adverse to the transmission of the electromagnetic waves and adjusts the envelope of the electromagnetic waves to enhance propagation or throughput in the presence of this impairment. For example, the training controller of waveguide system 2602 can adjust local minima and/or maxima of the envelope to locations to help compensate for the impairment. In particular, when an impairment occurs at a particular position along the power line 2610, the training controller can adjust the envelope the electromagnetic waves to place a local minimum of the envelope in a location that corresponds to a position of the impairment on the outer surface of the single wire transmission medium—reducing the adverse effects of the impairment on the electromagnetic waves.

Consider the case where an impairment occurs at a particular azimuthal orientation and displacement along the power line 2610. The training controller of waveguide system 2610 can adjust the envelope of the electromagnetic waves to place a local minimum of the envelope at the particular azimuthal orientation and displacement that corresponds to this impairment. For example, location data from the sensors can indicate the displacement and/or azimuthal orientation of the impairment. The training controller can include a look-up table or algorithm that generates adjustments to the envelope of the electromagnetic waves to explicitly place a local minimum at or near the location of the impairment while optionally maintaining as closely as possible other minima at interfering couplers of local or remote transmitters and maxima at locations of the couplers of remote receivers.

In another example, the training controller of waveguide system 2602 can react to the detection of an impairment or possible impairment by testing over possible frequencies to generate characteristics of the electromagnetic waves that enhance throughput by producing an envelope with a local minimum at or near the location of the impairment. Feedback data received from one or more remote transmission devices coupled to receive the electromagnetic waves can be used to guide the training process. In particular, the feedback data can include, or be used to generate, a packet error rate, a bit error rate, a signal strength of the received signal, a signal to noise ratio, a data throughput measurement or other quality of the transmission link that can be used by the training controller to evaluate a plurality of electromagnetic wave candidates and to select an electromagnetic wave candidate with characteristics that enhances propagation or throughput.

In addition, to the use of sensors, waveguide system 2602 can also detect impairments that adversely affect the transmission or reception of electromagnetic waves via the analysis of feedback data received from a remote transmission device, such as another waveguide transmission device that is remotely located along the power line 2610 that is coupled to communicate with the waveguide system 2602. For example, an impairment on the outer surface of the single wire transmission medium can be detected is based on detecting an absence of feedback data such as acknowledgement data or other feedback from the remote transmission device. The absence of periodic test signal transmissions or other expected transmissions from the remote transmission device can also be used to detect an impairment and be used to trigger retraining by the training controller.

Figure 28:
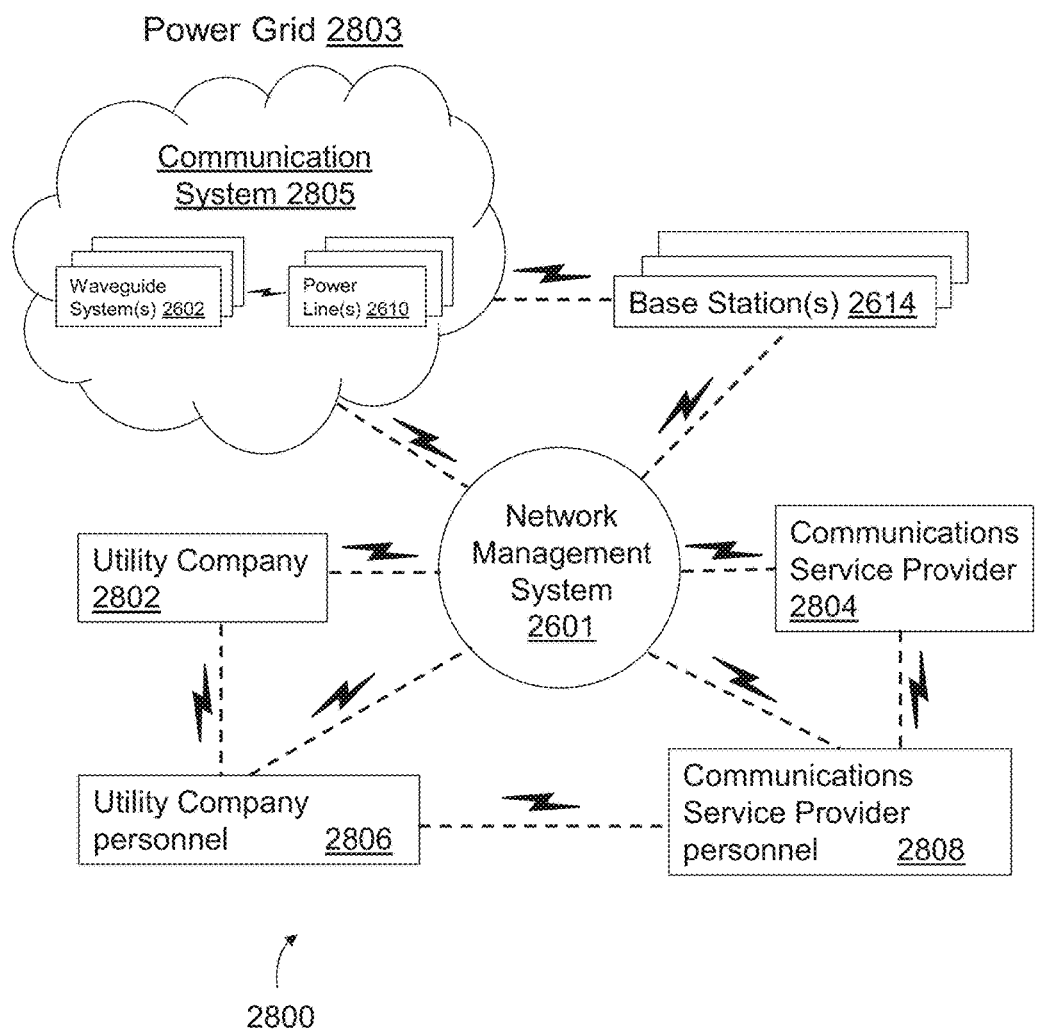
FIG. 28 is a block diagram illustrating an example, non-limiting embodiment of a system for managing a power grid communication system in accordance with various aspects described herein.

FIG. 28 is a block diagram illustrating an example, non-limiting embodiment of a system 2800 for managing a power grid 2803 and a communication system 2805 embedded therein in accordance with various aspects described herein. The communication system 2805 comprises a plurality of waveguide systems 2602 coupled to power lines 2610 of the power grid 2803. At least a portion of the waveguide systems 2602 used in the communication system 2805 can be in direct communication with a base station 2614 and/or the network management system 2601. Waveguide systems 2602 not directly connected to a base station 2614 or the network management system 2601 can engage in communication sessions with either a base station 2614 or the network management system 2601 by way of other downstream waveguide systems 2602 connected to a base station 2614 or the network management system 2601.

The network management system 2601 can be communicatively coupled to equipment of a utility company 2802 and equipment of a communications service provider 2804 for providing each entity, status information associated with the power grid 2803 and the communication system 2805, respectively. The network management system 2601, the equipment of the utility company 2802, and the communications service provider 2804 can access communication devices utilized by utility company personnel 2806 and/or communication devices utilized by communications service provider personnel 2808 for purposes of providing status information and/or for directing such personnel in the management of the power grid 2803 and/or communication system 2805.

In an example of operation, waveguide system 2602 transmits and receives messages embedded in modulated electromagnetic waves traveling along a surface of a power line 2610. The messages can be voice messages, streaming video, and/or other data exchanged between communication devices communicatively coupled to the communication system 2805. The sensors 2604 of the waveguide system 2602 can collect sensing data. The waveguide system 2602 (or the sensors 2604 themselves) can determine from the sensing data an actual or predicted occurrence of an impairment in the communication system 2805 that can affect communications originating from or received by the waveguide system 2602. The waveguide system 2602 (or the sensors 2604) can process temperature data, signal reflection data, loss of energy data, noise data, vibration data, environmental data, or any combination thereof to make this determination. The waveguide system 2602 (or the sensors 2604) may also identify the source of the impairment and/or its location in the communication system 2805. If an impairment is neither detected nor predicted, the waveguide system 2602 can continue to transmit and receive messages embedded in modulated electromagnetic waves traveling along a surface of the power line 2610.

If an impairment is detected or predicted to occur, the waveguide system 2602 determines if the impairment adversely affects transmission or reception of messages in the communication system 2805. In one embodiment, a duration threshold and a frequency of occurrence threshold can be used to determine when an impairment adversely affects communications in the communication system 2805. For illustration purposes only, assume a duration threshold is set to 500 ms, while a frequency of occurrence threshold is set to 5 impairments occurring in an observation period of 10 sec. Thus, an impairment having a duration greater than 500 ms will trigger the duration threshold. Additionally, any impairment occurring more than 5 times in a 10 sec time interval will trigger the frequency of occurrence threshold.

In one embodiment, an impairment may be considered to adversely affect signal integrity in the communication system 2805 when the duration threshold alone is exceeded. In another embodiment, an impairment may be considered as adversely affecting signal integrity in the communication system 2805 when both the duration threshold and the frequency of occurrence threshold are exceeded. The latter embodiment is thus more conservative than the former embodiment for classifying impairments that adversely affect signal integrity in the communication system 2805.

If the impairment detected neither exceeds the duration threshold nor the frequency of occurrence threshold, the waveguide system 2602 may continue to process messages. For instance, if the impairment detected has a duration of 1 ms with a single occurrence in a 10 sec time period, then neither threshold will be exceeded. Consequently, such an impairment may be considered as having a nominal effect on signal integrity in the communication system 2805 and thus would not be flagged as an impairment requiring mitigation. Although not flagged, the occurrence of the impairment, its time of occurrence, its frequency of occurrence, spectral data, and/or other useful information, may be reported to the network management system 2601 as telemetry data for monitoring purposes.

If, on the other hand, the impairment exceeds either or both thresholds, the waveguide system 2602 can report the incident to the network management system 2601. The report can include raw sensing data collected by the sensors 2604, a description of the impairment if known by the waveguide system 2602, a time of occurrence of the impairment, a frequency of occurrence of the impairment, parameters readings such as bit error rate, packet loss rate, retransmission requests, jitter, latency and so on. If the impairment is based on a prediction by one or more sensors of the waveguide system 2602, the report can include a type of impairment expected, and if predictable, an expected time occurrence of the impairment, and an expected frequency of occurrence of the predicted impairment when the prediction is based on historical sensing data collected by the sensors 2604 of the waveguide system 2602.

FIG. 29 is a diagram illustrating an example, non-limiting embodiment of an electromagnetic distribution in accordance with various aspects described herein. In particular, an electromagnetic distribution 2900 is presented in two dimensions for a transmission device that includes any of the couplers previously described. The electromagnetic wave 2902 propagates along an outer surface of a transmission medium 2904, such as a single wire transmission medium or other transmission medium previously discussed.

The majority of the energy of the electromagnetic wave 2902 that propagates along the transmission medium 2904 is outside of, but in close proximity to the outer surface of the transmission medium 2904. The combination of symmetrical and asymmetrical propagation mode(s) of the electromagnetic wave 2904 forms an envelope that varies as a function of azimuthal orientation as well as a function of the longitudinal displacement along the transmission medium 2904. The envelope of the electromagnetic wave 2902 roughly follows a serpentine pattern, oscillating between minima and maxima and concentration along the top and bottom of the transmission medium 2904, as the electromagnetic wave 2902 propagates along the direction of propagation 2906.

Consider an azimuthal orientation $\theta=0$ that corresponds to the bottom of the transmission medium 2904. The opposite surface, at the top of the transmission medium 2904, corresponds to $\theta=\pi$, an azimuthal orientation of $\pi$ radians. In the embodiment shown, for $\theta=0$ the envelope has local maxima at $(x_1, x_3, x_5, x_7)$ and a local minima at $(x_2, x_4, x_6)$. Conversely, for $\theta=\pi$, the envelope has local minima at $(x_1, x_3, x_5, x_7)$ and a local maxima at $(x_2, x_4, x_6)$.

If an impairment, for example a tree branch, occurs at $x_7$, this can block or otherwise impede the propagation of the electromagnetic wave 2902, adversely affecting the transport of the communication data conveyed by the electromagnetic wave 2902. As previously discussed, a training controller associated with the transmission device can detect the impairment and adjust the envelope of the electromagnetic waves 2902 to place a local minimum of the envelope in the location $x_7$ that corresponds to the position of the impairment on the transmission medium 2904.

FIG. 30 is a diagram illustrating an example, non-limiting embodiment of an electromagnetic distribution in accordance with various aspects described herein. In particular, an electromagnetic distribution 3000 is presented in two dimensions for a transmission device that includes any of the couplers previously described. The electromagnetic wave 3002 propagates along an outer surface of a transmission medium 2904, such as a single wire transmission medium or other transmission medium previously discussed in conjunction with the example of FIG. 29. In this example, the training controller has adjusted the envelope of the electromagnetic wave 3002 to place a local minimum of the envelope in the location $x_7$ that corresponds to the position of the impairment on the transmission medium 2904. Because the location $x_7$ that corresponds to the position of the impairment corresponds to a local minimum of the envelope, the effect of the impairment on the propagation of the electromagnetic wave 3002 is greatly reduced.

Figure 31:
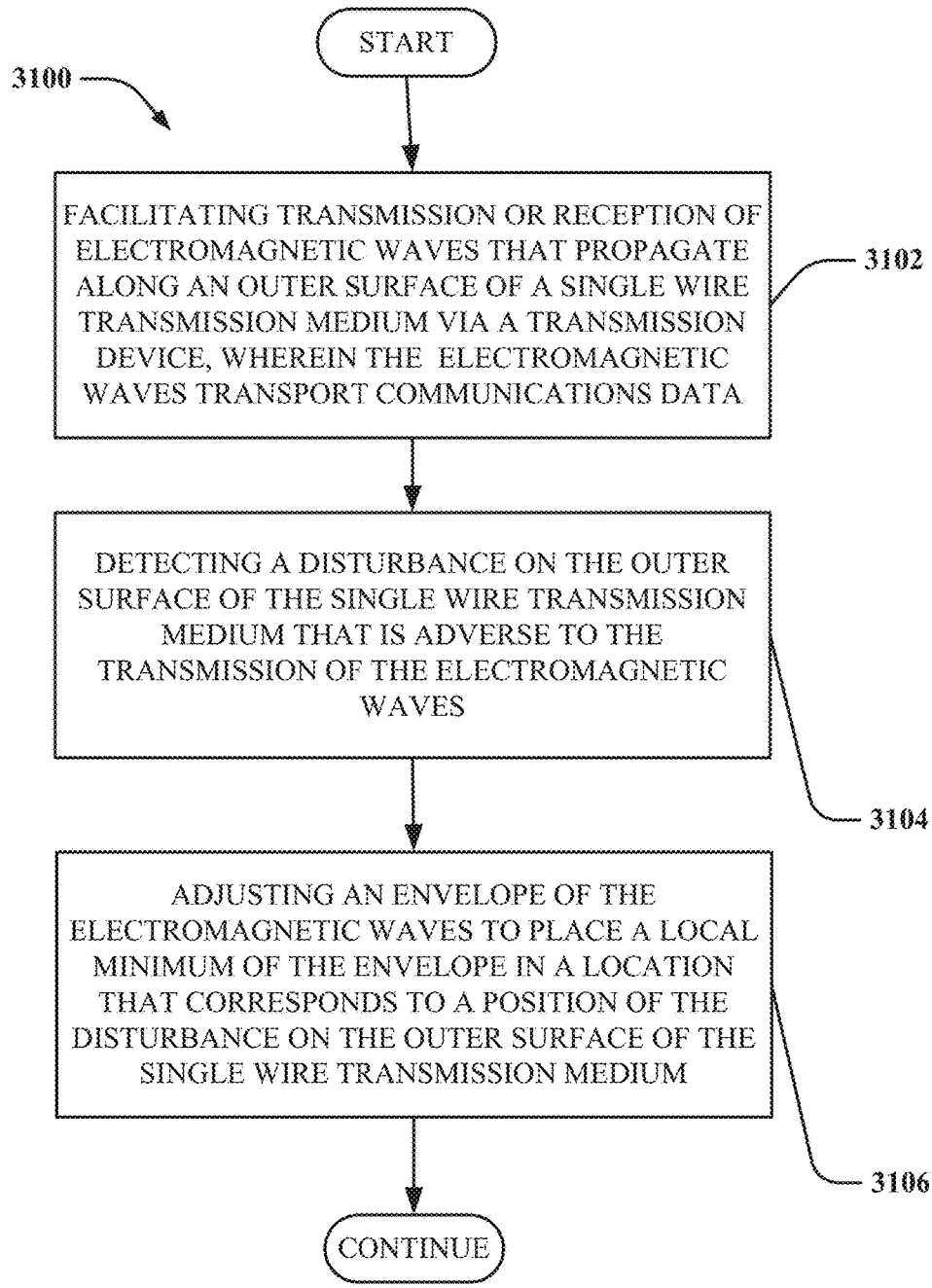
FIG. 31 illustrates a flow diagram of an example, non-limiting embodiment of a method of transmission as described herein.

Turning now to FIG. 31, a flow diagram is shown illustrating an example, non-limiting embodiment of a method of transmission 3100. The method can be used in conjunction with one or more functions and features described in conjunction with FIGS. 1-30. Step 3102 includes facilitating transmission or reception of electromagnetic waves that propagate along an outer surface of a single wire transmission medium via a transmission device, wherein the electromagnetic waves transport communications data. Step 3104 includes detecting an impairment on the outer surface of the single wire transmission medium that is adverse to the transmission of the electromagnetic waves. Step 3106 includes adjusting an envelope of the electromagnetic waves to place a local minimum of the envelope in a location that corresponds to a position of the impairment on the outer surface of the single wire transmission medium.

In an embodiment, step 3106 includes adjusting at least one carrier frequency of the electromagnetic waves based on feedback data received from at least one remote transmission device coupled to receive the electromagnetic waves. The method can further include facilitating detection of the impairment via one or more sensors. Step 3104 can be based on transmitting electromagnetic wave test signals on the single wire transmission medium, data received from one or more sensors and/or detecting the absence of acknowledgement signals or other feedback from a remote transmission device.

The method can further include coordinating the adjusting of at least one carrier frequency of the electromagnetic waves with the at least one remote transmission device coupled to receive the electromagnetic waves. The single wire transmission medium can be a power line of a power grid for distribution of electric power.

As used herein, "microwave" refers to waves in a frequency range of 300 MHz to 300 GHz. "Millimeter wave" refers to waves in a frequency range of 30 GHz to 300 GHz.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A waveguide system, comprising:
a transmitter configures to generate a first electromagnetic wave;
a coupler configured to guide the first electromagnetic wave to a junction along an outer surface of a transmission medium, the first electromagnetic wave inducing a second, different electromagnetic wave that propagates along the transmission medium via a combination of wave modes without requiring an electrical return path, the combination of the wave modes forming an oscillatory field strength envelope that varies as a sinusoidal function of a longitudinal displacement along the transmission medium from the junction.

2. The waveguide system of claim 1, further comprising:
a training controller configured to:
detect an impairment on the transmission medium that is adverse to the propagation of the second electromagnetic wave, the impairment having a location corresponding to at least one of: a position on the at least a portion of the outer surface of the transmission medium or an azimuthal orientation on the at least the portion of the outer surface of the transmission medium; and
adjust the second electromagnetic wave to reduce a field strength of the second electromagnetic wave at the location of the impairment.

3. The waveguide system of claim 2, wherein the training controller adjusts the second electromagnetic wave by adjusting at least one carrier frequency of the second electromagnetic wave based on feedback data received from at least one remote transmission device coupled to receive the second electromagnetic wave.

4. The waveguide system of claim 3, wherein the training controller coordinates the adjusting of the at least one carrier frequency of the second electromagnetic wave with the at least one remote transmission device coupled to receive the second electromagnetic wave.

5. The waveguide system of claim 2, further comprising a sensor that facilitates detection of the impairment by the training controller.

6. The waveguide system of claim 2, wherein the impairment on the at least the portion of the transmission medium is detected based on transmission of electromagnetic wave test signals on the transmission medium.

7. The waveguide system of claim 2, wherein the location that corresponds to the impairment on the at least the portion of the transmission medium, includes a displacement and an azimuthal orientation.

8. The waveguide system of claim 2, wherein the impairment on the at least the portion of the transmission medium is detected based on detecting an absence of acknowledgement data from at least one remote transmission device.

9. The waveguide system of claim 1, wherein the transmission medium comprises a power line of a power grid for distribution of electric power.

10. The waveguide system of claim 1, wherein the transmission medium comprises a dielectric member and the transmission medium facilitates wireless network connectivity via an antenna.

11. A method comprising:
generating a first electromagnetic wave;
guiding, via a coupler, the first electromagnetic wave to a junction along an outer surface of a transmission medium, the first electromagnetic wave inducing a second, different electromagnetic wave that propagates along the transmission medium via a combination of wave modes without requiring an electrical return path, the combination of the wave modes forming an oscillatory field strength envelope that varies as a sinusoidal function of a longitudinal displacement along the transmission medium from the junction.

12. The method of claim 11, further comprising:
detecting an impairment on the transmission medium that is adverse to the transmission or reception of the second electromagnetic wave;
adjusting the second electromagnetic wave to reduce an adverse effect of the impairment, wherein the adjusting the second electromagnetic wave includes reducing a field strength of the second electromagnetic wave at a location of the impairment.

13. The method of claim 12, wherein the adjusting the second electromagnetic wave includes placing a local minimum of the oscillatory field strength envelope in a location that corresponds to a position of the impairment on the transmission medium.

14. The method of claim 12, further comprising:
coordinating an adjusting of at least one carrier frequency of the second electromagnetic wave with at least one remote transmission device coupled to receive the second electromagnetic wave.

15. The method of claim 12, further comprising:
facilitating the detecting of the impairment via a sensor.

16. The method of claim 12, wherein the impairment on the transmission medium is detected based on transmitting electromagnetic wave test signals on the transmission medium.

17. The method of claim 12, wherein the impairment on the transmission medium is detected based on detecting an absence of acknowledgement data from at least one remote transmission device.

18. A waveguide system, comprising:
means for generating a first electromagnetic wave;
means for guiding the first electromagnetic wave to a junction along an outer surface of a transmission medium, the first electromagnetic wave inducing a second, different electromagnetic wave that propagates along the transmission medium via a combination of wave modes without requiring an electrical return path, the combination of the wave modes forming an oscillatory field strength envelope that varies as a sinusoidal function of a longitudinal displacement along the transmission medium from the junction.

19. The waveguide system of claim 18, wherein the transmission medium comprises a power line of a power grid for distribution of electric power.

20. The waveguide system of claim 18, wherein the transmission medium comprises a dielectric member and the transmission medium facilitates wireless network connectivity via an antenna.

* * * * *